United States Patent
Breitweiser et al.

(10) Patent No.: US 12,469,223 B2
(45) Date of Patent: Nov. 11, 2025

(54) EXTENDED REALITY METHODS AND SYSTEMS FOR COLLECTING, MANAGING, AND USING HOME-RELATED INFORMATION

(71) Applicant: STATE FARM MUTUAL AUTOMOBILE INSURANCE COMPANY, Bloomington, IL (US)

(72) Inventors: Edward W. Breitweiser, Bloomington, IL (US); Ryan Gross, Normal, IL (US); Jeffrey W. Stoiber, Atlanta, GA (US); Craig Cope, Bloomington, IL (US); Christopher N. Kawakita, Normal, IL (US); Matthew L. Floyd, Alpharetta, GA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 137 days.

(21) Appl. No.: 18/111,208

(22) Filed: Feb. 17, 2023

(65) Prior Publication Data

US 2023/0267694 A1    Aug. 24, 2023

Related U.S. Application Data

(60) Provisional application No. 63/320,297, filed on Mar. 16, 2022, provisional application No. 63/320,270, (Continued)

(51) Int. Cl.
G06F 3/01    (2006.01)
G06Q 40/08    (2012.01)
(Continued)

(52) U.S. Cl.
CPC .......... *G06Q 50/186* (2013.01); *G06F 3/011* (2013.01); *G06Q 40/08* (2013.01); *G06Q 50/16* (2013.01);
(Continued)

(58) Field of Classification Search
None
See application file for complete search history.

(56) References Cited

U.S. PATENT DOCUMENTS 9,830,748 B2    11/2017    Rosenbaum
9,990,782 B2    6/2018    Rosenbaum
(Continued)

FOREIGN PATENT DOCUMENTS

EP    3239686 A1    11/2017
EP    3578433 B1    8/2020
(Continued)

*Primary Examiner* — Michael J Cobb
(74) *Attorney, Agent, or Firm* — MARSHALL, GERSTEIN & BORUN LLP

(57) ABSTRACT

Embodiments of extended reality (XR) methods and systems for handling home-related information are disclosed. In one embodiment, a computer-implemented method may include (1) obtaining one or more XR preferences for a party; (2) presenting, using one or more devices associated with the party instructions constructed to guide the party to move throughout or around a real property, and prompts constructed to direct the party to capture data representing one or more of the real property or belongings; (3) determining, by one or more processors processing the captured data, asset data representing one or more of the real property or the belongings; and/or (4) presenting, in a virtualized environment in accordance with the party's XR preferences via an XR device, one or more visual depictions of the deter-
(Continued)

mined asset data such that the party or an insurance representative can at least one of view, modify, or approve the asset data.

17 Claims, 27 Drawing Sheets

Related U.S. Application Data filed on Mar. 16, 2022, provisional application No. 63/318,325, filed on Mar. 9, 2022, provisional application No. 63/311,591, filed on Feb. 18, 2022.

(51) Int. Cl.
    *G06Q 50/16*         (2024.01)
    *G06Q 50/163*       (2024.01)
    *G06Q 50/18*         (2012.01)
    *G06T 17/00*         (2006.01)
    *G06T 19/00*         (2011.01)
    *G06V 20/20*         (2022.01)

(52) U.S. Cl.
    CPC ........... *G06Q 50/163* (2013.01); *G06T 17/00* (2013.01); *G06T 19/003* (2013.01); *G06V 20/20* (2022.01)

(56) References Cited

U.S. PATENT DOCUMENTS

| | | | |
|---|---|---|---|
| 10,210,577 B1 * | 2/2019 | Davis .................. | G06Q 10/087 |
| 10,269,190 B2 | 4/2019 | Rosenbaum | |
| 10,373,387 B1 | 8/2019 | Fields et al. | |
| 10,467,824 B2 | 11/2019 | Rosenbaum | |
| 10,748,340 B1 * | 8/2020 | Zhang .................... | G06F 3/147 |
| 10,824,867 B1 | 11/2020 | Assam | |
| 11,113,768 B1 | 9/2021 | Davis et al. | |
| 11,132,481 B1 | 9/2021 | Davis et al. | |
| 11,200,421 B1 * | 12/2021 | Chavez ................. | H04W 4/027 |
| 11,227,452 B2 | 1/2022 | Rosenbaum | |
| 11,250,515 B1 * | 2/2022 | Feiteira .................. | G06Q 40/08 |
| 11,341,379 B1 * | 5/2022 | Bagheri ................. | G06Q 40/08 |
| 11,361,383 B1 * | 6/2022 | James ................... | G06Q 30/016 |
| 11,407,410 B2 | 8/2022 | Rosenbaum | |
| 11,524,707 B2 | 12/2022 | Rosenbaum | |
| 11,594,083 B1 | 2/2023 | Rosenbaum | |
| 11,663,782 B1 * | 5/2023 | Post ..................... | G02B 27/017 |
| | | | 345/633 |
| 11,816,759 B1 * | 11/2023 | Smith ..................... | G06T 11/00 |
| 2016/0253843 A1 * | 9/2016 | Lee ....................... | G06T 19/006 |
| | | | 345/633 |
| 2020/0143481 A1 * | 5/2020 | Brown .................. | G06N 20/20 |
| 2022/0092893 A1 | 3/2022 | Rosenbaum | |
| 2022/0130064 A1 * | 4/2022 | Tomar ................... | G06T 19/006 |
| 2022/0155945 A1 * | 5/2022 | Holzer .................. | G06V 20/52 |
| 2022/0156497 A1 * | 5/2022 | Holzer ................. | G06V 20/647 |
| 2022/0182557 A1 * | 6/2022 | Martinez Pupo de Oliveira ........ | |
| | | | H04N 7/141 |
| 2022/0254007 A1 * | 8/2022 | Holzer ................... | G06T 19/20 |
| 2022/0262518 A1 * | 8/2022 | Navani .................. | G16H 50/20 |
| 2022/0340148 A1 | 10/2022 | Rosenbaum | |
| 2023/0060300 A1 | 3/2023 | Rosenbaum | |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |

* cited by examiner

LIFE INSURANCE APPLICATIONS (MODIFIED) 2500

DIGITALIZE LIFE INSURANCE POLICY 2502, such as use Virtual Headset (e.g., AR/VR/XR Headset or Smart Glasses, and/or Chat Bot) to Visually or Audibly capture/collect Life Insurance Policy terms and conditions, and extract Beneficiary information, name, etc.

RECEIVE OR CREATE DIGITALIZED DATA OF BENEFICIARY 2504, such as use Virtual Headset to Visually or Audibly capture/collect:
- Personal/social media data;
- Financial account data; and/or
- Metaverse location/avatar data

CREATE PERSONALIZED USER EXPERIENCE FOR BENEFICIARY 2506, such as use Virtual Headset to Visually or Audibly capture/collect Beneficiary's:
- Preferences on virtual or actual communications;
- Preferences on virtual or actual agent interactions;
- Preferences on metaverse location for interactions; and/or
- Preferences for monetary or personal articles disposition

NOTIFY BENEFICIARY OF INSURED'S DEATH 2508, via Virtual Headset or other communication

HANDLE LIFE INSURANCE DISPOSITION VIRTUALLY in AR/VR/XR World 2510, via Virtual Headset, such as allow Beneficiary to be led through the Life Insurance bequeaths in a metaverse room or location of their choosing (such as from Beneficiary user experience preferences determined previously), and interacting with either a virtual or actual agent, and allow Beneficiary to select payment options or accounts virtually, visually, or audibly

FIGURE 25

HOMEOWNERS INSURANCE APPLICATIONS 2700

RECEIVE OR CREATE DIGITALIZED DATA OF INSURED 2702, such as use Virtual Headset (e.g., AR/VR/XR Headset or Smart Glasses, and/or Chat bot) to Visually or Audibly capture/collect:
- Personal/social media data;
- Insured asset data (house, vehicles, personal belongings);
- Insurance Policy data; and
- Metaverse location/avatar data Insured Walks Through Home with Virtual Headset to collect data of Home Features, Personal Articles, Vehicles, Boats, etc. 2704

Use Machine Learning to Create List of Personal Articles, House Features, & Vehicles 2710

Use Machine Learning to Identify Areas of Risk 2706

Generate Home, Vehicle, Personal Articles Ins. Quotes 2712

Identify Mitigating Actions and Offer Discounts 2708

Identify Items (Boats, Buildings, etc. on Property) currently under insured or uninsured, and generate quote or endorsement 2714

Parametric Insurance: For Personal Articles, detect home Trigger Event using sensor data, and generate insurance claim using cost of personal articles lost for insured's review/adjustment/approval 2716

House Remodeling: Create Options for Home Remodeling for Insured to View in Virtual Headset, such as display various options for bath or kitchen remodel, with different materials and different costs visually displayed or audibly presented, with insured able to alter or adjust remodeling plans via visually icons or audible interaction with Virtual Headset and/or Chat Bot 2718

Allow Insured to Schedule Remodeling and Review/Approve Financing Options via Virtual Headset and/or Chat Bot 2720

FIGURE 27

EXTENDED REALITY METHODS AND SYSTEMS FOR COLLECTING, MANAGING, AND USING HOME-RELATED INFORMATION

CROSS-REFERENCE TO RELATED APPLICATIONS

This application claims the benefit of: (1) U.S. Provisional Patent Application No. 63/311,591, entitled "Virtual Headset Applications & Personalized Virtual User Experiences" and filed on Feb. 18, 2022; (2) U.S. Provisional Patent Application No. 63/318,325, entitled "Extended Reality Methods and Systems for Processing Vehicle-Related Information" and filed on Mar. 9, 2022; (3) U.S. Provisional Patent Application No. 63/320,270, entitled "Extended Reality Methods and Systems for Obtaining and Handling Estate Data," and filed on Mar. 16, 2022; and (4) U.S. Provisional Patent Application No. 63/320,297, entitled "Extended Reality Methods and Systems for Collecting, Managing, and Using Home-Related Information," and filed on Mar. 16, 2022. The disclosure of each of the above-identified patent applications is hereby incorporated herein by reference in its entirety.

FIELD

The present disclosure generally relates to extended reality (XR), and, more particularly, (i) to creating preferred or personalized virtual user experiences, and/or (ii) to XR methods and systems for collecting, managing, providing, and/or using home-related information.

BACKGROUND

In commercial settings, conventional approaches to customer interactions (e.g., for collecting customer information and/or providing information to customers) have various drawbacks, such as inefficient or ineffective relaying of information, as well as an inability to collect complete and/or accurate datasets. The present embodiments may overcome these and/or other deficiencies.

BRIEF SUMMARY

Present embodiments include XR systems, XR devices, XR methods, and XR environments for handling home-related information (e.g., collecting, managing, providing, and/or using home-related information). In some embodiments, the XR systems may include augmented reality (AR) systems, virtual reality (VR) systems, mixed reality (MR) systems, and/or smart glasses or smart contacts. The XR systems may be configured to generate, generate, present, or provide personalized XR environments. Taken together, disclosed XR systems, XR devices, XR methods, and XR environments work together to provide a personalized XR experiences that they may use to handle one or more aspects of home-related information.

In one aspect, a computer-implemented method may include: (1) obtaining one or more extended reality (XR) preferences for a party; (2) presenting, using one or more devices associated with the party: instructions constructed to guide the party to move throughout or around a real property, and/or prompts constructed to direct the party to capture data representing one or more of the real property or belongings; (3) determining, by one or more processors processing the captured data, asset data representing one or more of the real property or the belongings; and/or (4) presenting, in a virtualized environment in accordance with the party's XR preferences via an XR device, one or more visual depictions of the determined asset data such that the party or an insurance representative can at least one of view, modify, or approve the asset data.

In another aspect, a system may include a communication interface configured to receive one or more extended reality (XR) preferences for a party, and one or more processors configured to: (1) present, using one or more devices associated with the party: instructions constructed to guide the party to move throughout or around a real property, and/or prompts constructed to direct the party to capture data representing one or more of the real property or belongings; (2) determine, by processing the captured data, asset data representing one or more of the real property or the belongings; and/or (3) present, in a virtualized environment in accordance with the party's XR preferences via an XR device, one or more visual depictions of the determined asset data such that the party or an insurance representative can at least one of view, modify, or approve the asset data.

In another aspect, a non-transitory computer-readable storage medium stores instructions that, when executed by one or more processors, may cause a system to: (1) obtain one or more extended reality (XR) preferences for a party; (2) present, using one or more devices associated with the party: instructions constructed to guide the party to move throughout or around a real property, and/or prompts constructed to direct the party to capture data representing one or more of the real property or belongings; (3) determine, by processing the captured data, asset data representing one or more of the real property or the belongings; and/or (4) present, in a virtualized environment in accordance with the party's XR preferences via an XR device, one or more visual depictions of the determined asset data such that the party or an insurance representative can at least one of view, modify, or approve the asset data.

Advantages will become more apparent to those skilled in the art from the following description of the preferred embodiments, which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of exemplary XR systems, XR devices, XR environments, and XR methods disclosed therein. It should be understood that each Figure depicts embodiments of particular aspects of the disclosed XR systems, XR devices, XR environments, and XR methods, and that each of the Figures is intended to accord with one or more possible embodiments thereof. Alternative embodiments of the XR systems, XR devices, XR environments, and XR methods illustrated herein may be employed without departing from the principles of the invention described herein.

There are shown in the drawings arrangements which are presently discussed, it being understood, however, that the present embodiments are not limited to the precise arrangements and instrumentalities shown, wherein:

FIG. 25 illustrates another computer-implemented method utilizing a personalized virtual user experience to dispose of assets identified in a life insurance policy, will, or trust;

FIG. 27 illustrates another computer-implemented method of auto insurance and homeowners insurance virtual user experience applications.

Figure 1:
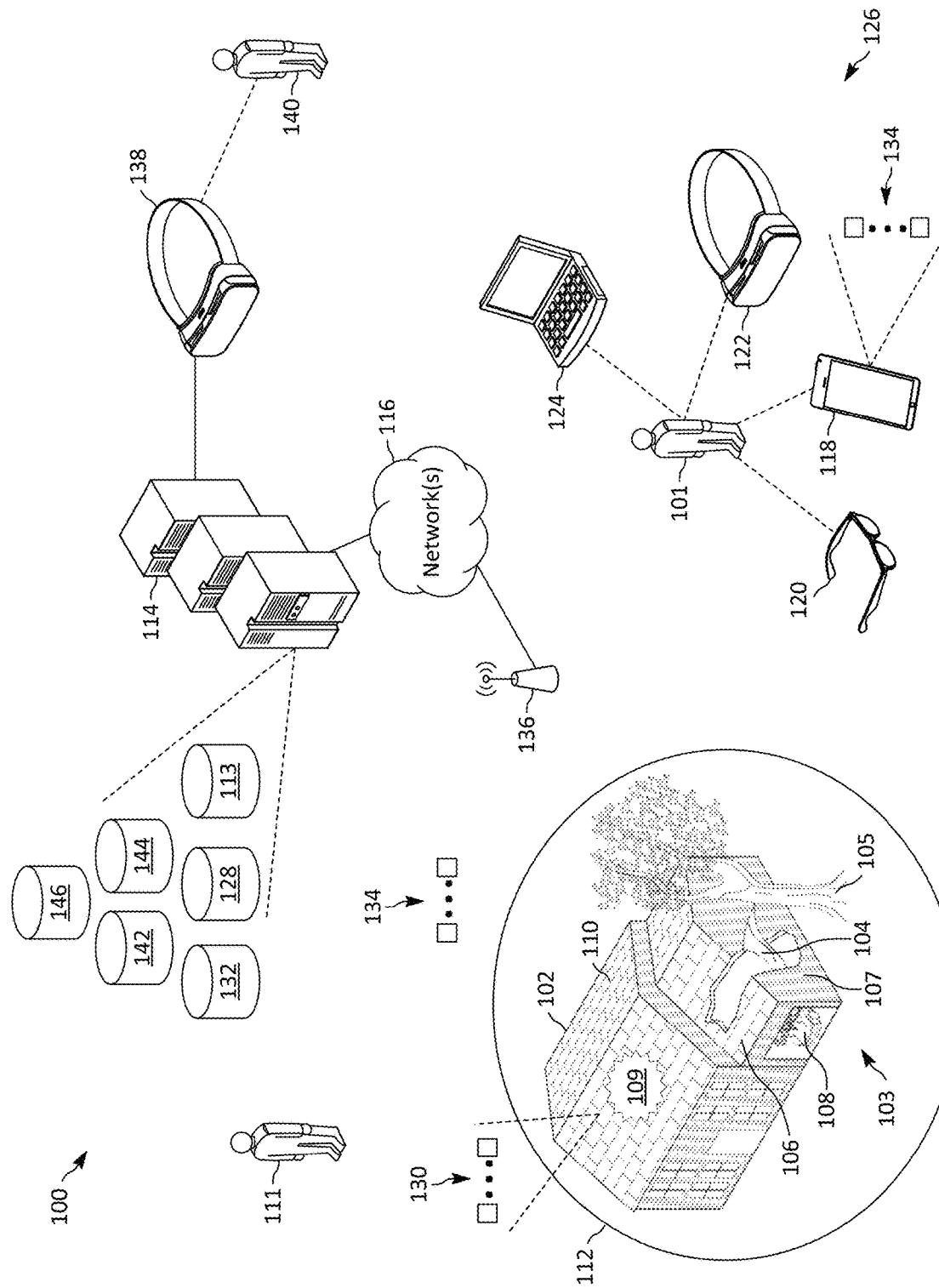
FIG. 1 is a schematic diagram of an exemplary XR system for collecting, managing, providing, and/or using home-related information, in accordance with various embodiments of the present disclosure.

Skilled artisans will appreciate that elements in the Figures are illustrated for simplicity and clarity, and have not necessarily been drawn to scale. For example, the dimensions of some of the elements in the Figures may be exaggerated relative to other elements to help to improve understanding. Moreover, apparatus and method components have been represented where appropriate by conventional symbols in the Figures, showing only those specific details that are pertinent to understanding the embodiments of the present disclosure so as not to obscure the present disclosure with details that will be readily apparent to those of ordinary skill in the art having the benefit of the description herein. Further, wherever possible, the following description refers to the reference numerals included in the following Figures, in which features depicted in multiple Figures are designated with consistent reference numerals.

DETAILED DESCRIPTION

The present embodiments relate, inter alia, to XR systems, XR devices, and personalized XR environments (i.e., virtualized environments) for collecting preference data, such as personal data, XR preferences, and home-related data related to a real property (e.g., a home, and a yard or other fixed property associated with the home) or belongings that may be managed and/or used to (i) submit and handle an insurance claim for a damage-causing event; (ii) assess damage risks and recommend mitigation or preventive options (e.g., corrective actions); (iii) obtain insurance policy quotes; and/or (iv) recommend remodeling projects, for example. The data may be collected via several sources, including one or more XR devices, one or more sensors and/or one or more data sources, and analyzed by one or more servers to provide practical and improved XR environments.

As used herein, the term "party" will be used to distinguish a person from an insurance company, or a representative thereof (e.g., an insurance agent, or claim adjuster). A party may be an insured party to which an insurance company provides one or more insurance policies, for example. A party may also be an authorized representative of an insured person, company, business, or organization to which an insurance company provides one or more insurance policies. A party may also be a past, potential, or future insured party of an insurance company.

As used herein, the term "belongings" will refer to any number and/or type(s) of devices, assets, objects, or any other items present, some or all the time, in a home or on a property. Belongings may include substantially fixedly-installed items in a home or at a property, such as a furnace, a water heater, a hot tub, etc. Such belongings may typically be covered by a home insurance policy.

Belongings may also include generally portable items associated with the home, property, or one or more persons living in the home or on the property, such as a television, silverware, a table, a chair, a bed, clothing, jewelry, and computers or other computing devices, for example. Some portable belongings, such as a table or chair, may generally be at the home or on the property substantially all the time. Such belongings may typically be covered by a home insurance policy. However, some portable belongings, such as a phone, jewelry, etc., may not always be present at the home or property, but may often be carried to, or used at, locations other than the property. Such belongings may typically be covered by a personal articles insurance policy. Belongings may also include any other type(s) of items such, as a vehicle, a tractor, a lawnmower, a snowmobile, or a boat. Such belongings may typically be covered by other types of insurance policies, such as an automobile or watercraft insurance policy.

As used herein, the term "asset data" will refer to any number and/or type(s) of data or information that collectively represents a home or a property including, for example, a layout of a home, a size of a home, materials used to build the home, construction features of the home, a lot size, landscaping features or materials, ages of belongings or materials, or any other data or information representing any other feature(s) of a home or property that may be useful for determining a value, a repair cost, a replacement cost, etc. for the home or the property. Asset data will also refer herein to the identifications of belongings, and/or related details or information that may be used to determine value, repair costs, replacement costs, etc. for the belongings.

While embodiments described herein refer to XR systems, XR devices, XR methods, and XR environments for handling (e.g., collecting, managing, providing, and/or using) home-related information related to homes, residential properties, belongings, damage to a home, property or belongings, etc., it should be understood that disclosed embodiments may also be used to handle information related to any number and/or type(s) of other real properties including any other types of buildings, structures and/or properties, such as stores, places of building, warehouses, etc. Moreover, while embodiments described herein refer to "home-related data" or "home-related information," it should be understood that data or information related to any number and/or type(s) of other real properties including any other types of buildings, structures, and/or properties may be used instead.

As is commonly known and as used herein, XR refers to the use of any virtual environment, or mixed real-and-virtual environment, wherein at least a portion of human-to-machine or human-to-human interactions are generated using XR technology and/or XR devices. An XR environment may include one or more of augmented reality (AR), mixed reality (MR), virtual reality (VR), or combinations thereof. An XR environment may include one or more visual environments or components, possibly with an audio component (e.g., spoken words of another person or a voice bot) or a text component as well. VR may refer to an immersive user experience, where the user can experience the sensation of a three dimensional (3D) environment without real-world elements/images. AR may refer to an annotation, overlay, or augmentation of text or media content, such as graphics content, onto real-world content, such as images or video of a real-world scene, or onto a direct visual impression of the real world, such as may be seen through the transparent glass or plastic portion of smart glasses. MR may refer to an annotation, overlay, augmentation, or mixing of synthetic content, such as computer generated graphics, virtual scenery, virtual images, or other mixed reality content with real-world content, such as real-world content. In various embodiments, XR environments disclosed herein may be parts of a network of three-dimensional (3D) virtual worlds, such as a metaverse.

An XR device may generally be any computing device capable of visualizing and presenting virtual content in conjunction with, or separate from, real-world content to generate a partial or wholly virtual environment or experience for a user. Exemplary XR devices may include a wearable AR headset or smart glasses, a wearable MR headset or smart glasses, a wearable VR headset or smart glasses, smart glasses, smart contacts, smart displays or screens, a mobile device, a tablet, a device having a speaker and microphone, or a device having a text-based interface. An XR device may include one or more input controls, such as one or more physical buttons located on the XR device itself, or one or more physical buttons located on handheld controllers or devices worn on a hand, foot, or other body part (i.e., "worn devices") used in conjunction with the XR device.

Handheld controllers or worn devices may include one or more inertia, orientation or position sensors to sense movements, gestures, positions, orientations, etc. of a wearer or user, or a body part of the wearer or user. For example, handheld controllers or worn devices may be used to virtually (e.g., using gestures) point at, select, activate, or otherwise interact with one or more elements of a UI provided or presented within a virtual environment via or using an XR device. Input may also be provided using physical touchscreen inputs on screens of the XR device (e.g., a screen of a smart phone or personal computer), or using a computing device (e.g., a smart phone or personal computer) associated with the XR device.

An XR device may also include audio or text input devices configured to enable a real, or XR environment to include text-based interactions (e.g., virtual user interfaces within the virtual environment for selecting or otherwise entering text, and/or for presenting text), or audio (e.g., one or more speakers and one or more microphones of the XR device, to support spoken interactions). The audio and text input devices may also be configured to enable a wearer or user to interact with, respectively, a voice bot or a chatbot, for example. The audio and text input devices may also be used to generally control the XR device itself.

In some embodiments, an XR device and its input controls may be used to physically or virtually write text (e.g., using virtual gestures), type text (e.g., using a virtual or physical keyboard), and speak text.

In some embodiments, described XR devices may be any commercial XR device, such as a Google Glass® device, a Google Cardboard® device, a Google Daydream® device, a Microsoft Hololens® device, a Magic Leap® device, an Oculus® device, an Oculus Rift® device, a Gear VR® device, a PlayStation® VR device, or an HTC Vive® device, to name a few. In general, each of these example XR devices may use one or more processors or graphic processing units (GPUs) capable of visualizing multimedia content in a partial or wholly virtual environment.

For example, a Google Cardboard® VR device may include a VR headset that uses one or more processors or GPUs of an embedded smart phone, such as a smart phone, which, in some embodiments, may be a Google Android®-based or Apple iOS®-based smart phone, or other similar computing device, to visualize multimedia content in a virtual environment. Other XR devices, such as the Oculus Rift® VR device, may include a VR headset that uses one or more processors or GPUs of an associated computing device, such a personal computer/laptop, for visualizing multimedia images in an XR environment. The personal computer/laptop may include one or more processors, one or more GPUs, one or more computer memories, and software or computer instructions for performing the visualizations, annotations, or presentation of multimedia content or VR environments as described herein. Still further, XR devices may include one or more processors or GPUs as part of an XR device may operate independently from the processor(s) of a different computing device for the purpose of visualizing multimedia content in a virtual environment.

While embodiments are described herein with reference to exemplary XR technologies and exemplary XR devices, persons of ordinary skill in the art will recognize that disclosed embodiments may be implemented using any combination of past, current, or future XR technologies and/or XR devices. Moreover, for readability, "using XR," "with XR," or similar phrases may be used herein as shorthand for more unwieldy phrases, such as "using one or more XR devices, XR technologies, or XR environments," or similar phrases.

Unless expressly stated to the contrary, "or" refers to an inclusive or and not to an exclusive or. For example, "A, B, or C" refers to any combination or subset of A, B, C such as (1) A alone, (2) B alone, (3) C alone, (4) A with B, (5) A with C, (6) B with C, and (7) A with B and with C.

Reference will now be made in detail to non-limiting embodiments, some of which are illustrated in the accompanying drawings.

Exemplary Extended Reality (XR) System

FIG. 1 is a schematic diagram of an exemplary XR system 100, in accordance with various embodiments of the present disclosure. In various embodiments, the exemplary XR system 100 may provide, using one or more XR devices or one or more XR technologies, one or more XR environments (i.e., virtualized environments) to a party 101. The XR environments may enable the party 101 to capture, provide, manage, use, or otherwise handle various types of home-related data related to a real property (e.g., a home 102, and a property 103 associated with the home 102), or belongings to (i) submit and handle a home-related insurance claim for damage to the home 102, property 103, or belongings that resulted from a damage-causing event; (ii) obtain a quote for insurance for the home 102, property 103, or belongings; (iii) identify damage risks and mitigation options for the home 102, property 103, or belongings; and/or (iv) obtain internal and/or external potential remodeling or upgrade projects for the home 102, property 103, or belongings.

In FIG. 1, the home 102 is a single-family home that was damaged when wind caused (i) a branch 104 of a tree 105 to fall onto and through a roof 106 of the home's garage 107, landing on a car 108 in the garage 107, and (ii) a patch of shingles 109 to be blown off the home's main roof 110. Other example damage-causing events include damage resulting from any other events, conditions, etc., such as a storm, ice, snow, water, fire, lightning, a flood, a mudslide, an earthquake, a hurricane, a tornado, objects or vehicles striking the home, an electrical fault, a leaking pipe, faulty wiring, a leaking roof, or settling or collapse due to a damaged foundation. However, these examples are non-limiting, and the home 102, the property 103, or belongings may instead be damaged by any other kind of external or internal event(s) and/or condition(s). The party 101 may, or may not, be in the home 102 or on the property 103 at the time of the damage-causing event. While an exemplary single-family home 102 and property 103 are depicted in FIG. 1, the home 102 may be any type of home including, but not limited, to a single-family home, a duplex, a townhouse, an apartment, or a condominium, and may be located anywhere on any kind of property.

In some examples, one or more other persons 111 are present at, or nearby, the home 102 or property 103, and may be witnesses to a damage-causing event or a resulting damage scene 112. In some examples, at least one of the persons 111 is a witness to, or involved in, the damage-causing event. For example, the person 111 may be visiting at the home 102 when a storm occurred, etc. However, persons 111 need not be directly involved in the damage-causing event, so long as those persons 111 were in the vicinity of the home 102.

A person 111 may be a witness to the damage scene 112 before, during, or after the damage-causing event. For example, a person 111 may arrive at the damage scene 112 after the damage-causing event has already occurred. While not a witness to the damage-causing event itself, such persons 111 may become aware of conditions associated with the damage-causing event, or damage or injuries caused by the damage-causing event.

Such a person 111 may be, for example, a government official, a police officer, a security officer, or a person associated with a provider of post-damage event activities or services, such as a representative of an insurance company (e.g., an agent or claims adjuster) that collects information for an insurance claim filed by the party 101 for damage or injuries resulting from the damage-causing event. Other examples may include a representative or agent of a company providing, for example, remodeling services, risk mitigation services, disaster recovery services, remedial services, home repair services, automotive repair services, automotive towing or transport services, plumbing services, electrical services, health or medical services, or any other services that be needed following a damage-causing event to the home 102, property 103, or belongings. It should be understood that the above examples are non-limiting, and that other persons, witnesses or non-witnesses, are contemplated.

In various examples, the party 101, the person(s) 111, or any other persons in the vicinity of the home 102, the property 103, or the damage scene 112 may (i) capture or otherwise record data 113 relating to the damage-causing event, the damage scene 112, damages, or injuries, and (ii) transmit, transfer, upload, or otherwise provide the data 113 to one or more provider servers 114 via any number and/or type(s) of public or private computer networks 116, such as the Internet. The data 113 may be captured or otherwise recorded using real-world interactions, using XR, or combinations thereof. Exemplary data 113 relating to a damage-causing event represents, or is associated with, the damage scene 112, the damage-causing event, damage to a home 102, property 103, or belongings, a geographic region associated with the damage-causing event, damage to objects, injuries to persons, events surrounding the damage-causing event, and/or conditions at the time of the damage-causing event.

For example, the data 113 may be one or more images, videos, and/or video frames of the home 102, property 103, or belongings, and/or the damage scene 112 before, during, or after the damage-causing event. The images, videos, and/or video frames may represent (i) how or why the damage-causing event occurred; (ii) what was happening leading up to the damage-causing event; (iii) what was happening during the damage-causing event; (iv) what was happening after the damage-causing event; (v) damage to the home 102, property 103, and/or belongings, or any other vehicle, belonging, or person involved in the damage-causing event; and/or (vi) conditions during the damage-causing event. Images and videos may be captured or recorded the party 101, the person(s) 111, or any other persons using any number and/or type(s) of devices including XR or non-XR devices, such a camera, a video recorder, a digital camera, a digital video recorder, a mobile phone 118 having a camera, a smart phone, a tablet, smart glasses 120, an XR headset 122, and a personal computer/laptop 124.

In various examples, other data 113 related to the home 102, the property 103, or belongings may be obtained using, or from, any number and/or type(s) of others devices, such as drones, satellites, helicopters, planes, traffic cameras, smart infrastructure, security cameras, map or satellite databases, weather databases, health or medical insurance systems, for example.

In other embodiments, data 113 related to the home 102, property 103, or belongings, or a damage-causing event may be one or more written or verbal statements made or provided by one or more persons. In some examples, the statements are made to, for example, a government official, a police officer, a security officer, or an insurance company representative, for example. Such statements may be made contemporaneously to the damage-causing event, or made at a later date or time.

In some embodiments, data 113 may have associated metadata that is automatically added to file(s) or record(s) containing the data 113 by, for example, the device(s) used to capture the data 113. Exemplary metadata includes location, orientation, date, and time information that is automatically added to image or video file(s) captured by a computing device having a camera, such as the mobile phone 118, the smart glasses 120, or the headset 122.

The party 101 may also capture data 113 relating to the home 102, the property 103, or belongings in other ways and/or for other uses. For example, the server(s) 114 may provide, via or using one or more XR devices 126 associated with the party 101, one or more XR environments that the party 101 may use to capture data 113. In some embodiments, the server(s) 114 may provide one or more exemplary XR environments that methodically guide the party 101 using an AR-based XR device 126 (e.g., the smart glasses 120) to move throughout and/or around the home 102 or the property 103, and capture data 113 (e.g., images or videos) of various features of the home 102 (e.g., inside and outside), the property 103, or belongings as they move through and/or around the home 102 or property 103. For example, the server(s) 114 may provide step-by-steps instructions constructed to guide the party 101, and/or prompts to direct the party 101 to capture images or videos. For example, "take a picture of the room," "take a picture of the TV," "turn left into the kitchen," etc.

One or more exemplary XR environments may guide the party 101 to methodically move throughout and/or around the home 102 or property 103, such that the server(s) 114 may identify, infer, estimate, or otherwise determine a layout of rooms, hallways, etc. (or, more generally, of the home 102), and/or dimensions of rooms, hallways, etc. (or, more generally, of the home 102). The exemplary XR environment(s) may also methodically cause the party 101 to capture images or videos of as many features of the home 102, property 103, and belongings as possible. Exemplary features include, but are not limited to, home features, home layout, construction features, furnishings, materials, belongings, etc. In some embodiments, the server(s) 114 may further use the XR environment(s) to cause the party 101 via or using their XR device(s) 126 to annotate, or otherwise provide, details or information related to belongings that appear in images, videos, and/or video frames. For example, the XR environment(s) may prompt or cause the party 101 to provide details or information such as (i) category, make, model, cost, age, etc. of an object (e.g., an appliance, a television, a computer, a furnace, a vehicle, a boat, a watch, etc.), (ii) materials appearing in an image (e.g., brick, vinyl siding, metal roofing, shingles, flooring material, countertop material, wall coverings), (iii) ceiling heights, or (iv) dimensions, to name a few.

In some embodiments, the party 101 may use spoken commands to control the XR device(s) 126 to capture images or videos, and annotate or provide information or details regarding the home 102, property 103 and belongings appearing in the images, videos, and/or video frames as they are captured. For example, the party 101 may, while looking at a television using the AR smart glasses 120, say "take picture," followed by saying "BrandA 50 inch high definition television." As another example, the party 101 may, while looking at a floor in a room using the AR smart glasses 120, say "take picture," followed by saying "solid quarter-sawn oak plank flooring." As another example, the party 101 may, while looking at the front of the home using the AR smart glasses 120, say "take picture," followed by saying "colonial style two story home, two thousand square feet, attached one stall garage, brick façade on front, vinyl siding on sides and back, twenty-five year asphalt shingles installed ten years ago." The party 101 may, additionally and/or alternatively, provide related information or details at a later time for previously captured images or videos. In various embodiments, the server(s) 114 may include in asset data being automatically generated the related information or details, or a representation thereof, along with the images or videos.

In some embodiments, the server(s) 114 may, as belongings or features of the home 102, property 103 appear in the party's XR device(s) 126, automatically identify the belonging(s) or feature(s), automatically determine related information or details, and cause the XR device(s) 126 to capture images or videos of the identified belongings(s) or feature(s). The server(s) 114 may use, for example, one or more configured and trained machine learning (ML) models to identify belongings or features, in some embodiments.

In various embodiments, the server(s) 114 may, as needed, prompt the party 101 to identify a belonging or feature when they cannot be automatically determined. For example, the server(s) 114 may designate a belonging or feature in an image or video (e.g., by displaying a rectangle or circle around the belonging or feature), and prompt the party 101 to identify the belonging or feature, and/or provide related details or information. The server(s) 114 may likewise designate multiple belongings or features, such that the party 101 may virtually select, e.g., using gestures, one of the designated belongings or features, identify the belonging or feature, and/or provide related details or information using, for example, spoken, written, or typed words. Additionally and/or alternatively, in some embodiments, the server(s) 114 may identify belongings and their related details or information in previously captured images, videos, and/or video frames.

Additionally and/or alternatively, in some embodiments, an exemplary XR environment(s) may cause, in conjunction with an image or video (e.g., as they are captured, or at a later time), a text entry box to appear that the party 101 may use to identify an belonging or feature, and/or provide related data or information using a physical or virtual keyboard. The exemplary XR environment(s) may, additionally and/or alternatively, present or provide a list of one or more selectable belongings or features such that the party 101 may virtually select, e.g., using gestures, a particular belonging or feature on the list for the feature or belonging appearing in an image or video. The exemplary XR environment(s) may likewise provide a list of related data or information potentially applicable to an identified feature or belonging such that the party 101 may virtually select, e.g., using gestures, related details or information.

As described further below, the server(s) 114 may also process (e.g., using one or more configured and trained ML models) such methodically captured data 113 related to the home 102, property 103, or belongings to (i) generate one or more insurance policy quotes (e.g., for home insurance, watercraft insurance, vehicle insurance, or personal articles insurance), (ii) identify potential damage risks to the home 102, property 103, or belongings, and determine corresponding mitigation options, (iii) identify discount offers if/when risks are mitigated, and/or (iv) identify and propose remodeling or upgrading projects.

Exemplary Extended Reality (XR) Devices

In some embodiments, the party 101 may use XR via or using their XR device(s) 126 to virtually interact, wholly or partially, with the server(s) 114 for handling home-related information. For example, the party 101 may use one or more of the mobile phone 118, the smart eyeglasses 120, the headset 122, or the computer 124 to use XR to virtually interact with the server(s) 114, and/or representatives associated with the server(s) 114 (e.g., an insurance agent or claim adjuster) to handle home-related information.

As described above, in various embodiments, an XR device may have any number and/or type(s) of input controls that enable a person, such as the party 101, to input data, or select options from menus, lists, selectable graphics, or other items as displayed on a user interface screen of the XR device. The input controls may allow the person to provide commands to the XR device, such as (i) when and how to capture images or videos; (ii) how to augment, annotate, or otherwise provide additional related details or information associated with captured images or videos; (iii) provide further details or information related to the damage-causing event, or, more generally; and/or (iv) control operation(s) of the XR device. For example, the input controls may be used to capture images or videos, and augment captured images, videos, and/or video frames with one or more annotations, including any of text-based annotation, voice-based annotations, graphical annotations, video-based annotations, AR annotations, or MR annotations. In some embodiments, information related to annotations may be saved with the associated image(s) or video(s), or as separate file(s) associated with the images or videos. Additionally or alternatively, input controls of an XR device may be used to write, type, or speak text, or other content.

An XR device may also include one or more output devices, such as one or more displays or speakers that allow the XR device to display or present virtual computer-generated content associated with an XR environment. Exemplary generated content may include visual content, audible content, or combinations thereof. In some examples, only virtual content may be presented by an XR device such that a person may be fully immersed in an XR environment. Additionally and/or alternatively, the virtual content may be displayed on top of, alongside, or otherwise in combination with real-world content such that a person may be only partially immersed in an XR environment. In some embodiments, an exemplary XR environment may cause the one or more output devices to present or provide guidance instructions or directions to a person to, for example, guide the person or wearer to navigate throughout and/or around a home 102 or property 103, and to present or provide prompts to the person to prompt them to capture data 113 (e.g., images or videos) related to the home 102, the property 103, or belongings, and/or annotate the images, videos, and/or video frames. In one example, the person is using an AR device, such as the smart glasses 120, on which the instructions and prompts can be overlaid on real-world content the person is seeing as they move throughout and/or around a home 102 or property 103.

Other persons (e.g., a person 111) may likewise capture, annotate, transmit, transfer, upload, or otherwise provide their data 113 to the server(s) 114 using XR, as discussed above, or using any other techniques for providing captured data 113 to the server(s) 114. However, in some examples, the party 101 may be the only one who captures data 113.

In some embodiments, the server(s) 114 may collect sensor data 128 from, or using, any number and/or type(s) of sensors 130 associated with, for example, the home 102, property 103, or belongings, an area surrounding the home 102 or property 103, a geographic region including the home 102 or property 103, etc. The server(s) 114 may obtain the sensor data 128 from, or using, the sensors 130, directly or indirectly, via the network(s) 116. For example, the server(s) 114 may request sensor data 128 from the sensors 130. Additionally and/or alternatively, the sensors 130 may periodically and autonomously provide or report their sensor data 128 to the server(s) 114 or another server or data source storing sensor data. The sensor data 128 may be related to, or representative of, any sensed condition(s) of the home 102, property 103, or belongings, a damage scene 112, a damage-causing event, a geographic region, etc. Exemplary sensors 130 may include any sensor(s) associated with the home 102, property 103, or belongings, smart infrastructure devices, or IoT devices, to name some. Exemplary sensors 130 may include water sensors, water leak sensors, sump pump level sensors, temperature sensors, smoke detectors, radon sensors, fire detectors, natural gas leak sensor, security system sensors, and security cameras, furnace malfunction sensors, home telematics (e.g., home occupancy sensors), and usage sensors (e.g., gas, water, or electricity usage sensors or meters). However, any type(s) of sensors 130 may be used to capture any other type(s) of sensor data 128.

For example, the party 101 may use, or be directed by the server(s) 114 to use, one or more sensors 130 that are configured to sense belongings or conditions within a cavity or area, such as a wall, crawlspace, attic, etc. of the home 102, and/or to measure characteristics or conditions of the cavity or area, such as moisture content. Examples of such sensors 130 may include sensors that use technologies that can sense magnetic fields, capacitance, a dielectric constant, an electrical resistance, imaging, etc. that can sense studs, electrical cables, plumbing, moisture, etc. inside a wall. Some such sensors 130 are commercially available. Such sensors 130 may be used to develop an understanding of what is inside a wall and/or what conditions are present within the wall.

The server(s) 114 may use such information to generate a virtual reconstruction 142 of what may have happened within the wall that led to sensed conditions, and/or detected damage. For example, if there was a fire in a room that caused some damage before being extinguished, the party 101 may use, or be directed to use, his smart glasses 120 to survey the damage scene, and then use a depth or other sensor in a suspect region of the wall to determine whether there is wiring within the wall in that region, which may be helpful in determining whether a wiring fault may have caused the fire and, thus, the damage. Likewise, when water damage occurs, the party 101 may use, or be directed to use, a moisture sensor to detect moisture in a wall and/or then use a sensor that can detect plumbing within the wall to determine if there is plumbing in the vicinity of the moisture, which may be helpful in determining whether a plumbing leak in the wall may have caused the water damage. Such sensor information may also be used to identify potential damage risks, such as potentially faulty wiring or potential water leaks due to hidden wiring or plumbing. Such sensor information may further be used to determine when repairs/replacement may require accessing a cavity or area, wherein such access may cause further work to repair tear out required to access the cavity or area.

The server(s) 114 may also obtain other types of additional data 132 related to the home 102, the property 103, belongings, an area surrounding the home 102 or property 103, or a geographic region including the home 102 or property 103 from, or using, any number and/or type(s) of other sensors, devices, or data sources 134, such as a traffic camera, a surveillance camera, a security camera, a weather information data source (e.g., temperature, precipitation, sunrise, sunset, wind, etc. provided by a weather service), a weather service, a weather sensor, a satellite, a drone, a map database, or a street view database.

Exemplary Insurance Provider Server(s)

In some embodiments, the servers(s) 114 may be associated with a provider of pre- and/or post-damage event activities or services, such as an insurance company providing home-related insurance, processing home-related insurance claims, quoting insurance policies, providing proactive risk-mitigation services or recommendations, and/or providing remodeling recommendations, for example. It is to be understood that, while embodiments herein describe the server(s) 114 as being associated with an insurance company, the server(s) 114 may, additionally and/or alternatively, be associated with other companies or individuals that may have an interest in providing any other services or activities related to the home 102, property 103, or belongings, and/or belongings associated therewith. Exemplary companies or individuals provide remodeling services, risk mitigation services, disaster recovery services, remedial services, home repair services, automotive repair services, automotive towing or transport services, plumbing services, electrical services, health or medical services, or any other services that be needed following a damage-causing event to the home 102 or property 130, for example.

The provider servers(s) 114 may include any number(s) and/or type(s) of physical server computers or virtual, cloud-based servers, which may operate as a server farm, and may include one or more processors, one or more computer memories, and software or computer instructions for handling home-related data. The server(s) 114 may be local to, or remote from, the XR device(s) 126, or XR device(s) 138 associated with an insurance representative 140 (e.g., an insurance agent or claim adjuster).

In some embodiments, the XR device(s) 126, 138, the sensors 130, and the data sources 134 may be communicatively coupled to the network(s) 116 via any number and/or type(s) of wired or wireless networks. For example, the XR device(s) 126, 138, the sensors 130, and/or the data sources 134 may be communicatively coupled to the network(s) 116 via any number and/or type(s) of wireless or cellular base stations 136. The base station(s) 136 may be implemented in accordance with any number and/or type(s) of communications standards including Global System for Mobile Communications (GSM), Code Division Multiple Access (CDMA), Universal Mobile Telecommunications System (UMTS), Long Term Evolution (LTE), 3G, 4G, 5G, or the Institute of Electrical and Electronics Engineers (IEEE) 802.11x family of standards. Additionally and/or alternatively, the XR device(s) 126, 138, the sensors 130, and/or the data sources 134 may be communicatively coupled to the network(s) 116 via any number and/or type(s) of wired interfaces, such as an Ethernet interface. However, the data 113, 128, and 132 may be provided to the server(s) 114 in any other ways, including removable storage media or any type(s) of input/output interface, such as a universal serial bus (USB) interfaces, a near-field communication (NFC) interface, or a Bluetooth® interface.

In some embodiments, the server(s) 114 may receive or obtain data 113, 128, and 132 in response to a request sent to XR device(s) 126, 138, sensors 130, or data sources 134 that capture and store the data 113, 128, and 132. Additionally and/or alternatively, the data 113, 128, and 132 may be provided to the server(s) 114 without it being requested. For example, a user may, solicited or unsolicited, use XR to navigate an XR environment provided by the server(s) 114 to submit or transfer data 113 from the XR device(s) 126, 138 to the server(s) 114. The data 113, 128, and 132 provided to the server(s) 114 may be in any form, such as digital or digitalized images or videos, annotations, metadata associated with images, videos, and/or video frames, or digital representations of written or verbal statements (e.g., scanned or translated).

In some embodiments, the server(s) 114 may generate virtual content, and display or provide the virtual content to the XR device(s) 126, 138 as one or more XR environments for presentation to a user, and receive and respond to input(s) from the user via input controls of the XR device(s) 126, 138 to generate one or more interactive XR environments that enable the user to handle various types of information related to a home 102, a property 103, or belongings, such as (i) submitting and handling an insurance claim for damage to the home 102, property 103, or belongings that resulted from a damage-causing event; (ii) obtaining a quote for insurance for the home 102, property 103, or belongings; (iii) obtaining a risk assessment; (iv) recommending mitigation options for identified potential risks; and/or (v) obtaining remodeling recommendations for the home 102.

In various embodiments, the server(s) 114 may provide or support one or more interactive XR environments that enable the party 101 to capture and provide data 113 related to a damage-causing event. For example, the XR device(s) 126 may be used to provide an AR experience that enables the party 101 to view real-world content, capture real-world content as images or videos, and augment captured content with annotations. Exemplary annotations include indications of what part of the home 102, property 103, or belongings were damaged, a damage scene associated with the damage, what was happening when a damage-causing event occurred, what happened after a damage-causing event, conditions at the time of the damage-causing event, etc.

Additionally and/or alternatively, in some embodiments, the server(s) 114 may provide, via or using one or more XR devices 126 associated with the party 101, one or more XR environments that the party 101 may use to methodically capture data 113 related to the home 102, property 103, or belongings, as described in detail above.

In some embodiments, the server(s) 114 may also provide or support one or more interactive XR environments that enable the party 101 to provide data related to themselves. For example, the server(s) 114 may provide one or more XR environments that enable the party 101 to indicate or provide personal data, such as username, password, telephone number(s), social media data, financial account data, insurance policy(-ies), insured assets (e.g., the home 102, property 103, or belongings), etc. The provided data may also represent the party's XR or metaverse preferences, XR interaction preferences (e.g., prefer to use VR over AR, only use AR, a preferred avatar, preferred metaverse or other setting/scene for virtual meetings to take place, etc.), type(s) of or identifier(s) for insured party's XR device(s), willingness to hold virtual meetings (rather than real-world meetings) with an insurance representative 140, etc. The server(s) 114 may use such data to access files, accounts, or records associated with the party 101, and/or to generate, customize, personalize, or configure an XR environment in accordance with the party's XR preferences.

Exemplary Insurance Claim Processing

In some embodiments, the server(s) 114 may use (i) captured data 113 relating to a damage-causing event, a damage scene, or damages or injuries, (ii) sensor data 128 obtained from, or using, the sensors 130, and/or (iii) additional data 132 obtained from, or using, the other data sources 134 to process a home-related insurance claim. For example, the server(s) 114 may (e.g., using one or more configured and trained ML models) process the data 113, 128, and 132 to identify problem(s) that caused, or may have caused, the damage (e.g., a storm, high wind, ice, snow, water, fire, lightning, a flood, a hurricane, a tornado, a mudslide, an earthquake, objects or vehicles striking the home, an electrical fault, a leaking pipe, faulty wiring, a leaking roof, or settling or collapse due to a damaged foundation). Additionally and/or alternatively, the data 113, 128, and 132 may be used by an insurance representative 140 to determine, if possible, an actual or probable fault or cause of a damage-causing event. In some embodiments, the insurance representative 140 may access the data 113, 128, and 132 using their own XR device(s) 138.

In some embodiments, the data 113, 128, and 132 may be used by the server(s) 114 to automatically generate a virtual reconstruction 142 of a damage-causing event. In some embodiments, the server(s) 114 may provide one or more XR environments that enable the party 101 to, via or using their XR device(s) 126, construct, build, or define the virtual reconstruction 142 as they describe the damage-causing event verbally, using text, or using movable icons. In some embodiments, the party 101 and the insurance representative 140 may meet virtually in a collaborative XR environment such that they may collaboratively construct, build, or define the virtual reconstruction 142.

In some embodiments, the virtual reconstruction 142 may be downloaded to and presented in an insurance representative's XR device(s) 138 to enable the insurance representative 140 to identify, an actual or probable fault or cause (e.g., weather, etc.) contributing to the damage-causing event or the damage scene 112. In some embodiments, the virtual reconstruction 142 may also be downloaded to and virtually presented in a party's XR device(s) 126 such that the party 101 may review, modify, and/or approve the virtual reconstruction 142 using XR. The virtual reconstruction 142 may also be downloaded to and virtually presented in an insurance representative's XR device(s) 138 such that the insurance representative 140 may review, modify, or approve the virtual reconstruction 142 using XR. In some embodiments, the party 101 and the insurance representative 140 may meet virtually in a collaborative XR environment such that they may collaboratively review, modify, or approve the virtual reconstruction 142 using XR. In some embodiments, a collaborative XR environment may include a virtual meeting of the party 101 and the insurance representative 140 in a virtual office or meeting space.

In certain embodiments, the server(s) 114 may cause the verified model or virtual reconstruction 142 to be stored on a distributed ledger, such as a blockchain, for remote viewing and/or to facilitate subrogation, claim processing, dispute resolution, etc. In some embodiments, the server(s) 114 may cause the verified model or virtual reconstruction 142 to be stored on the distributed ledger by sending the verified model or virtual reconstruction 142 to one or more nodes of a plurality of nodes maintaining the distributed ledger. In response and on behalf of the server(s) 114, the one or more nodes may attempt to form a cryptographic consensus as to how the verified model or virtual reconstruction 142 is to be integrated into the distributed ledger, and, if consensus is obtained, provide the verified model or virtual reconstruction 142 to the plurality of nodes such that each node may add the verified model or virtual reconstruction 142 to respective copies of the distributed ledger. Additionally and/or alternatively, the server(s) 114 may be one of the nodes maintaining the distributed ledger, and may work directly with the other nodes to form a cryptographic consensus for the virtual reconstruction 142 and, when consensus is obtained, cause the other nodes to store the virtual reconstruction 142 on respective copies of the distributed ledger. Certain embodiments may also use computer vision and/or connected infrastructure data to resolve disputes associated with damage-causing events.

In some embodiments, the server(s) 114 may use the data 113, 128, and 132 to determine claim information 144 for a party's or insurance representative's review, modification, or approval. The claim information 144 may include one or more of (i) estimated repair or replacement costs; (ii) repair or replacement materials; (iii) a repair reconstruction; (iv) a repair schedule; and/or (v) a pre-populated virtual insurance claim. In certain embodiments and similar to how the virtual reconstruction 142 may be stored, the server(s) 114 may cause the claim information 144 to be stored on a distributed ledger, such as a blockchain, for remote viewing and/or to facilitate subrogation, claim processing, dispute resolution, etc.

In some embodiments, the server(s) 114 may use data 132 relating to what is found within a wall, and/or conditions within the wall (as described above) to determine whether a condition within a wall may be indicative that a cause of the damage may be within a wall cavity, which may increase the costs, in materials or labor, to repair the home 102 after a damage-causing event.

In some embodiments, the server(s) 114 may (e.g., using one or more configured and trained ML models) determine the claim information 144 to indicate belongings, materials, etc. for repair/replacement. In some embodiments, one or more first ML models may be configured, trained, and used to process inputs from the data 113, 128 and/or 132 to determine outputs that identify what part(s) of a home 102, a property 103, or belongings were damaged, etc. Moreover, one or more second ML models may be configured, trained, and used to process inputs from the data 113, 128 and/or 132, and data regarding similarly constructed homes and/or similar belongings damaged in similar ways, to determine outputs that represent the damage that occurred. Further still, one or more third ML models may be configured, trained, and used to process inputs representing costs of repairs or replacements for similar damage, costs of labor, costs of parts, and/or geographic location of the home 102 or property 103 to determine outputs that represent estimated repair and/or replacement costs, and/or repair and/or replacement materials. In some embodiments, some of the first, second, and third ML models may be combined. The server(s) 114 may pre-populate an insurance claim based upon the estimated repair or replacement costs, and repair or replacement materials. For example, using a generated list of inventory of belongings (described below), the insurance claim, when approved, may automatically trigger the purchase of, or payout for, the damaged belongings, or replacements thereof.

In some embodiments, the server(s) 114 may generate one or more visual depictions 146 of the claim information 144. The visual depiction(s) 146 may be downloaded to and presented in a party's XR device(s) 126 such that party 101 may review the visual depiction(s) 146, and adjust, modify, and/or approve the claim information 144. The visual depiction(s) 146 may also be downloaded to and presented in an insurance representative's XR device(s) 138 such that the insurance representative 140 may review the visual depiction(s) 146, and modify or approve the claim information 144. In some embodiments, the party 101 and the insurance representative 140 may meet virtually in a collaborative XR environment or XR experience such that they may collaboratively review the one or more visual depiction(s) 146, and adjust, modify, or approve the claim information 144. For example, visual depiction(s) 146 could include an automatically generated list of belongings for replacement, or payout, upon approval of the visual depiction(s) 146.

In various embodiments, the server(s) 114 may, additionally and/or alternatively, process (e.g., using one or more configured and trained ML models) data 113 related to the home 102, property 103, or belongings captured, as described above, while methodically moving throughout and/or around a home 102 or property 103 to (i) generate one or more insurance policy quotes (e.g., for home insurance, watercraft insurance, vehicle insurance, or personal articles insurance); (ii) identify potential damage risks to the home 102, property 103, or belongings, and corresponding mitigation options; (iii) identify discount offers if/when risks are mitigated, and/or (iv) identify and propose remodeling projections.

Exemplary Insurance Quotes

In some embodiments, the server(s) 114 may process the data 113, 128, and 132 (e.g., using one or more configured and trained ML models) to generate asset data, and to generate, based upon the asset data, any type of insurance quote, such as a homeowners insurance quote, a personal articles insurance quote, an auto insurance quote, or a home loan. In some embodiments, for parametric insurance, the server(s) 114 may process the data 113, 128, and 132 to determine a home value or belongings value used to generate a home loan offer, or to determine a home replacement value used to generate a home insurance quote. The server(s) 114 may also process the data 113, 128, and 132 to (i) determine insurance coverage needs, endorsements, riders, etc.; (2) identify gaps in coverage (e.g., identify a boat or a vehicle stored on the property 103, or an extra structure on the property 103 that is currently uninsured or underinsured); and/or (3) generate a personal articles insurance quote. The server(s) 114 may use the generated asset data in the event of a total home loss event (e.g., a wildfire, home fire, hurricane, or tornado) as part of the automatic generation of the claim information 144.

In some embodiments, the server(s) 114 may generate one or more visual depictions 146 of determined asset data, valuations, and/or generated quotes. The visual depiction(s) 146 may be downloaded to and presented in a party's XR device(s) 126 such that party 101 may, using XR, review the visual depiction(s) 146, and adjust, modify, or approve the determined asset data, valuations, and/or generated quotes. The visual depiction(s) 146 may also be downloaded to and presented in an insurance representative's XR device(s) 138 such that the insurance representative 140 may review the visual depiction(s) 146, and modify or approve the determined asset data, valuations, and/or generated quotes. In some embodiments, the party 101 and the insurance representative 140 may meet virtually in a collaborative XR environment such that they may collaboratively review the one or more visual depiction(s) 146, and adjust, modify, or approve determined asset data, valuations, and/or generated quotes.

Exemplary Home Remodeling Recommendations

In some embodiments, the server(s) 114 may process the data 113, 128, and 132 (e.g., using one or more configured and trained ML models) to facilitate home remodeling (e.g., kitchen or bathroom remodeling). For example, the server(s) 114 may process the data 113, 128, and 132 to (i) identify internal and/or external areas of the home 102 or property 103, or belongings for potential remodeling or upgrading, determine current materials, shapes, sizes, dimensions, etc. of the areas, and (ii) determine potential updated configurations, materials, costs, etc. to be used in completing potential remodeling projects. For example, remodel a kitchen, remodel a bathroom, replace an older energy-inefficient furnace, etc. The server(s) 114 may generate one or more visual depictions 146 of the potential remodeling projects with different materials and/or configurations (e.g., different floors, stoves, refrigerators, counter tops, windows, different paint colors, etc.) including estimated costs for each potential remodel. In some embodiments, the server(s) 114 downloads and presents the visual depiction(s) 146 for the potential remodeling project(s) in a party's XR device(s) 126 such that party 101 may, using XR, review the visual depiction(s) 146, and modify or select potential remodel projects. When the party 101 selects a potential remodel project, the server(s) 114 may determine and present in the party's XR device(s) 126 using XR, potential contractors or financing options such that the party 101 may, using XR, select a particular financing option and/or contractor. In various embodiments, the server(s) 114 may facilitate completion of financing and/or engagement of a selected contractor.

Exemplary Damage Risk Mitigation

In some embodiments, the server(s) 114 may process the data 113, 128, and 132 (e.g., using one or more configured and trained ML models) to (i) identify potential damage risks, such as sources of water damage and/or other risks, such as hoses or pipes breaking or leaking, water heaters, toilet connections, washing machine hoses, dishwasher hoses, etc., and (ii) determine recommended mitigation options (e.g., corrective actions) for the identified potential damage risks. Other example damage risks that the server(s) 114 may identify include locations, positions, types of lights, and sensors that may improve home security, and potential damage due to trees, branches, ice, or damaged or worn shingles.

In some embodiments, the server(s) 114 may process the data 113, 128, and 132 to identify areas of potential damage (e.g., signs of water damage, fire damage, etc.), and direct the party 101 to use one or more sensors 130 to collect data 132 relating to what is found within a cavity, such as a wall, crawlspace, or attic, and/or conditions within the cavity (as described above). The server(s) 114 may process the data 132 to determine whether a condition within a cavity may be indicative of a cause of the potential damage, which may be used to determine mitigation options, including increased costs, in materials or labor, to access the cavity so that, for example, a wiring or plumbing issue can be corrected.

The server(s) 114 may generate one or more visual depictions 146 of potential risks or mitigation options. In some embodiments, the server(s) 114 downloads and presents the visual depiction(s) 146 in a party's XR device(s) 126 such that party 101 may, using XR, review the visual depiction(s) 146, and modify or select potential mitigation work. When the party 101 selects a mitigation option, the server(s) 114 may determine and present, using XR, potential contractors and associated costs, such that the party 101 may, using XR, select and engage a particular contractor. In various embodiments, the server(s) 114 may facilitate engagement of a selected contractor. In some examples, the server(s) 114 also determine and present, using XR, one or more discount offers that may be extended to the party 101 if/when they complete, or have completed, particular mitigation options. The server(s) 114 may apply such discounts when mitigation options been accomplished and, possibly, verified.

Exemplary Captured Images

Figure 2:
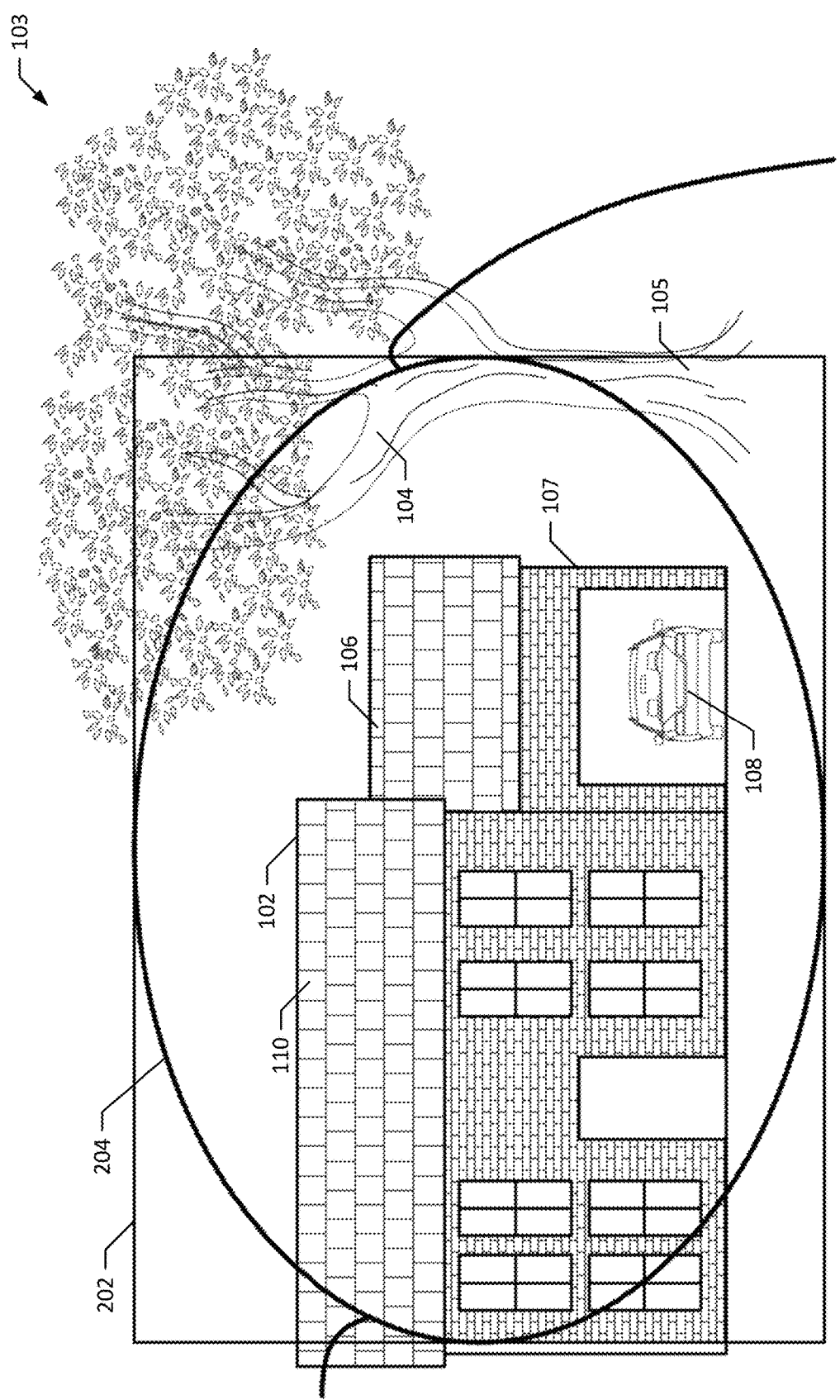
FIG. 2 is an image of an exemplary real property including a home and a property from a first vantage point.

FIG. 2 is an exemplary image 202 captured of the exemplary home 102 and property 103, from a first vantage point. In the depicted example, the first vantage point is in front of the home 102 looking straight at the home 102.

Figure 3:
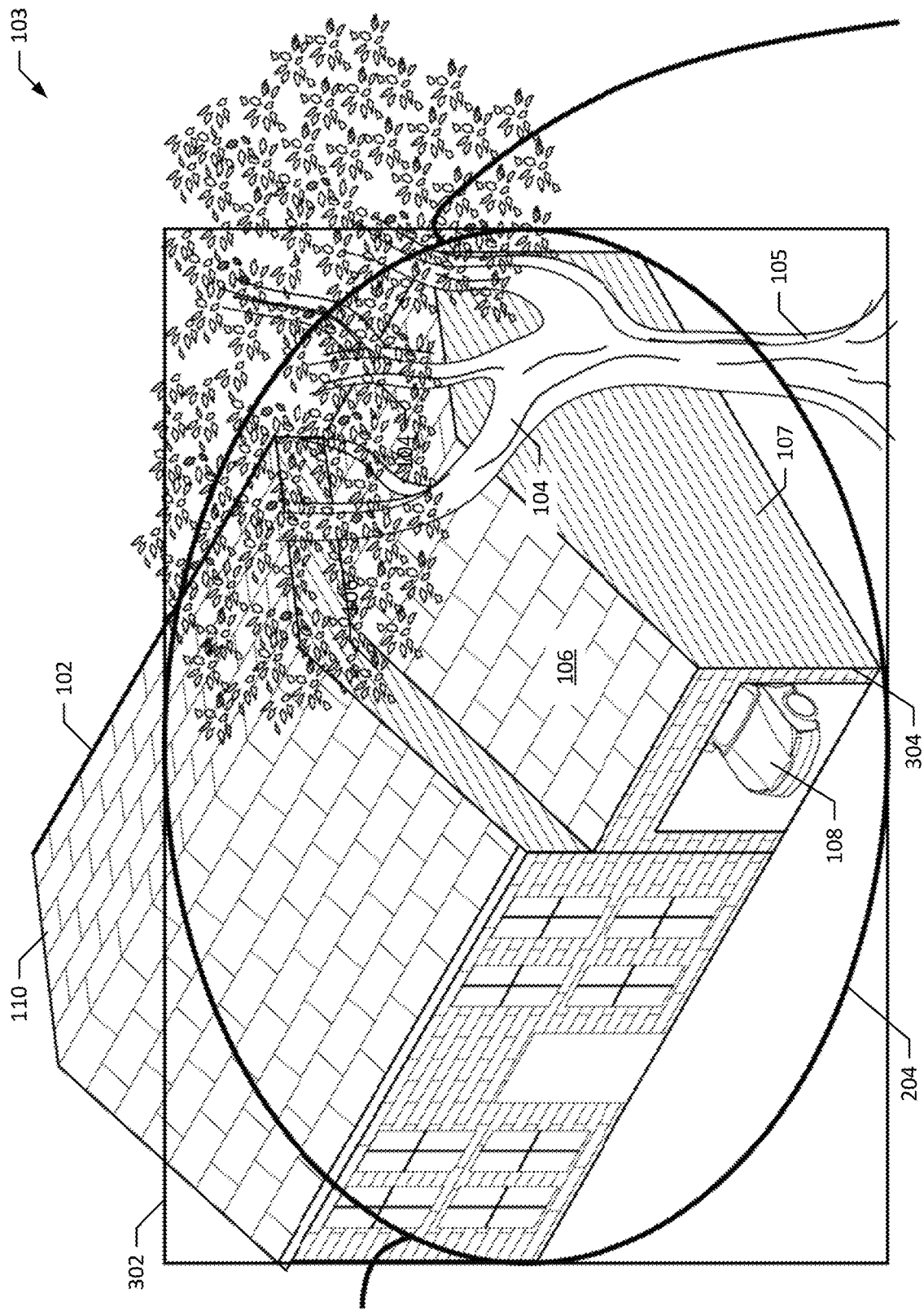
FIG. 3 is another image of the real property of FIG. 2 from a second vantage point.

FIG. 3 is an exemplary image 302 captured of the exemplary home 102 and property 103, from a second vantage point. In the depicted example, the second vantage point is above the home 102 looking towards a corner 304 of the home 102. In some examples, the party 101 may capture the exemplary image 302 using a drone, or from a position on a hill near the home 102.

While exemplary images 202 and 302 of the exemplary home 102 and property 103 are shown in FIGS. 2 and 3, any number and/or type(s) of other images of the exemplary home 102 and property 103 may be taken from any number and/or type(s) of other vantage points.

The party 101 may capture the exemplary images 202 and 302 by, for example, using one or more input controls of smart glasses 204 to control the smart glasses 204 to capture the images 202 and 302. The images 202 and 302 may form part of captured data 113 relating to the home 102 and property 103. In some embodiments, the server(s) 114 may use the images 202 and/or 302 as a starting point to generate a virtual reconstruction 142 of a damage-causing event involving the home 102, property 103, or belongings.

In some examples, the party 101 may, as described above in connection with FIG. 1, annotate the images 202 and/or 302, or otherwise provide, details or information related to the images 202 and/or 302 or, more generally, the home 102, property 103 or belongings. For example, the party 101 may use spoken words, a virtual or physical keyboard, or virtual or physical user interface(s) to provide related details or information. For example, in connection with the image 202, the party 101 may speak "colonial style two story home, two thousand square feet, attached one stall garage, brick façade on front, twenty-five year asphalt shingles installed ten years ago, and tree east of garage." For example, in connection with the image 302, the party 101 may speak "vinyl siding on sides and back, tree half way back along the garage about five feet from garage." In some embodiments, the server(s) 114 may use optical character recognition (OCR), text/speech recognition, and/or natural language processing (NLP) to translate such spoken, typed, or written text into a known/predetermined format (e.g., to convert "put on a new roof a few years ago" to data elements <roof><replacement><2-4 years>), which may then be stored as part of, or in conjunction with, the images 202 and/or 302.

Figure 4:
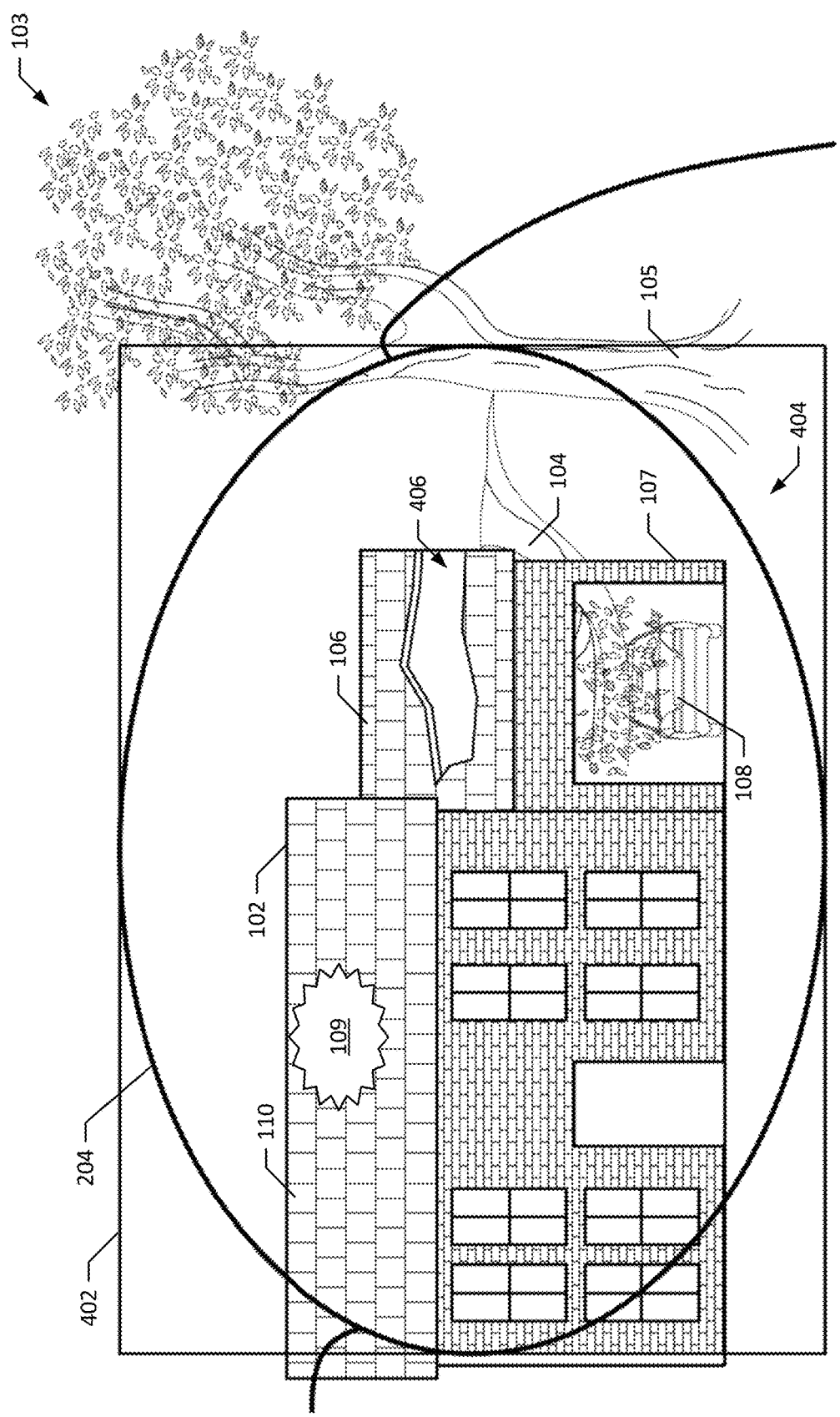
FIG. 4 is an image of an exemplary damage scene of an exemplary damage-causing event involving the real property of FIGS. 2 and 3 from the first vantage point.

FIG. 4 is an image 402 of an exemplary damage scene 404 resulting from a damage-causing event involving the home 102 and property 103 of FIGS. 2 and 3, from the first vantage point used to capture the image 202.

Figure 5:
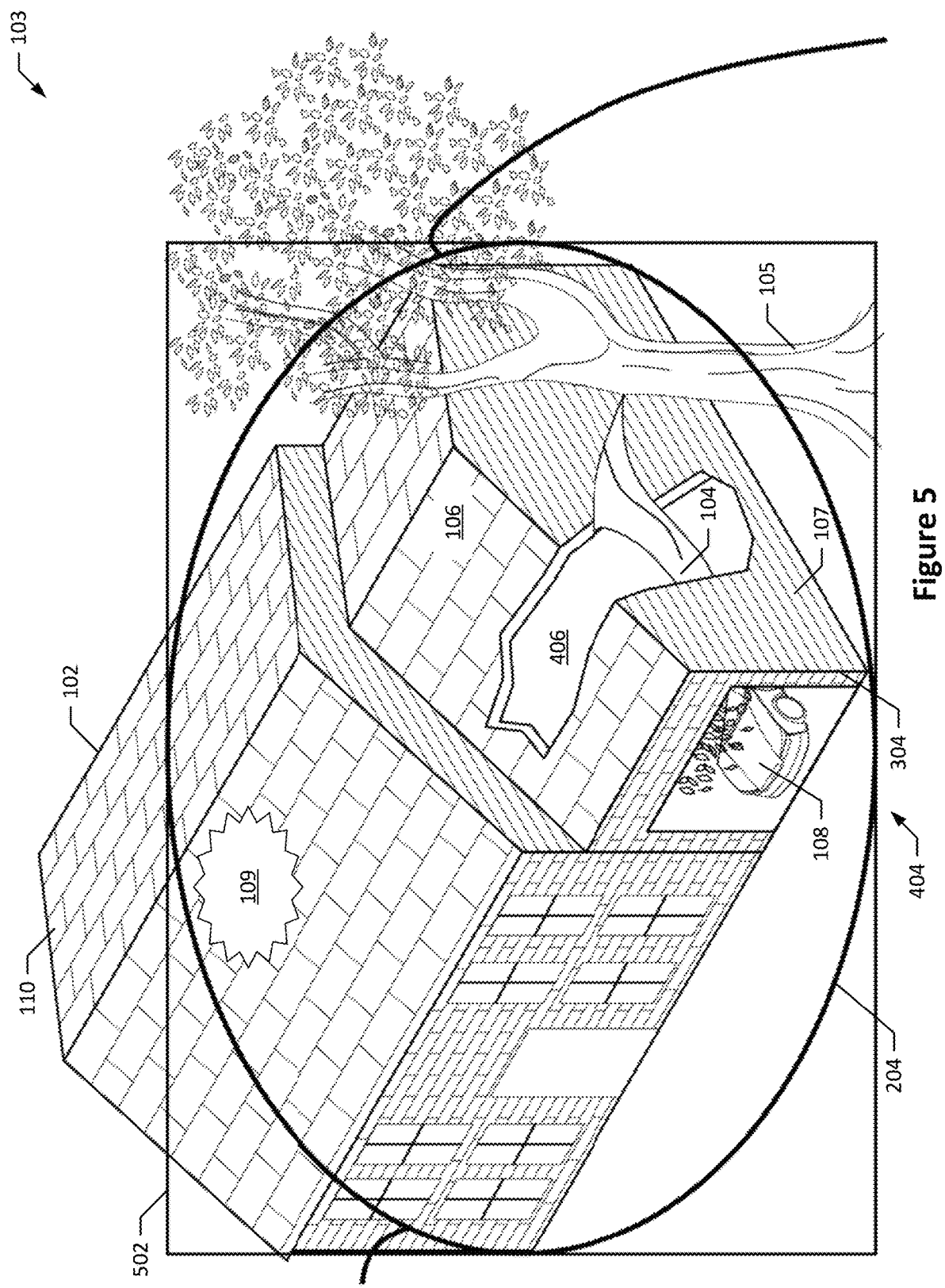
FIG. 5 is another image of the damage scene of FIG. 4 from the second vantage point.

FIG. 5 is an image 502 of the exemplary damage scene 404 of FIG. 4, from the second vantage point used to capture the image 302.

While exemplary images 402 and 502 of the exemplary damage scene 404 are shown in FIGS. 4 and 5, any number and/or type(s) of other images of the exemplary damage scene 404 may be taken from any number and/or type(s) of other vantage points.

The party 101 may capture the exemplary images 402 and 502 by, for example, using one or more input controls of the smart glasses 204 to control the smart glasses 204 to capture the images 402 and 502. The images 402 and 502 may also form part of captured data 113 relating to the damage-causing event shown in FIGS. 4 and 5 involving the home 102, property 103, or belongings.

In another example, the exemplary damage scene 404 shown in FIGS. 4 and 5 resulted from high winds. In the depicted damage scene 404, the high winds caused the branch 104 to fall onto and through the roof 106 of the home's garage 107 causing a hole 406 in the roof 106, and land on the car 108 that is in the garage 107. The high winds also caused the patch of shingles 109 to be blown off the home's main roof 110. While exemplary damage is shown in FIGS. 4 and 5, the home 102 or property 104 may be damaged in any number and/or type(s) of different ways by any number and/or type(s) of different causes.

In some examples, the party 101 may, as described above in connection with FIG. 1, annotate the images 402 and/or 502, or otherwise provide, details or information related to the images 402 and/or 502 or, more generally, the home 102, property 103, or belongings. For example, the party 101 may use spoken, typed, or written text to provide related details or information. For example, in connection with the images 402 and/or 502, the party 101 may speak "storm with high winds, branch fell from tree onto garage onto car in the garage, large dent in roof of the car, scratches all over the car, and missing shingles." In some embodiments, the server(s) 114 may use OCR, text/speech recognition and/or NLP to translate such spoken, written, or typed words into a known/predetermined format, which may then be stored as part of, or in conjunction with, the images 402 and/or 502.

In some embodiments, the server(s) 114 may use the images 402 and/or 502, and/or related details or information to, for example, generate a virtual reconstruction 142 of the damage-causing event involving the home 102, property 103, or belongings. For example, the server(s) 114 may use differences between the images 202, 302 and the images 402, 502 to determine what may have happened to result in the differences. For instance, the server(s) 114 may recognize that the branch 104 is no longer attached to the tree 105 but is partially within the garage 107 below the tree 105 to ascertain that the branch 104 fell from the tree, for some reason, and caused the damage shown in FIGS. 4 and 5. The server(s) 114 may also recognize that there doesn't appear to be a physical cause for the missing patch of shingles 109, but recognized from related information provided by the party 101 that high winds due to a storm occurred and, thus, may determine that the high winds likely caused the branch 104 to fall from the tree 105, and caused the missing patch of shingles 109.

Figure 6:
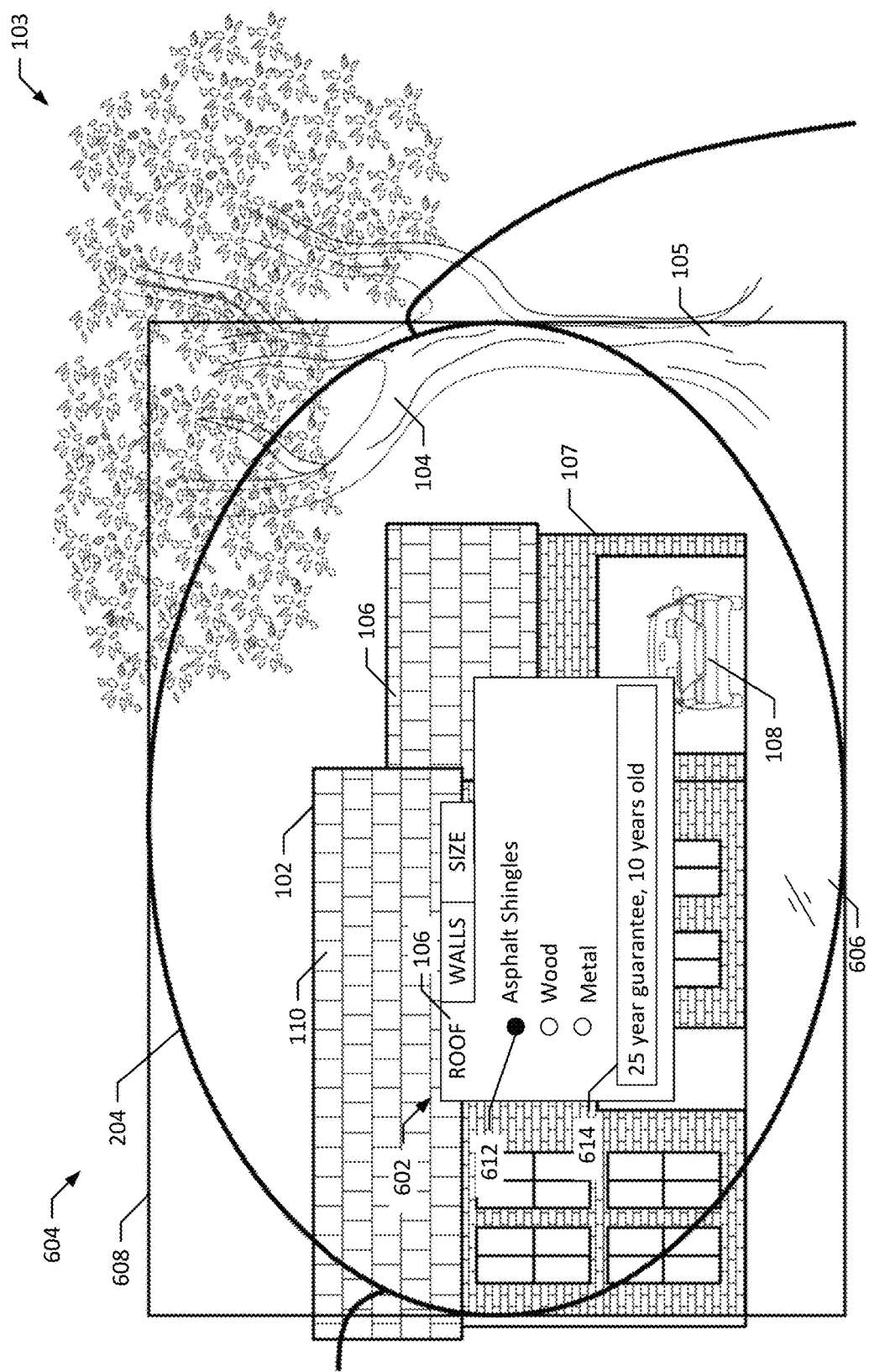
FIG. 6 illustrates an exemplary user interface for annotating images.

FIG. 6 illustrates an exemplary user interface 602 that may be presented on the smart glasses 204. The user interface 602 may be presented in addition to, or overlaid on, real-world content 604 viewable through a lens 606 of the smart glasses 204 in an augmented reality fashion, and/or or on an image 608 being displayed on the lens 606. The user interface 602 may include any number and/or type(s) of interface elements including tabs 610, check boxes 612, or text entry boxes 614, for example.

In some examples, the exemplary user interface 602 relates to providing details or information related to a home, and may be presented when the party 101 virtually taps, e.g., using gestures, on any part of the home 102. In the depicted example, a selected tab 610 may enable the party 101 to provide information related to the roof 110. In some embodiments, the tab 610 may be virtually selected, e.g., using gestures, or may be selected when the server(s) 114 detects that the party 101 virtually taps, e.g., using gestures, on any party of the home 102. As depicted, the check boxes 612 enable the party 101 to indicate one or more roofing materials (e.g., shingles, wood, metal, etc.), and the text box 614 enables the party 101 to provide any additional information (e.g., "shingles came with a 25 year guarantee, and they were installed 10 years ago"). The party 101 may enter text into the text box 614 by speaking, writing, or typing text, for example. In some embodiments, the server(s) 114 may use OCR, text/speech recognition and/or NLP to translate such spoken, written, or typed text into a known/predetermined format (e.g., to convert "put on a new roof a few years ago" to data elements <roof><replacement><2-4 years>), which can then be stored as part of, or in conjunction with, the images 202, 302, 402, 502, 702, and 802.

Figure 7:
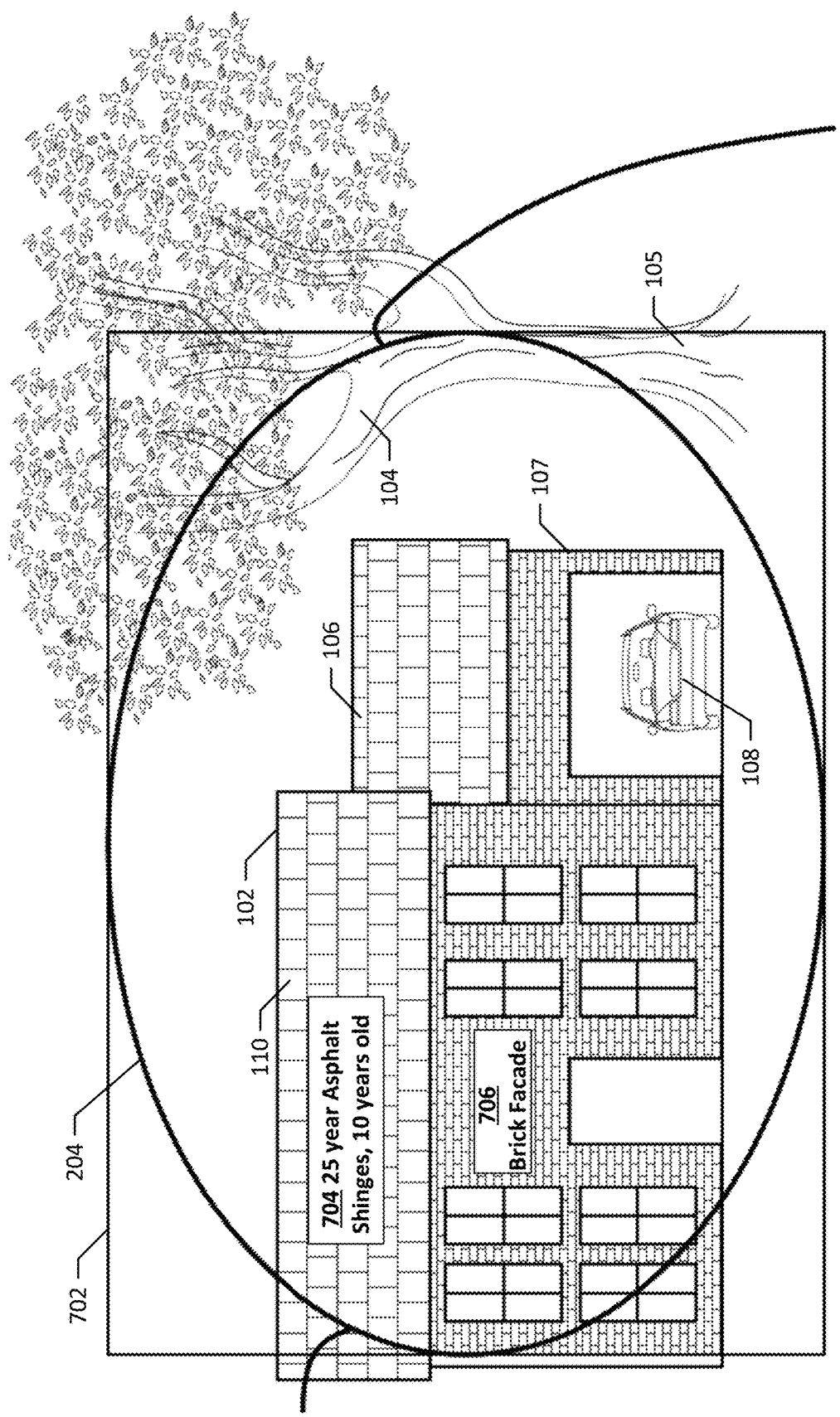
FIG. 7 illustrates an exemplary annotated version of the image of FIG. 2.

FIG. 7 illustrates an image 702 that is an exemplary annotated version of the image 202 of FIG. 2 that may result from use of the exemplary user interface 602 of FIG. 6. In the exemplary image 702, an exemplary annotation 704 "25 year asphalt shingles, 10 years old" has been added related to the roof, and an exemplary annotation 706 "brick façade" has been added related to materials used on the front of the home 102.

Additionally and/or alternatively, the party 101 may provide annotations by virtually taping, e.g., using gestures, on a portion of an image or real-world content, and speaking, writing, or typing text. Additionally and/or alternatively, the server(s) 114 may process an image (e.g., using one or more configured or trained ML models) to automatically determine one or more features shown in the image, and automatically add corresponding annotations. Annotations may be made using any of the exemplary methods of annotating, providing information for annotations, or otherwise providing related details or information.

Figure 8:
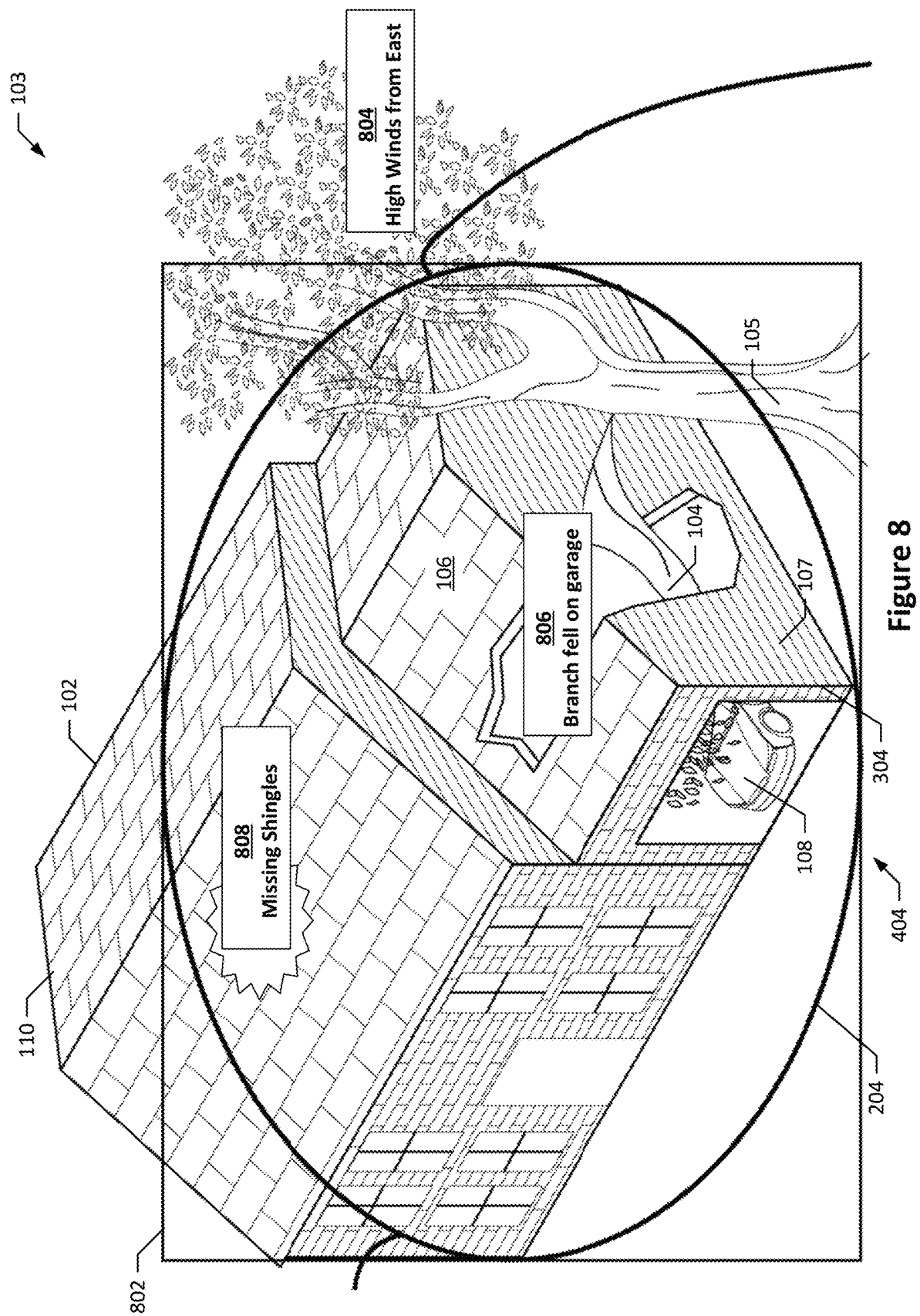
FIG. 8 illustrates an exemplary annotated version of the image of FIG. 5.

FIG. 8 illustrates an exemplary image 802 that is an annotated version of the image 502 of FIG. 5. The image 802 may similarly be annotated. However, in the example of FIG. 8, because the image 502 showed damage, annotations may be related a damage-causing event or damage. For example, the party 101 may add an annotation 804 related to how or why the damage occurred (e.g., "high winds"), an annotation 806 describing damage (e.g., branch fell from tree"), an annotation 808 indicating "missing shingles," and/or any number and/or type(s) of other annotations. The party 101 may provide annotations by virtually taping, e.g., using gestures, on a portion of an image or real-world content, and speaking or typing text for an annotation. Additionally and/or alternatively, the server(s) 114 may process an image to determine one or more features shown in the image, and automatically add corresponding annotations. Annotations may be made using any of the exemplary methods of annotating, providing information for annotations, or otherwise providing related details or information.

Exemplary Virtual Reconstructions

Figure 9:
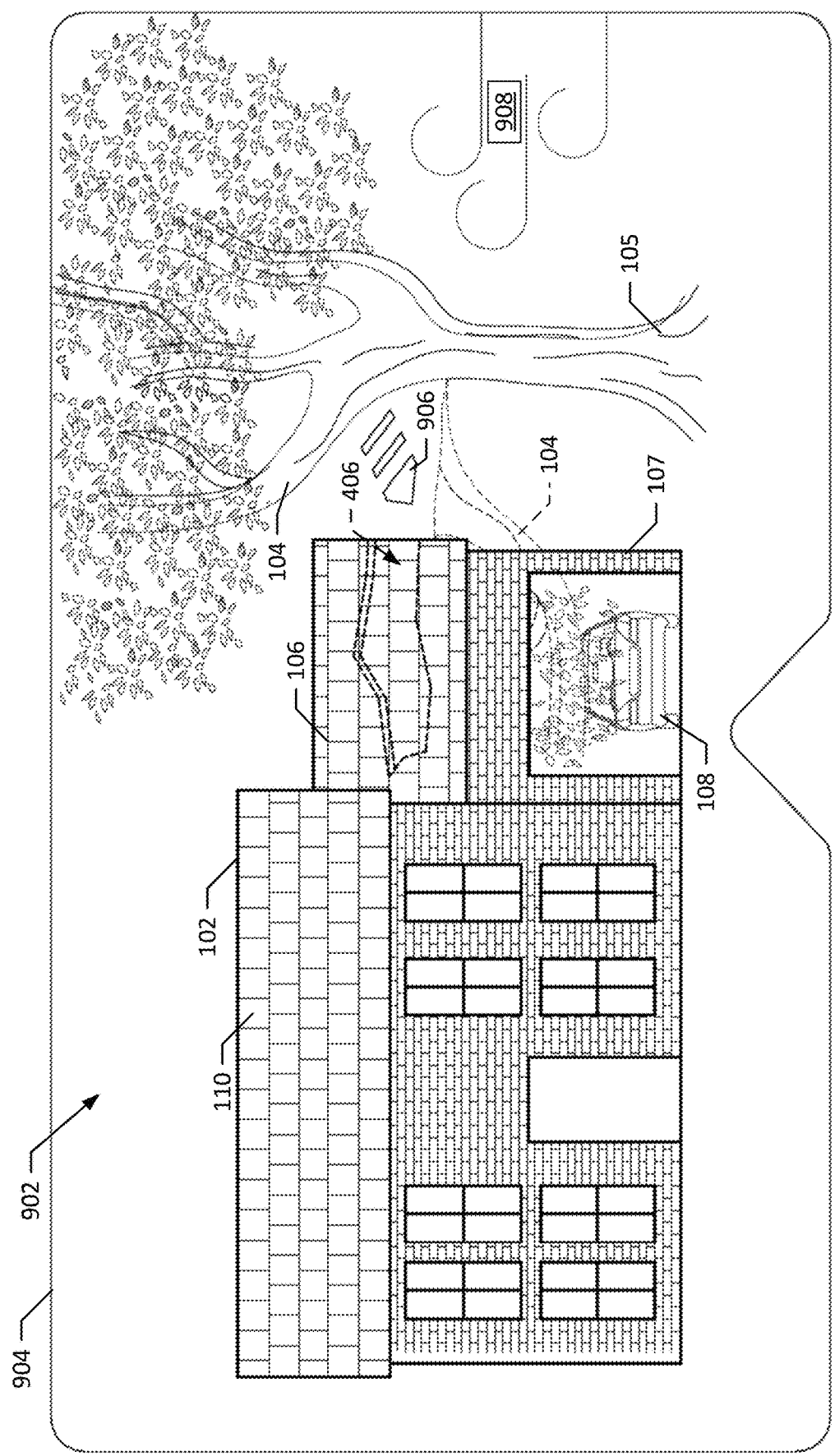
FIG. 9 illustrates an exemplary virtual reconstruction of the damage-causing event of FIGS. 4 and 5 from the first vantage point.

FIG. 9 illustrates an exemplary virtual reconstruction 902 of the damage-causing event of FIGS. 4 and 5 from the first vantage point used to capture the image 202 of FIG. 2.

Figure 10:
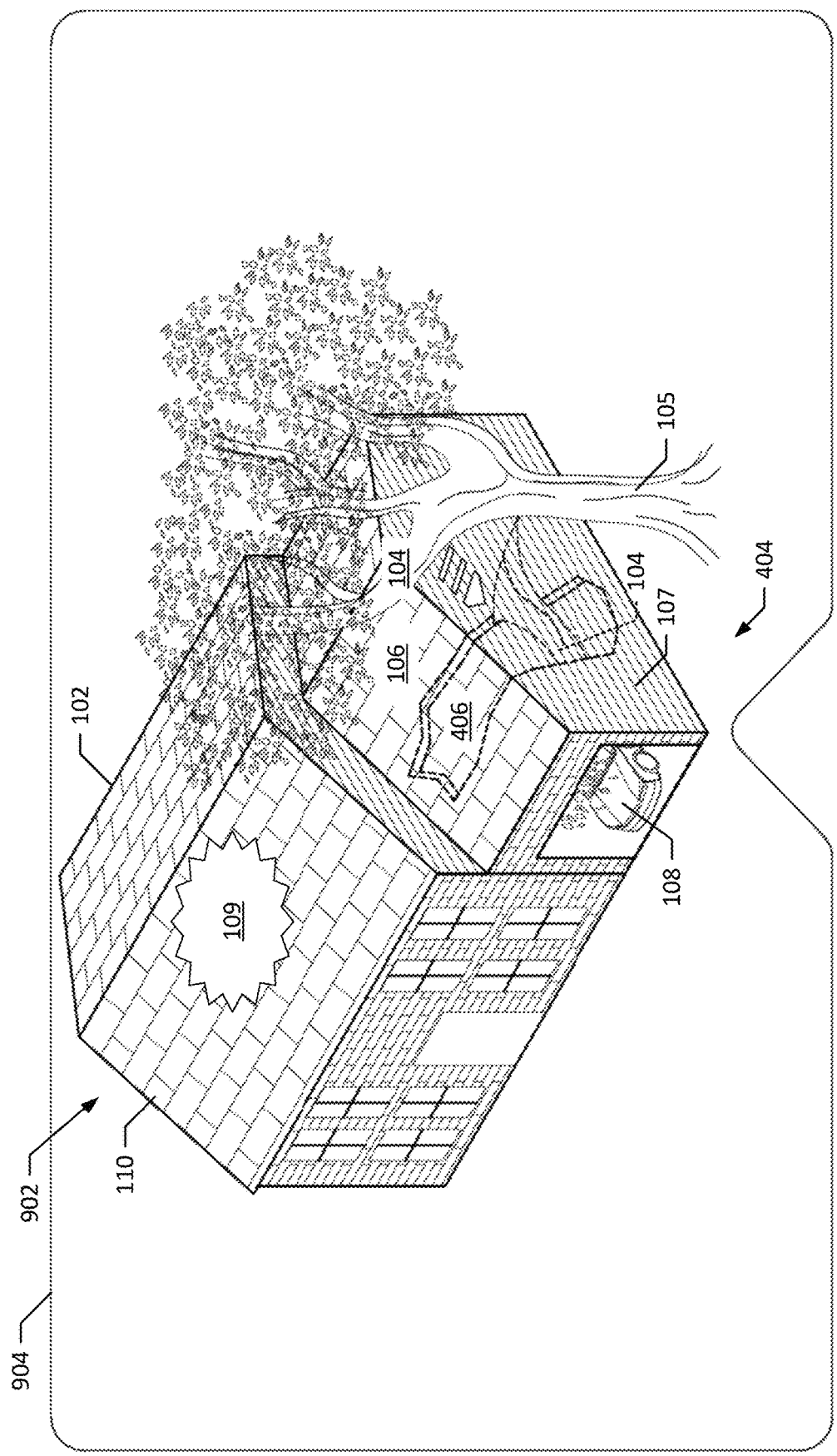
FIG. 10 illustrates the exemplary virtual reconstruction of FIG. 9 from the second vantage point.

FIG. 10 illustrates the exemplary virtual reconstruction 902 of FIG. 9 from the second vantage point used to capture the image 302 of FIG. 3.

As depicted, the virtual reconstruction 902 may be presented using an XR headset 904. In the depicted example of FIGS. 9 and 10, the virtual reconstruction 902 is a static representation of a dynamic damage-causing event. In FIGS. 9 and 10, an initial state in the virtual reconstruction 902 is shown with solid lines, while a final state is shown with dashed lines. For example, the branch 104 while attached to the tree 105 is shown with solid lines, but is shown with dashed lines to indicate where it ended up, the hole 406 is shown with dashed lines, and the roof 106 was initially undamaged.

In the depicted example, the direction that an object moves is depicted by arrows. For example, arrows 906 depict that the branch 104 moved downward and towards the garage 107. The exemplary virtual reconstruction 902 may also include annotations 908 representing winds coming from the east that caused the branch 104 to break off the tree 105 and fall onto the garage 107. In other embodiments, the virtual reconstruction 902 may be a computer-generated animated reconstruction of the damage-causing event such that, when the animated virtual reconstruction is played, the branch 104 moves within the XR headset 904 such that a viewer experiences the virtual reconstruction 902 as if they were a witness to the damage-causing event as it occurred.

In some embodiments, the server(s) 114 may automatically generate the virtual reconstruction 902 based upon the data 113, 128, and 132, or related details or information, and possibly also other information. The server(s) 114 may use the images 202 and/or 302 as a starting point for generating a virtual reconstruction 902, as noted above. The server(s) 114 may then add, as discussed above (e.g., based upon automatically determined differences between images, annotations made to the images 402 and/or 502, etc.), virtual representations of objects at their initial locations, at their final locations, and/or indications or depictions of how they may have moved.

In some embodiments, the server(s) 114 may instead infer how objects were positioned and/or moved based upon differences between the images 202, 302, 402, and/or 502. Additionally or alternatively, the server(s) 114 may infer how objects were initially or finally positioned, and/or how they moved using OCR or speech/text recognition (possibly followed by NLP) to convert one or more spoken, typed, or written textual descriptions of the damage-causing event. The party 101 may provide such descriptions in response to an insurance representative asking questions regarding the damage-causing event, for example.

In the depicted example, the virtual reconstruction 902 may be a static representation of the damage-causing event, and includes annotations 906 and 908 what and/or how things happened. In some embodiments, the server(s) 114 automatically generates the annotations 906 and 908 based upon differences between the images 202, 302, 402, and 502, and/or based upon one or more annotations made to the images 202, 302, 402 and 502 by, for example, the party 101.

In some embodiments, the server(s) 114 may generate, change, alter, add, delete, or otherwise modify aspects of the virtual reconstruction 902 based upon one or more input controls of the XR headset 904, handheld controllers, worn devices, or one or more user interfaces presented in the XR headset 904. For example, the server(s) 114 may modify the virtual reconstruction 902 in response to virtual gestures that the party 101 and/or the insurance representative 140 made using handheld controller(s) or worn device(s) to virtually change the position(s) of objects, adjust how objects moved, to adjust the direction(s) objects moved, etc.

Additionally and/or alternatively, the server(s) 114 may modify the virtual reconstruction 902 responsive to one or more voice commands, spoken, typed, or written statements, text inputs, or user interface element activations made by the party 101 and/or the insurance representative 140. For example, the party 101 may, while viewing the virtual reconstruction 902, indicate that "the hole in the roof is bigger," or "more shingles blew off." The server(s) 114 may use speech/text recognition, OCR, and/or NLP to interpret commands and statements to determine and make one or more modifications to the virtual reconstruction 902, and then present or provide the updated virtual reconstruction 902.

In some embodiments, the party 101 and/or the insurance representative 140 may switch between different vantage points from which a virtual reconstruction 902 is presented (e.g., between the example vantage points of FIGS. 9 and 10) using one or more input controls of the XR headset 904, handheld controllers, worn devices, or one or more user interfaces presented in the XR headset 904. For example, they may switch between perspectives using voice commands, such as "switch vantage point," "next vantage point," etc. As another example, the party 101 and/or the insurance representative 140 may switch between different vantage points of a virtual reconstruction by physically moving (e.g., walking from one area to another in the real-world, while wearing an XR headset, holding a device, or wearing a device that includes inertial, orientation, or position sensors to detect the user's movements and/or location).

Exemplary Images of Assets

As described above in connection with FIG. 1, the party 101 may be guided to move throughout and/or around the home 102 or property 103 and capture images or videos of the home 102, property 103, and belongings that may be used by the server(s) 114 to determine asset data. Exemplary images of exemplary belongings are shown in FIGS. 11, 12 and 13.

Figure 11:
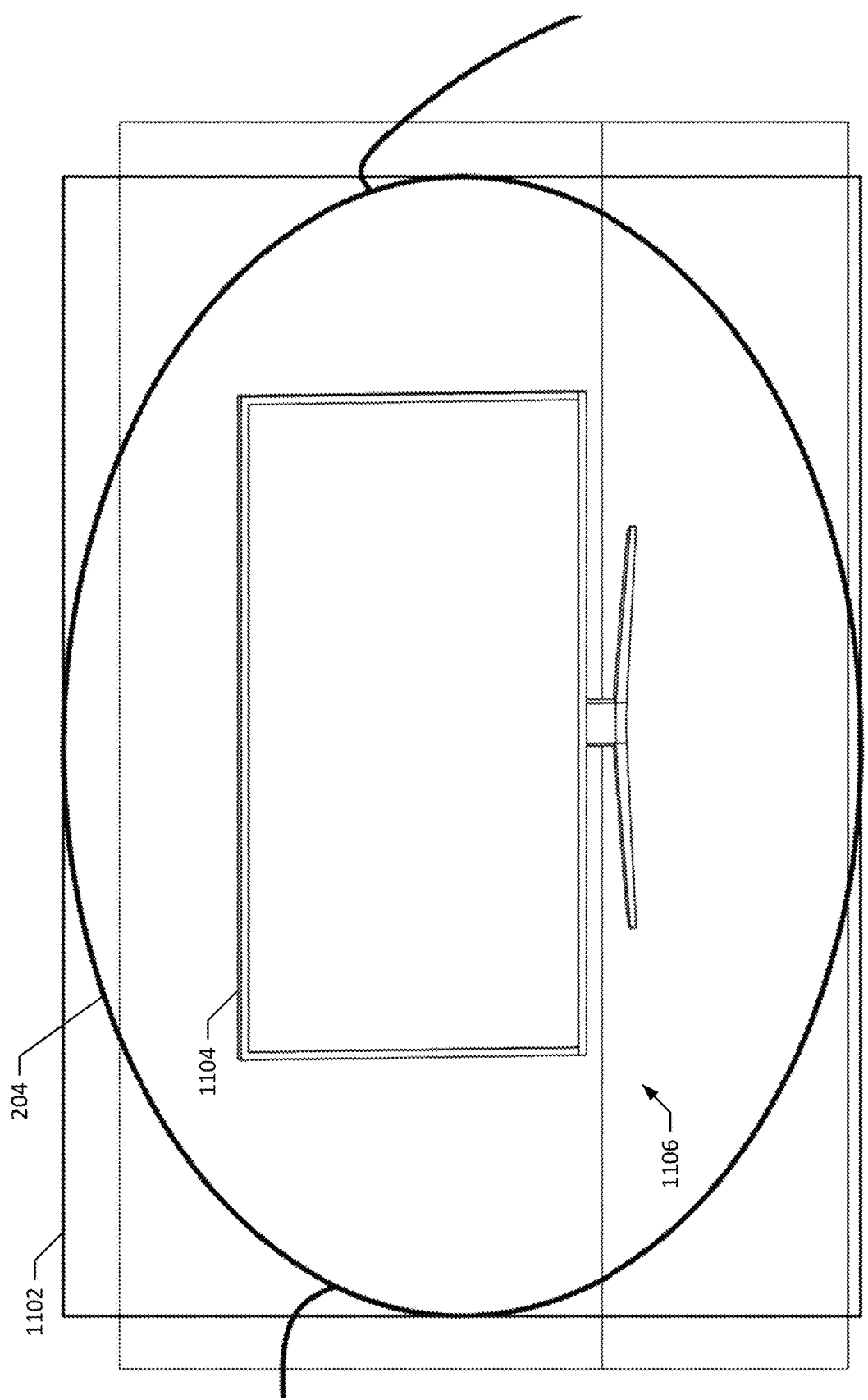
FIG. 11 is an image of an exemplary belonging.

FIG. 11 is an image 1102 of a television 1104 sitting in a cabinet 1106 as an exemplary belonging. In some examples, the party 101 identifies and provides related details or information for the television 1104 to the server(s) 114, and identifies the cabinet 1106 as a built-in feature of the home 102 for the server(s) 114. In some examples, the server(s) 114 may process the image 1102 and automatically identify the television 1104 and related details or information, and/or the characteristics of the cabinet 1106, and may prompt the party 101 to confirm automatically determined information, and/or for any information that the server(s) 114 could not automatically determine.

Figure 12:
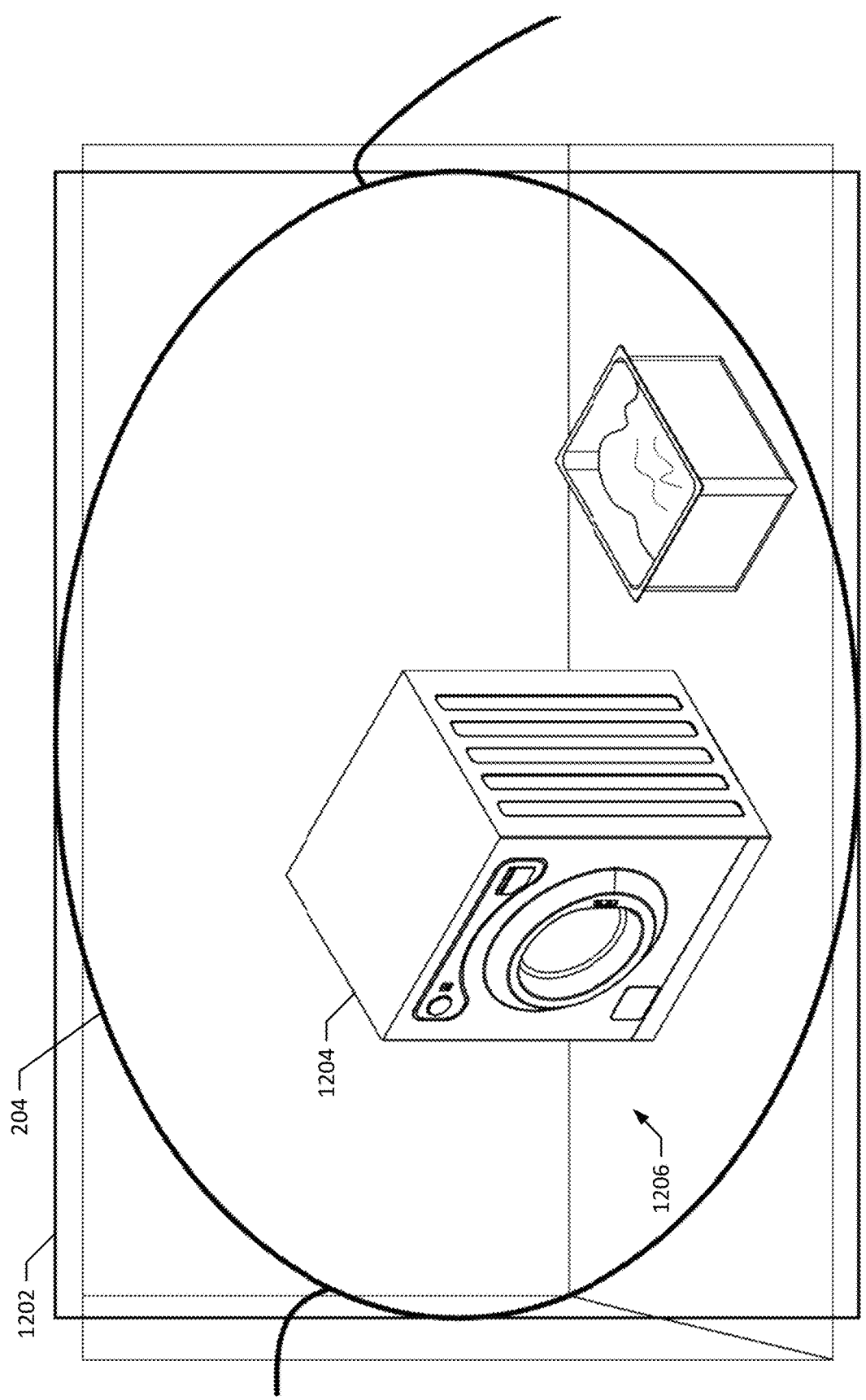
FIG. 12 is image of another exemplary belonging.

FIG. 12 is an image 1202 of a washing machine 1204 in a laundry room 1206 as another exemplary belonging. In some examples, the party 101 identifies and provides a make and model of the washing machine 1204 to the server(s) 114. In some examples, the server(s) 114 process the image 1202 and automatically identify the make and model of the washing machine 1204.

Figure 13:
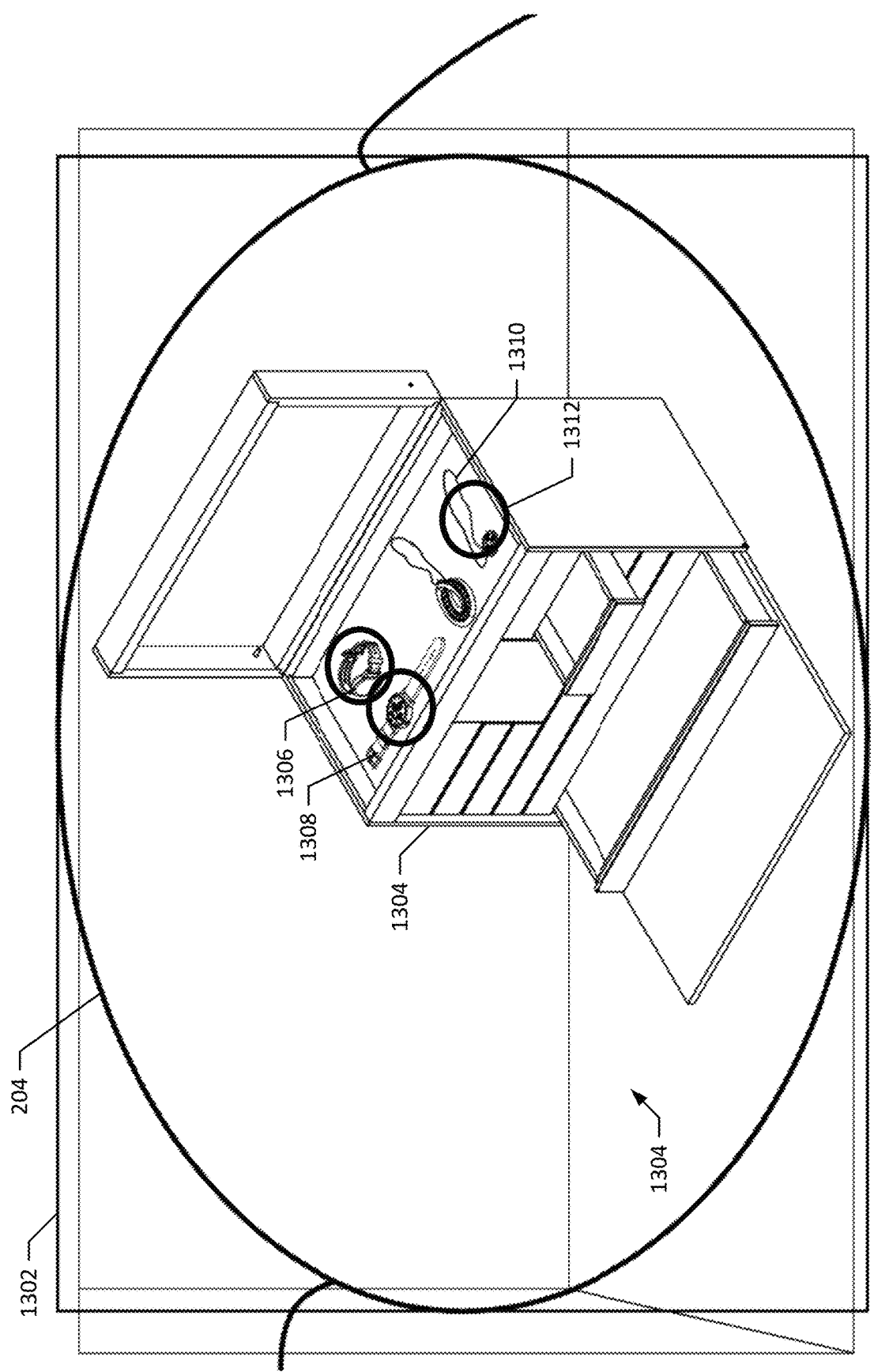
FIG. 13 is an image of other exemplary belongings.

FIG. 13 is an image 1302 of other exemplary belongings. As shown in FIG. 13, the image 1302 is of a jewelry box 1304 holding more than one belonging, such as a watch 1306, another watch 1308, and a necklace 1310. In some examples, when an image, such as the image 1302, includes more than one belonging of feature, the party 101 may separately identify each belonging of feature and/or provide related details or information for each belonging or feature to the server(s) 114. For instance, they may virtually select a belonging or feature, e.g., using gestures, and then use spoken, typed, or written text to identify the belonging or feature and/or provide related details or information. Additionally and/or alternatively, the server(s) 114 may process the image 1302 to identify one or more potential features of belongings in the image 1302, and cause an XR environment to add an annotation 1312 the image 1302 for each potential belonging or feature such that the party 101 may virtual tap (e.g., using gestures) one of the annotations 1312 to select a potential belonging or feature, and use spoken, typed, or written text to identify the belonging or feature, and/or provide related details or information.

Exemplary Remodeling Project Depictions

Figure 14:
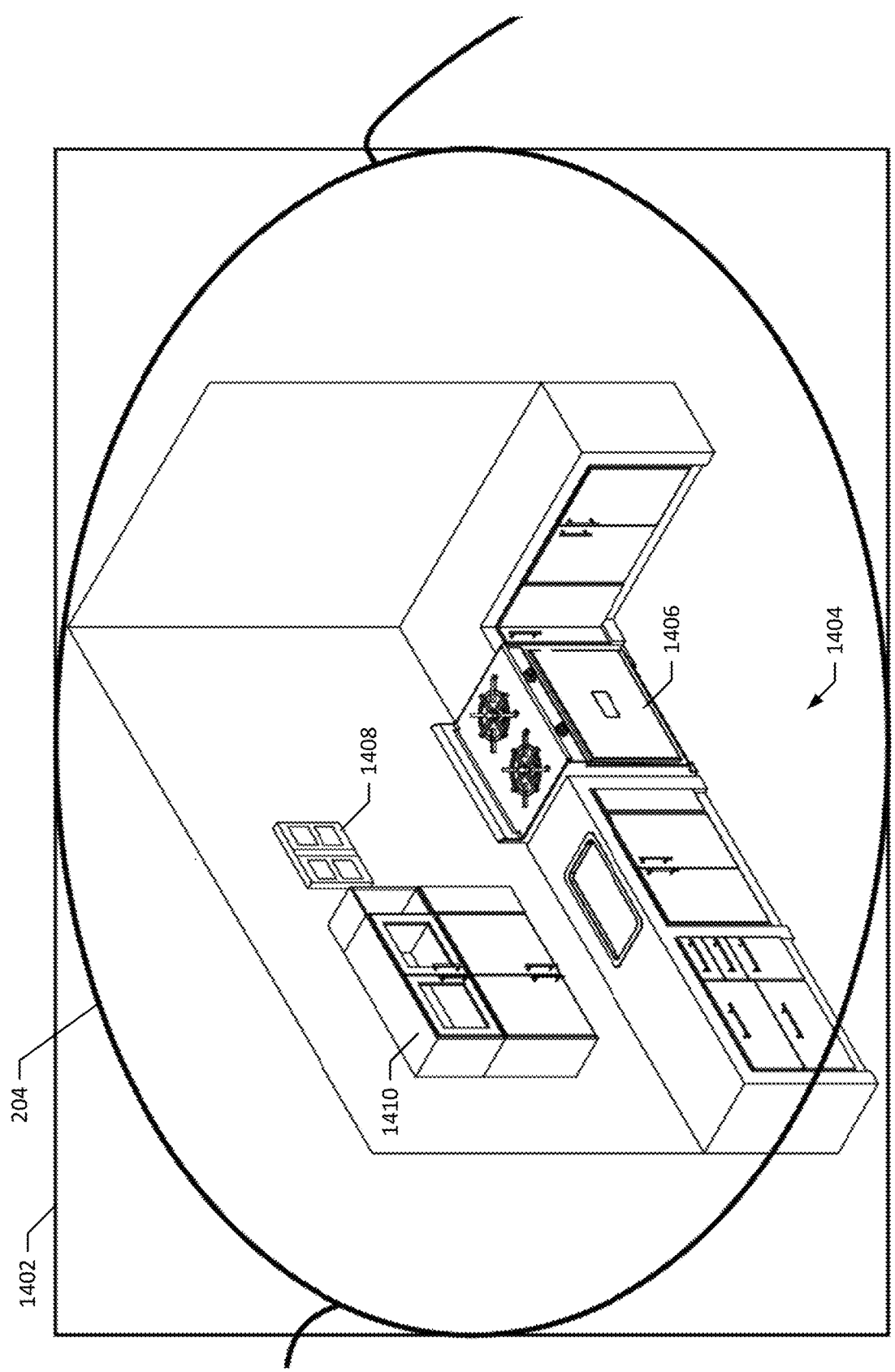
FIG. 14 is an image of an exemplary area of a home identified for potential remodeling.

As described above in connection with FIG. 1, the server(s) 114 may process images, videos, and/or video frames to identify areas of the home 102 for potential remodeling. In such examples, the server(s) 114 may display or present an image of the area(s) as part of proposing remodeling objects. FIG. 14 is an image 1402 of a current kitchen 1404 as an exemplary area of the home 102 for potential remodeling. As shown in FIG. 14, the kitchen 1404 has an outdated two-burner stove 1406, a small window 1408, and not many cabinets 1410.

Figure 15:
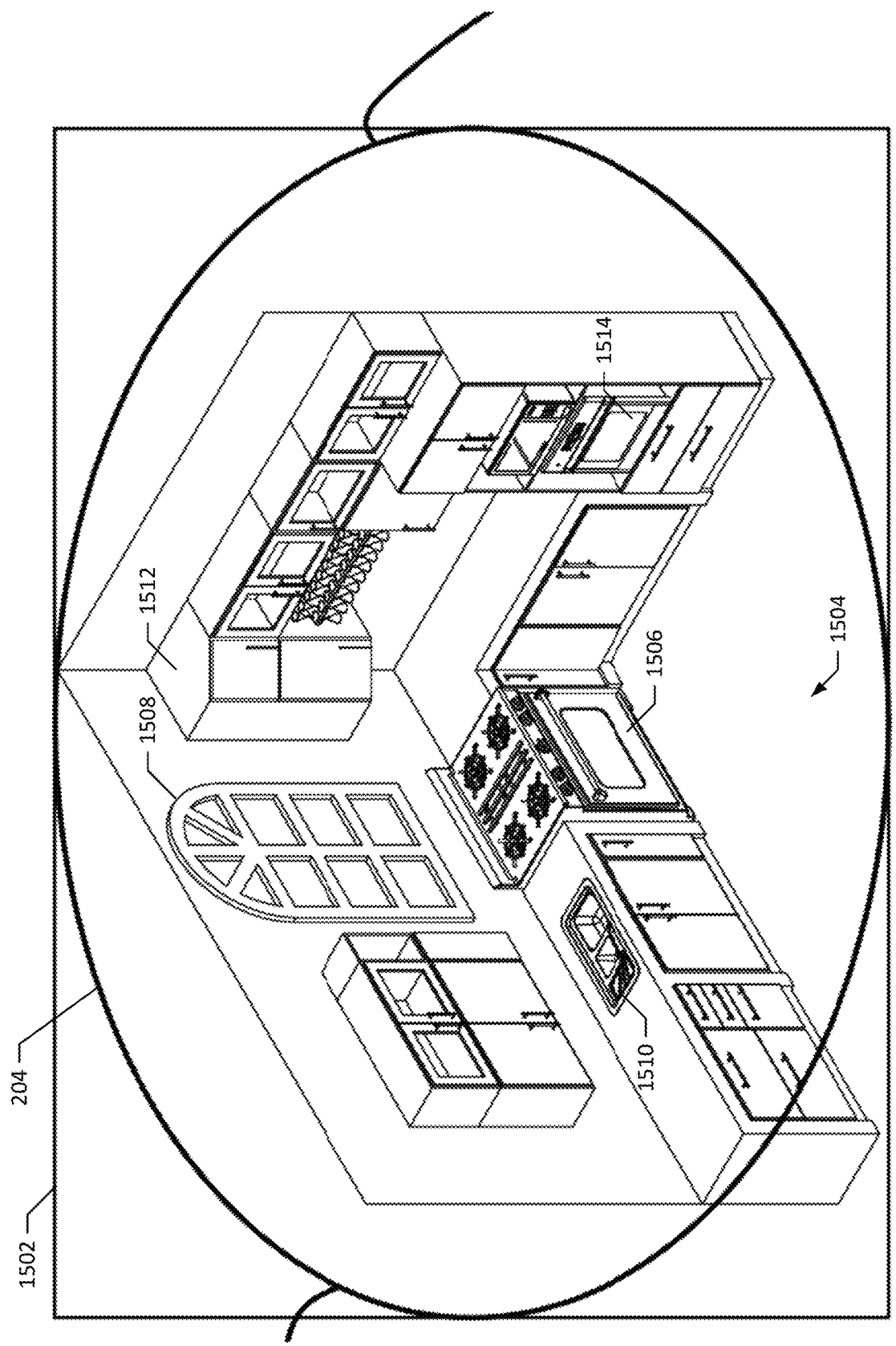
FIG. 15 is a visual depiction of an exemplary remodeling option for the exemplary area of FIG. 14.

As described above, the server(s) 114 may determine (e.g., using one or more configured and trained ML models) one or more options for remodeling the kitchen 1404. Exemplary remodeling options include potential layouts, materials, features, costs, etc. In some embodiments, the server(s) 114 may develop one or more visual depictions 146 of potential remodeling projects showing an remodeled area, such as a proposed remodeled kitchen (e.g., as if the proposed project was completed). FIG. 15 is an exemplary visual depiction 1502 of a potential remodeled kitchen 1504. As depicted, the proposed remodeling project includes a modern four-burner stove 1506, a larger window 1508, an upgraded sink 1510, upgraded and more cabinets 1512, and a wall oven 1514. As shown, the depiction(s) 1502 may be presented using a user's AR smart glasses 205, as shown, or using a VR headset (e.g., similar to FIGS. 9 and 10). When presenting using AR smart glasses 205, the visual depiction(s) 1502 may include the proposed remodeling project overlaid on real-world content representing the current kitchen 1404.

In some embodiments, the server(s) 114 may identify potential layouts, features, materials, appliances, etc. by identifying, e.g., in a database of remodeling projects, remodeling projects that have been completed for similar areas, shapes, and/or dimensions, and then selecting more common or popular layouts, features, materials, appliances, etc. In some embodiments, the party 101 may provide a budget for potential remodeling projects such that the server(s) 114 may more closely identify applicable similar remodeling projects. In some embodiments, the server(s) 114 may provide remodeling options for two or three different budget ranges such that the party 101 may better determine how much they are willing to pay. In some embodiments, the server(s) 114 may obtain one or more remodeling preferences from the party 101, and then use them when selecting options, layouts, features, materials, appliances, etc. Exemplary preferences include (i) preferred materials used for floors, cabinets, backsplashes, etc. (ii) preferred type(s), make(s) and/or model(s) of appliance, and (iii) preferred features to include (e.g., a center island, larger window, etc.). However, any preferences may be provided and used.

In some embodiments, the server(s) 114 may download and display or present visual depiction(s) 146, such as the exemplary depiction 1502, for potential remodeling project(s) in a party's XR device(s) 126 such that party 101 may, using XR, review the visual depiction(s) 146 using XR, and modify or select potential remodel projects. When the party 101 selects a potential remodel project, the server(s) 114 may determine and present, in the party's XR device(s) 126 using XR, potential contractors or financing options such that the party 101 may, using XR, select a particular financing option and/or contractor. In various embodiments, the server(s) 114 may facilitate completion of financing and/or engagement of a selected contractor.

Exemplary Virtual Meetings

Figure 16:
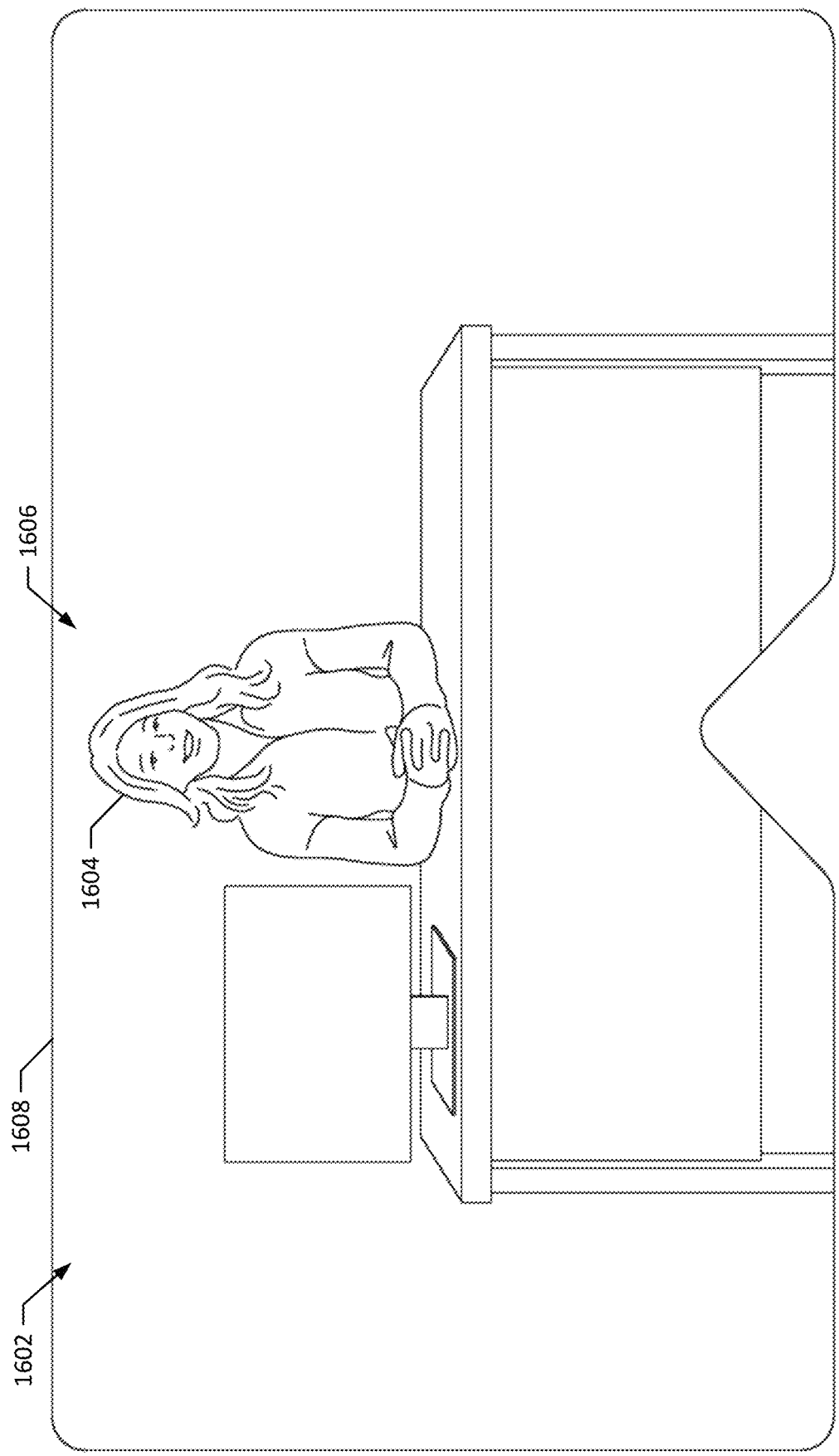
FIG. 16 illustrates an exemplary virtual meeting of a party with an insurance representative from the perspective of the party.

FIG. 16 illustrates an exemplary XR-based virtual meeting 1602 of a party 101 with an avatar 1604 for, or another representation of, an insurance representative 140 from the perspective of the party 101. As depicted, the party's perspective 1606 of the virtual meeting 1602 may be presented using an XR headset 1608 worn by the party 101, such that the party 101 may interact virtually with the avatar 1604 for the insurance representative 140.

Figure 17:
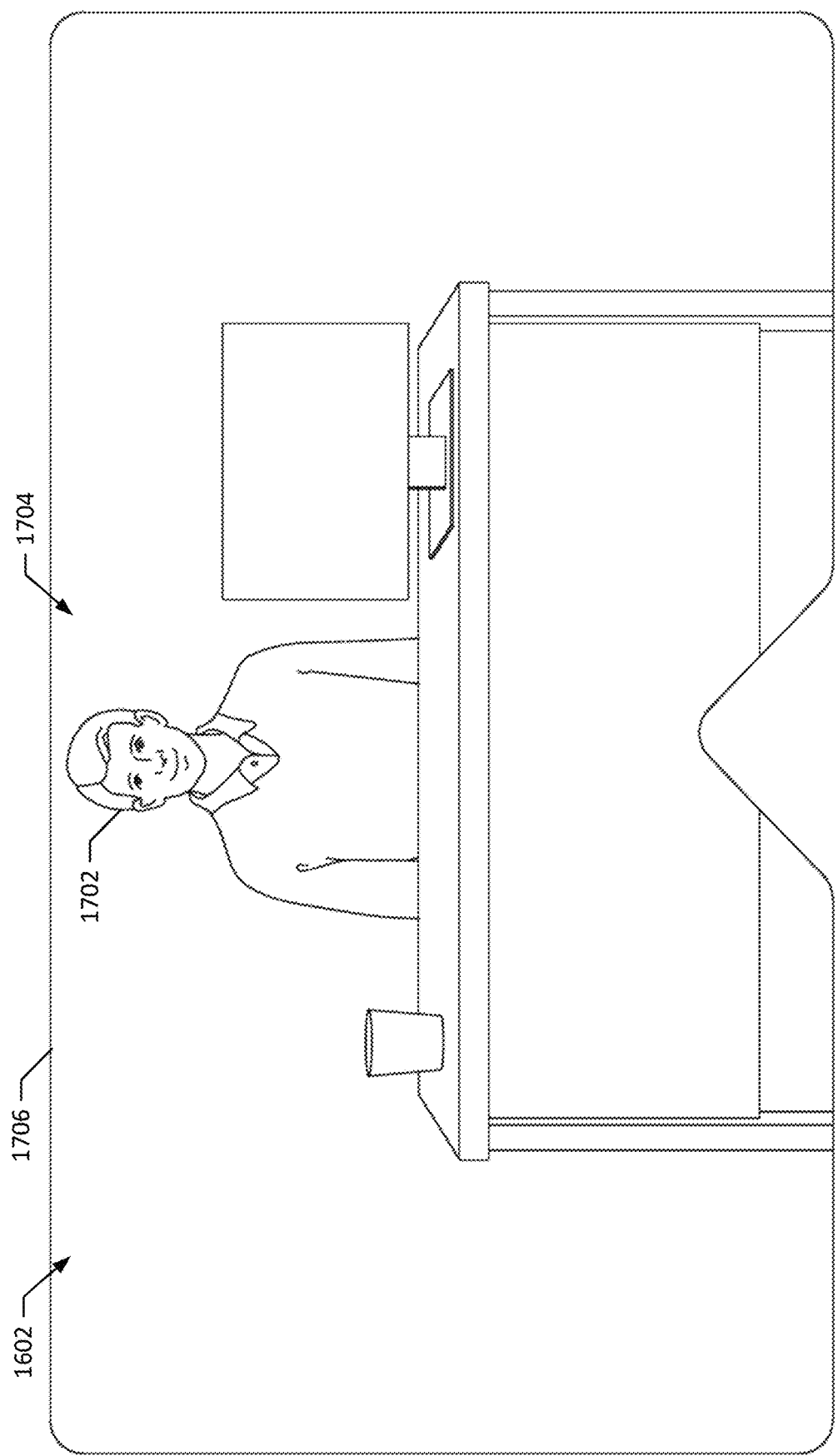
FIG. 17 illustrates the exemplary virtual meeting of FIG. 16 from the perspective of the insurance representative.

FIG. 17 illustrates the exemplary XR-based virtual meeting 1602 of FIG. 16 from the perspective of the insurance representative 140 looking at an avatar 1702 for, or another representation of, the party 101. As depicted, the insurance representative's perspective 1704 of the virtual meeting 1602 may be presented using an XR headset 1706 worn by the insurance representative 140, such that the insurance representative 140 may interact virtually with the avatar 1702 for the party 101.

In some embodiments, the virtual meeting 1602 may occur in a virtual office or meeting space that mimics a real person-to-person meeting that may occur in a physical office or meeting space. In some embodiments, the virtual meeting 1602 may include a collaborative XR environment that the insurance representative 140 and the party 101 may use to virtually and collaboratively construct, build, or define a virtual reconstruction 142, and/or collaboratively review, modify, and/or approve a virtual reconstruction 142 of a damage-causing event. In some embodiments, the virtual meeting 1602 may include respective XR environments for the insurance representative 140 and the party 101 such that they are together virtually as witnesses to the virtual reconstruction 142.

In some embodiments, the virtual meeting 1602 may also be used by the insurance representative 140 or the party 101 to review one or more visual depictions 146 of claim information, and modify or approve the claim information. In some embodiments, the virtual meeting 1602 may be used by the insurance representative 140 or the party 101 to review one or more visual depictions 146 of automatically generated insurance quotes, and modify or approve the insurance quotes. In some embodiments, the virtual meeting 1602 may be used by the insurance representative 140 or the party 101 to review one or more visual depictions 146 of identified potential damage risks, and/or mitigation options recommendations, and modify or approve the recommended mitigation options. In some embodiments, the virtual meeting 1602 may be used by the insurance representative 140 or the party 101 to review one or more visual depictions 146 potential remodeling projects, and modify or approve remodeling projects.

In the depicted virtual meeting 1602, the party 101 may interact with a physical insurance representative 140 via the latter's avatar 1604. However, the avatar 1604 need not be associated with a real person, such that the party 101 may instead interact with a computer-generated persona of a computer-generated, virtual insurance representative (e.g., an avatar for a voice bot or chatbot). While exemplary uses of the virtual meeting 1602 have been described, the virtual meeting 1602 may instead be used for other purposes.

The virtual meeting 1602 or other XR environments provided by, for example, the server(s) 114 may be configured according to party's personal data and/or XR preferences. The personal data may include notification preferences (e.g., phone vs. text vs. email), username, password, telephone number(s), social media data, financial account data, insurance policy(-ies), insured homes, properties, items, objects, assets, etc. The XR preferences may include any preferences related to XR experiences and interactions including, for example, interaction preferences (e.g., prefer to use VR over AR, only use AR, preferred avatar, preferred metaverse or other setting for a virtual meeting, etc.), type(s) of or identifier(s) for insured party's XR device(s), willingness to hold virtual meetings (rather than real-world meetings) with an insurance representative 140, where or how the party 101 prefers to meet (e.g., virtual home or virtual office in a metaverse, with the representative's avatar 1604 in party's actual home or place of business using AR, or in another setting such as outdoors, at the beach, in the woods, during a stroll, etc.), preferred time(s) or days-of-week to meet, etc.

In some embodiments, the party 101 receives a notification of, or invitation to, an XR-base virtual meeting according to their notification preferences. For example, they may receive a text notification with a link to initiate an XR-based virtual meeting. In some embodiments, the notification or invitation may correspond to a scheduled time for a virtual meeting, such as when two live, real persons will participate in the virtual meeting. However, some notifications or invitations may be activated at any day or time, such as when the party 101 will be the only live, real person in the virtual meeting. In some embodiments, the server(s) 114 may collect the insured person's personal data and/or XR preferences when the party 101 interacts with the server(s) 114 to provide the data 113, 128, or 132 using XR. Additionally and/or alternatively, the XR preferences may be provided to the server(s) 114 when the party 101 responds to a notification for, or an invitation to, an XR-based virtual meeting.

Exemplary Computer-Implemented Methods

Figure 18:
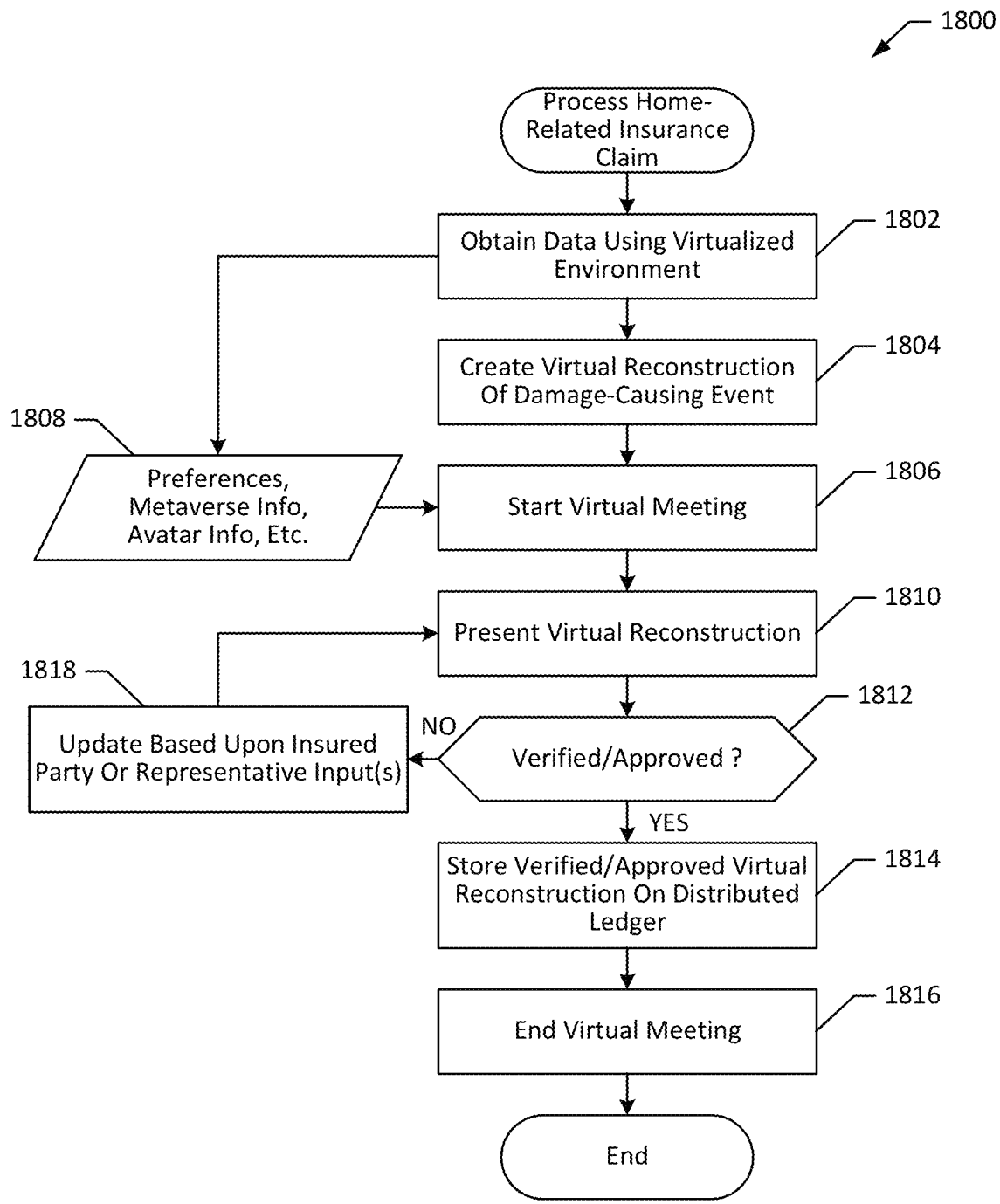
FIG. 18 is a flow diagram for an exemplary computer-implemented method for processing a home-related insurance claim.

FIG. 18 is a flowchart representative of an exemplary computer-implemented method 1800 representing hardware logic, machine-readable instructions, or software that may be implemented or executed by the server(s) 114 to use XR for processing a home-related insurance claim, as disclosed herein. Any or all of the blocks of FIG. 18 may be executable program(s) or portion(s) of executable program(s) embodied in software and/or machine-readable instructions stored on non-transitory, machine-readable storage media for execution by the server(s) 114 or, more generally, one or more processors, such as the processor 2302 of FIG. 23. Additionally and/or alternatively, any or all of the blocks of FIG. 18 may be implemented by one or more hardware circuits structured to perform the corresponding operation(s) without executing software or instructions. The method 1800 is described below with reference to various components or parties of FIG. 1.

The computer-implemented method 1800 may start with the server(s) 114 obtaining, using one or more XR environments provided on a party's XR device(s) (e.g., one of the XR devices 126), data related to a home 102, property 103, or belongings, or a damage-causing event, such as the exemplary data 113, 128, and 132 (block 1802). Embodiments for obtaining the data and/or providing the data are described above in connection with FIGS. 1-8. For example, the server(s) 114 may download one or more XR environments to one or more XR devices 126 that the party 101 may use to capture and/or annotate one or more images, videos, and/or video frames of a home 102, a property 103, belongings, a damage-causing event, a damage scene 112, damaged belongings, a damaged area of a home, etc.

In some embodiments, the server(s) 114 may process the data 113, 128, and 132 obtained at block 1802 to automatically generate a virtual reconstruction 142 of the damage-causing event (block 1804). Embodiments for generating the virtual reconstruction 142 are described above in connection with FIGS. 9 and 10.

In some embodiments, the server(s) 114 may instead infer what occurred during a damage-causing event based upon differences between the images 202, 302, 402, 502, 702, and 802. In other embodiments, the server(s) 114 may infer what occurred using OCR, speech/text recognition and/or NLP to convert one or more spoken, written, or typed textual descriptions of the damage-causing event. Such descriptions may be provided in response to an insurance representative asking questions regarding the damage-causing event.

In certain embodiments, the server(s) 114 generate virtual representations of belongings in the virtual reconstruction 142 based upon the appearance of belongings in image(s), such as the images 202, 302, 402, 502, 702, and 802. The server(s) 114 may also generate the virtual representations based upon indicated or automatically identified details or information related to the belongings.

The computer-implemented method 1800 may further include starting a virtual meeting, such as the exemplary virtual meeting 1602 of FIGS. 16 and 17, between the party 101 and an insurance representative 140 (block 1806). One or more aspects of the virtual meeting 1602 may be based upon, or in accordance with, one or more insured party preferences 1808, such as personal data, social media account information, metaverse preferences and location information, or avatar preferences or information (e.g., as discussed above in connection with FIGS. 16 and 17). For example, the server(s) 114 may configure and generate one or more XR environments based upon the party's personal data and/or XR preferences 1808, send a virtual meeting notification or invite, and, when the invite is activated, download the XR environments to party's XR device(s) 126 and/or the insurance representative's XR device(s) 138 to initiate the virtual meeting.

As part of the virtual meeting, or separately, the computer-implemented method 1800 may include the virtual reconstruction 142 being downloaded to and presented in the XR device(s) 126 of the party 101 and/or the XR device(s) 138 of the insurance representative 140, to enable one or both parties to separately or collaboratively review, modify, or approve the virtual reconstruction 142 using XR (block 1810).

If the virtual reconstruction 142 is verified or approved by one or both parties (block 1812), the server(s) 114 may cause the verified or approved model or virtual reconstruction 142 to be stored on a distributed ledger, such as a blockchain (e.g., as described above in connection with FIG. 1), for remote viewing, or to facilitate subrogation, claim processing, dispute resolution, etc. (block 1814), the virtual meeting may be ended (block 1816), and control may exit from the method 1800.

Returning to block 1812, if the virtual reconstruction 142 is not verified or approved (block 1812), the virtual reconstruction 142 may be modified based upon input(s) from the party 101 or the insurance representative 140 (block 1718), and control may return to block 1710 to present or provide the updated model or virtual reconstruction 142.

Figure 19:
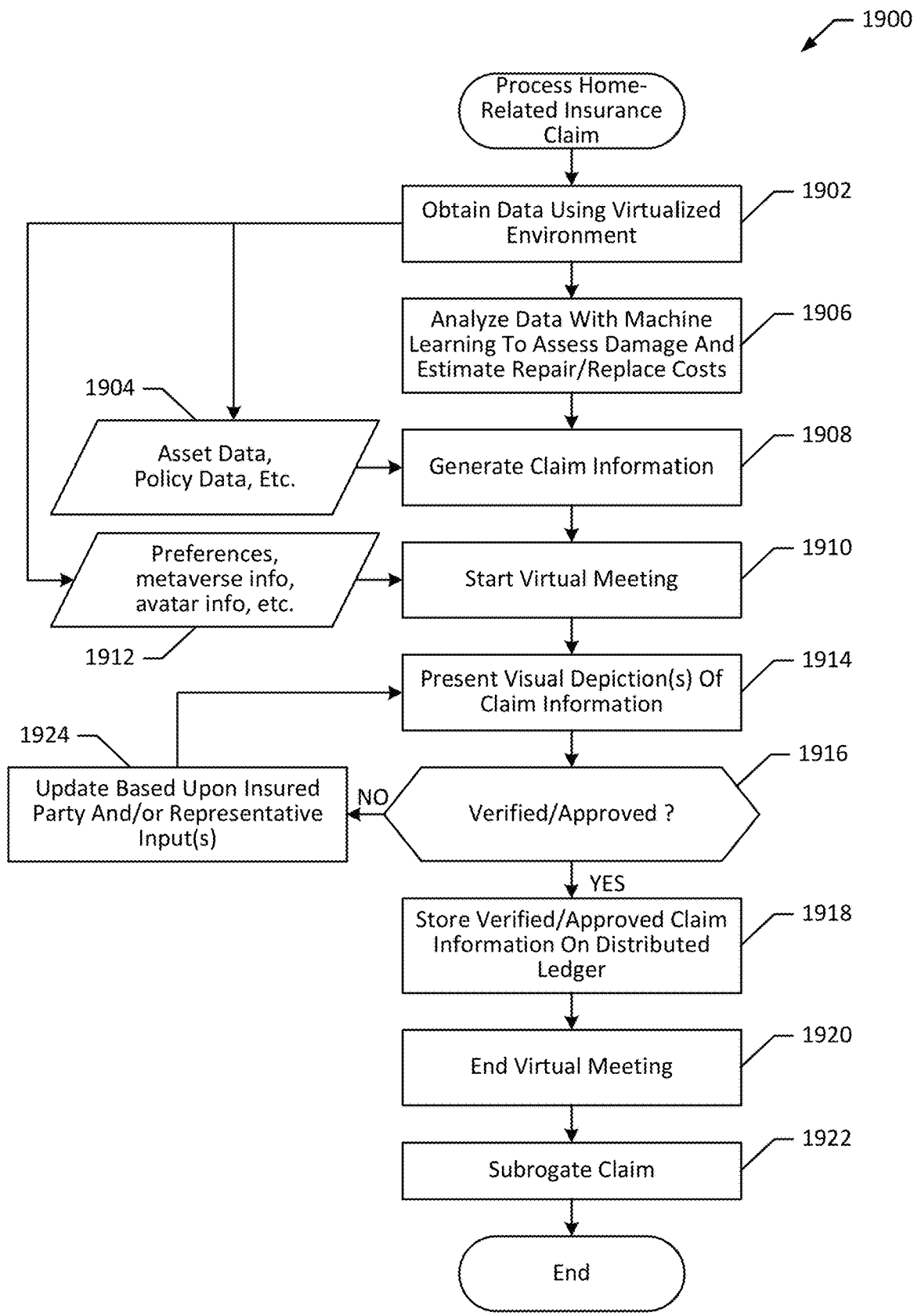
FIG. 19 is a flow diagram for another exemplary computer-implemented method for processing a home-related insurance claim.

FIG. 19 is a flowchart representative of another exemplary computer-implemented method 1900 representing hardware logic, machine-readable instructions, or software that may be implemented or executed by the server(s) 114 to use XR for processing a home-related insurance claim, as disclosed herein. Any or all of the blocks of FIG. 19 may be executable program(s) or portion(s) of executable program(s) embodied in software and/or machine-readable instructions stored on non-transitory, machine-readable storage media for execution by the server(s) 114 or, more generally, one or more processors, such as the processor 2302 of FIG. 23. Additionally and/or alternatively, any or all of the blocks of FIG. 19 may be implemented by one or more hardware circuits structured to perform the corresponding operation(s) without executing software or instructions.

While the exemplary computer-implemented method 1900 is depicted separately from the exemplary computer-implemented method 1800, it should be understood that blocks of method 1900 may be implemented as part of method 1800, or vice versa, such that a virtual reconstruction 142, and depiction(s) 146 of claim information 144, may be presented during the same virtual meeting (e.g., at different points in time during the meeting) for review, adjustment, modification, or approval.

The computer-implemented method 1900 may start with the server(s) 114 obtaining, using one or more XR environments provided on a party's XR device(s) 126 at one or more times, data related to the party 101 or a damage-causing event, such as the exemplary data 113, 128, and 132 (block 1902). The data may also include a generated inventory of belongings or insurance policy data 1904.

The computer-implemented method 1900 may include the server(s) 114 processing the data, for example, using one or more trained ML models, to assess damage and determine claim information 144 including estimated repair or replacement costs, and repair or replacement materials (block 1906). The method 1900 may further include the server(s) 114 generating further claim information 144 including a repair reconstruction, a repairs schedule, or a pre-populated insurance claim using the inventory or policy data 1904 (block 1908).

The computer-implemented method 1900 may further include starting a virtual meeting, such as the exemplary virtual meeting 1602 of FIGS. 16 and 17, between the party 101 and the insurance representative 140 (block 1910). One or more aspects of the virtual meeting 1602 may be based upon one or more insured party preferences 1912, such as social media account information, metaverse preferences and location information, avatar preferences, or any other preferences 1912 obtained at block 1902, for example.

As part of the virtual meeting, or separately, the computer-implemented method 1900 may include generating and downloading, for presentation and review, one or more visual depictions 146 of the claim information 144 to a party's XR device(s) 126 and/or an insurance representative's XR device(s) 138, for review, modification, and/or approval (block 1914).

If the claim information 144 is verified or approved (block 1916), the server(s) 114 may place or store the claim information 144 on a blockchain (or other distributed ledger) for remote viewing or to facilitate subrogation, claim processing, dispute resolution, etc. (block 1918), the virtual meeting may be ended (block 1920), the claim may be subrogated (block 1922), and control may exit from the method 1900.

Returning to block 1916, if the claim information 144 is not verified or approved (block 1916), the claim information may be updated based upon input(s) from the insured party 101 or the insurance representative 140 (block 1924), and control may return to block 1914 to display or present one or more visual depictions 146 of the updated claim information 144.

Figure 20:
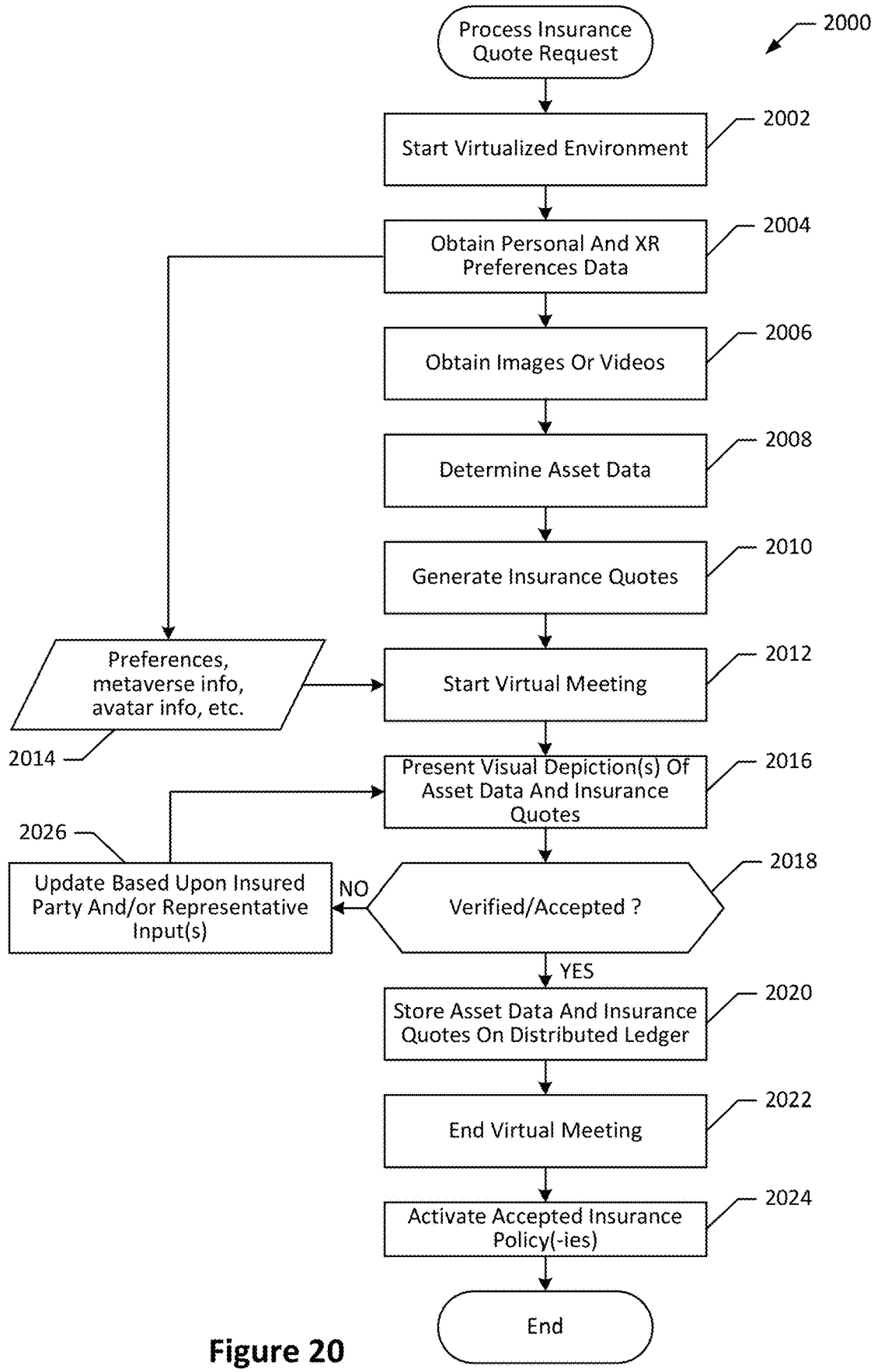
FIG. 20 a flow diagram of an exemplary computer-implemented method for preparing an insurance policy quote.

FIG. 20 is a flowchart representative of another exemplary computer-implemented method 2000 representing hardware logic, machine-readable instructions, or software that may be implemented or executed by the server(s) 114 to generate insurance policy quotes, as disclosed herein. Any or all of the blocks of FIG. 20 may be executable program(s) or portion(s) of executable program(s) embodied in software and/or machine-readable instructions stored on non-transitory, machine-readable storage media for execution by the server(s) 114 or, more generally, one or more processors, such as the processor 2302 of FIG. 23. Additionally and/or alternatively, any or all of the blocks of FIG. 20 may be implemented by one or more hardware circuits structured to perform the corresponding operation(s) without executing software or instructions.

The computer-implemented method 2000 may start with the server(s) 114 starting one or more XR environments on a party's XR device(s) 126 (block 2002), and obtaining data related to the party 101 using the XR environment(s) (block 2002). The server(s) 114, using the XR environment(s) obtain one or more images of a home, property and/or belongings (block 2006).

The computer-implemented method 2000 may include the server(s) 114 determining asset data representing identified characteristics of the home or property, identified belongings, and/or related details or information (block 2008). As described above in connection with FIG. 1, in some embodiments, the server(s) 114 may automatically identify the asset data by processing (e.g., with one or more ML models) the images, videos, and/or video frames, and/or related details or information captured at block 2006. Additionally and/or alternatively, the server(s) 114 may determine the asset data based upon identifications, details, or information provided by the party 101 using XR.

As described above in connection with FIG. 1, the computer-implemented method 2000 may include the server(s) 114 processing the asset data determined at block 2008 (e.g., using one or more trained ML models) to generate one or more insurance quotes (block 2012).

The computer-implemented method 2000 may further include starting a virtual meeting, such as the exemplary virtual meeting 1602 of FIGS. 16 and 17, between the party 101 and the insurance representative 140 (block 2012). One or more aspects of the virtual meeting 1602 may be based upon one or more insured party preferences 2014, such as social media account information, metaverse preferences and location information, or avatar preferences or information obtained at block 2002, for example.

As part of the virtual meeting, or separately, the computer-implemented method 2000 may include generating and downloading, for presentation and review, one or more visual depictions 146 of the asset data and the insurance quote(s) to a party's XR device(s) 126 and/or an insurance representative's XR device(s) 138, for review, modification, and/or approval (block 2016).

If the asset data and/or insurance quote(s) are verified or approved (block 2018), the asset data and/or insurance quote(s) may be placed on, stored on, or streamed to a blockchain (or other distributed ledger) for remote viewing, claim handling, subrogation, etc. (block 2020), the virtual meeting may be ended (block 2022), insurance policy(-ies) for the accepted insurance quote(s) may be activated, (block 2024), and control may exit from the method 2000.

Returning to block 2018, if the asset data or the insurance quote(s) are not verified or approved (block 2018), the asset data or insurance quote(s) may be updated based upon input(s) from the insured party 101 or the insurance representative 140 (block 2026), and control may return to block 2016 to display or present one or more visual depictions 146 of the updated asset data and/or insurance quote(s).

Figure 21:
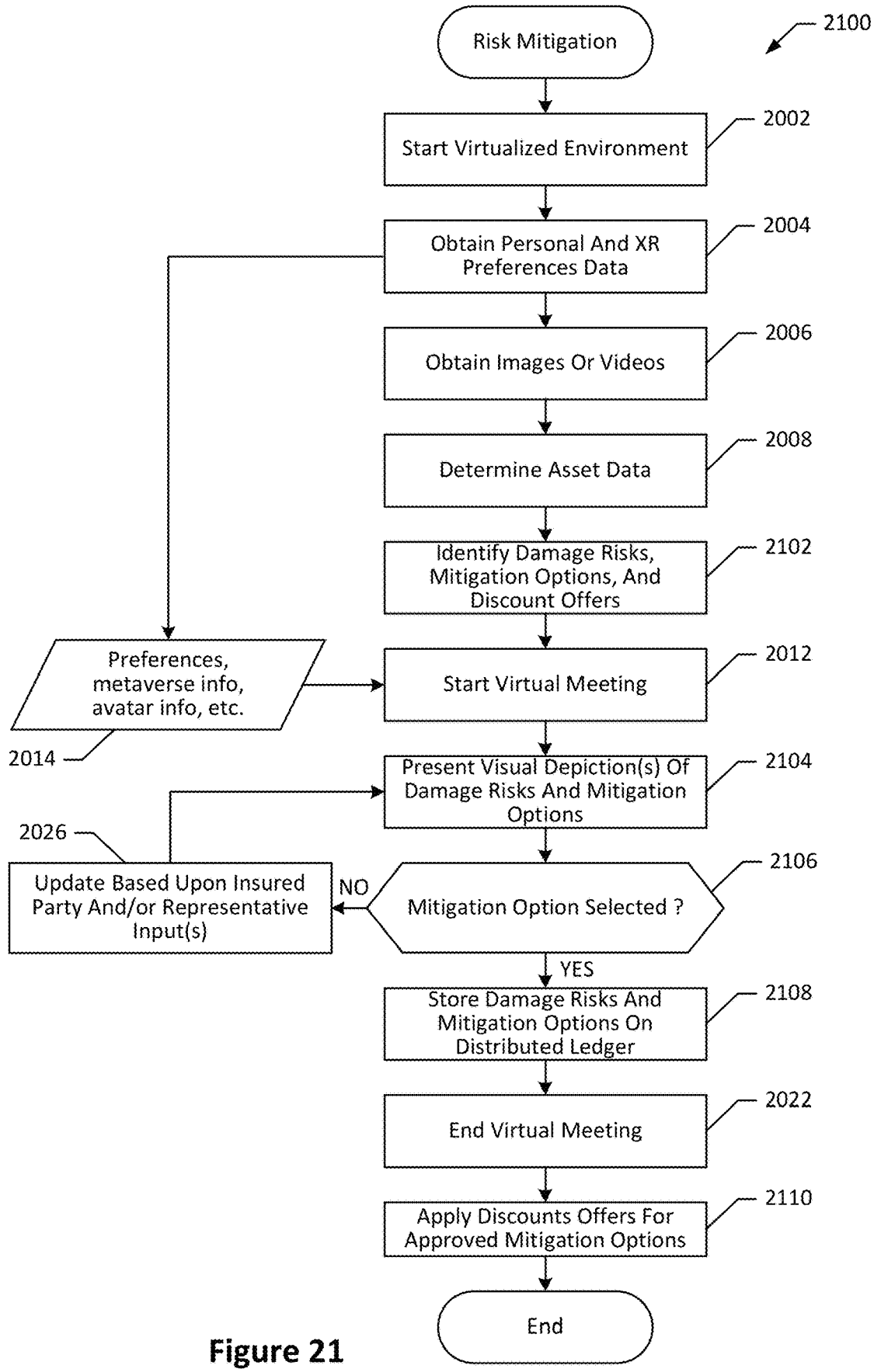
FIG. 21 is a flow diagram of an exemplary computer-implemented method for identifying potential damage risks, and determining mitigation options.

FIG. 21 is a flowchart representative of another exemplary computer-implemented method 2100 representing hardware logic, machine-readable instructions, or software that may be implemented or executed by the server(s) 114 to identify potential damage risks, mitigation options, as disclosed herein. Any or all of the blocks of FIG. 21 may be executable program(s) or portion(s) of executable program(s) embodied in software and/or machine-readable instructions stored on non-transitory, machine-readable storage media for execution by the server(s) 114 or, more generally, one or more processors, such as the processor 2302 of FIG. 23. Additionally and/or alternatively, any or all of the blocks of FIG. 21 may be implemented by one or more hardware circuits structured to perform the corresponding operation(s) without executing software or instructions.

The computer-implemented method 2100 is similar to the exemplary computer-implemented method 2000, and like blocks are shown with like reference numerals in FIGS. 20 and 21. The descriptions of like blocks are not repeated here, instead the interested reader is referred to the descriptions of the like blocks provided in connection with FIG. 20.

As described above in connection with FIG. 1, at block 2102, the computer-implemented method 2100 may, based upon the asset data determined at block 2008, identify potential damage risks, mitigation options, and discount offers for implementing mitigation offers.

As part of the virtual meeting, or separately, the computer-implemented method 2100 may include generating and downloading, for presentation, one or more visual depictions 146 of the identified potential damage risks, mitigation options, and discount offers for implementing mitigation options a party's XR device(s) 126 and/or an insurance representative's XR device(s) 138, for review, modification, and/or selection (block 2104).

If one or more mitigation options are selected (block 2106), the computer-implemented method 2100 may store the identified potential damage risks, mitigation options, discount offers, and selected mitigation options on a blockchain (block 2108), may end the virtual meeting (block 2022), may apply discount offers for approved and implemented mitigation options (block 2110), and control may exit from the exemplary method 2100.

Figure 22:
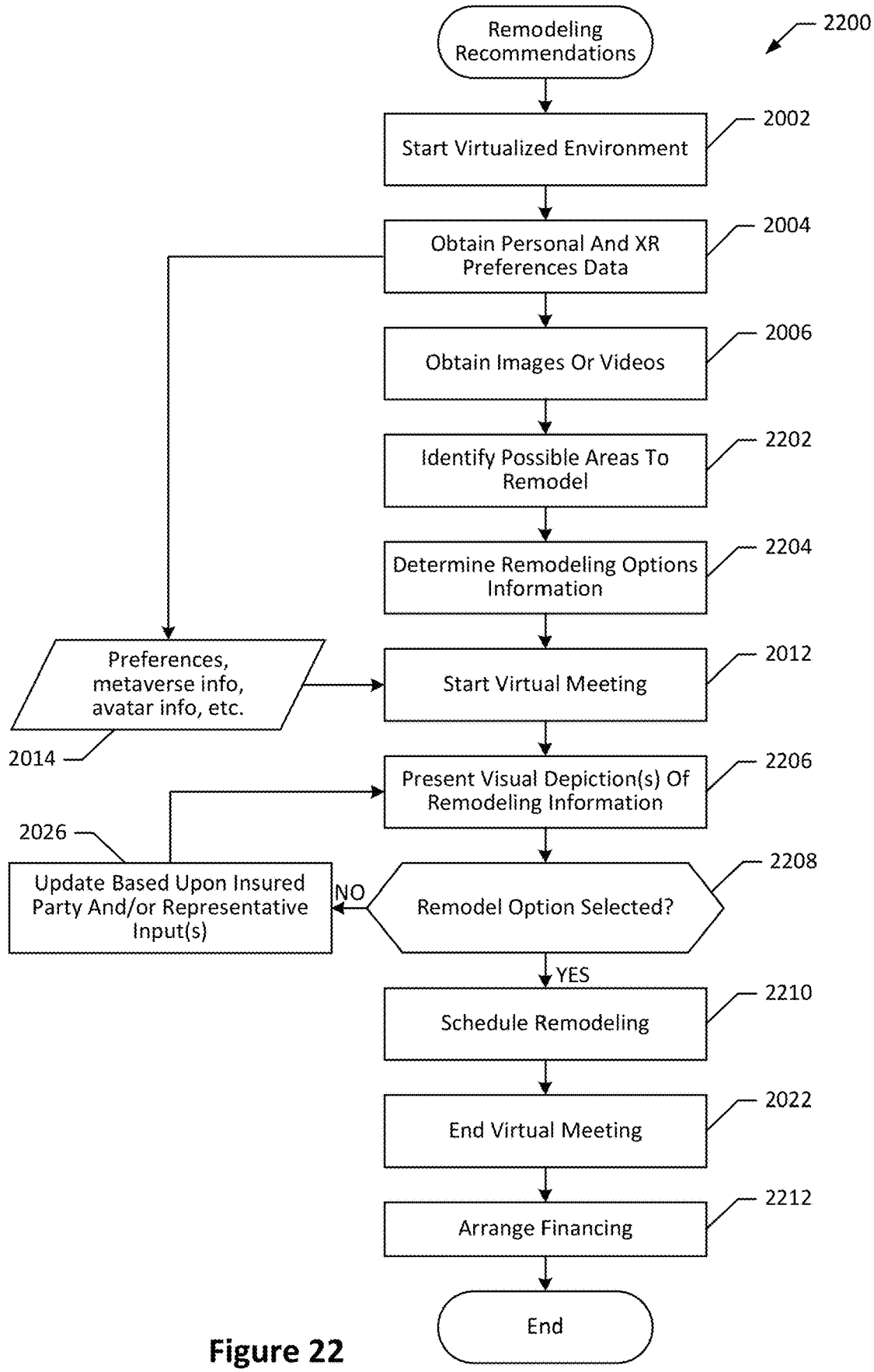
FIG. 22 is a flow diagram of an exemplary computer-implemented method of identifying and proposing remodeling projects.

FIG. 22 is a flowchart representative of another exemplary computer-implemented method 2200 representing hardware logic, machine-readable instructions, or software that may be implemented or executed by the server(s) 114 to identify and recommended remodeling projects, as disclosed herein. Any or all of the blocks of FIG. 22 may be executable program(s) or portion(s) of executable program(s) embodied in software and/or machine-readable instructions stored on non-transitory, machine-readable storage media for execution by the server(s) 114 or, more generally, one or more processors, such as the processor 2302 of FIG. 23. Additionally and/or alternatively, any or all of the blocks of FIG. 22 may be implemented by one or more hardware circuits structured to perform the corresponding operation(s) without executing software or instructions.

The computer-implemented method 2200 is similar to the exemplary computer-implemented method 2000, and like blocks are shown with like reference numerals in FIGS. 20 and 22. The descriptions of like blocks are not repeated here, instead the interested reader is referred to the descriptions of the like blocks provided in connection with FIG. 20.

As described above in connection with FIG. 1, at block 2202, the computer-implemented method 2200 may, based upon the asset data determined at block 2008, identify potential areas to remodel (block 2202), and may determine remodeling options information representing one or more remodeling options for the potential areas to remodel (block 2204).

As part of the virtual meeting, or separately, the computer-implemented method 2200 may include generating and downloading, for presentation, one or more visual depictions 146 of the remodeling options information to a party's XR device(s) 126 and/or an insurance representative's XR device(s) 138, for review, modification, and/or selection (block 2206).

If one or more remodeling options are selected including a selected schedule and/or a selected financing option (block 2208), the computer-implemented method 2200 may schedule the selected remodeling option(s) (block 2210), may end the virtual meeting (block 2022), may arrange the selected financing option (block 2212), and control may exit from the method 2200.

Exemplary Processing Platform

Figure 23:
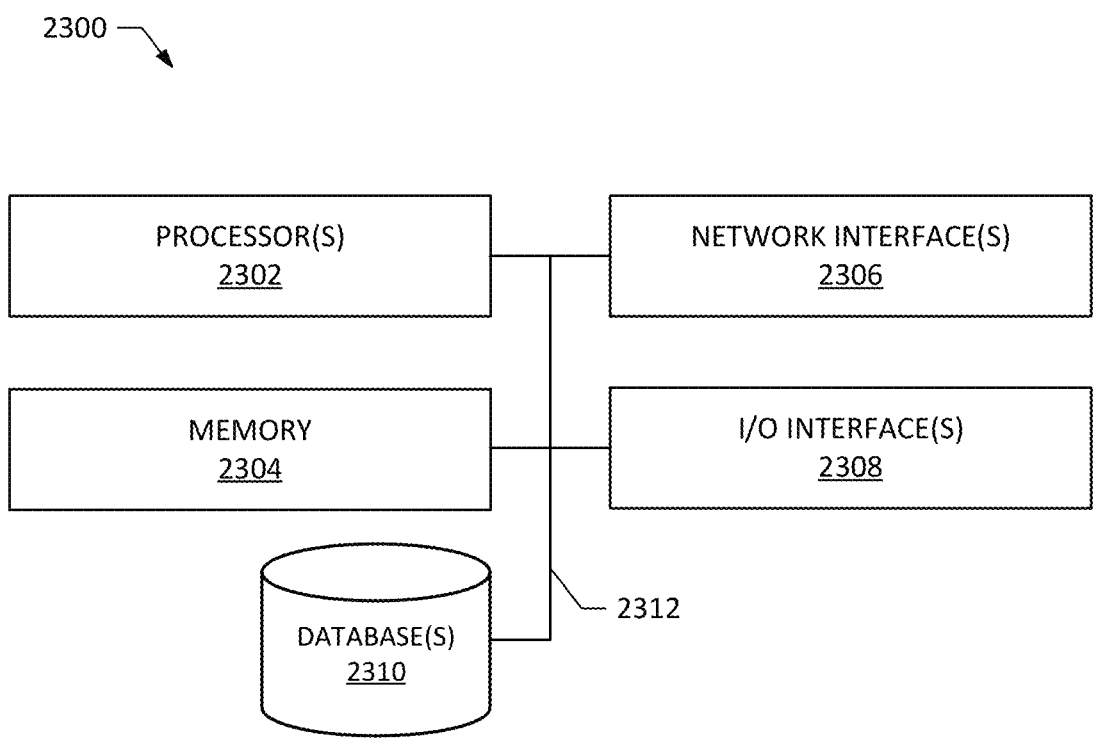
FIG. 23 is a block diagram of an exemplary processing platform for implementing example methods and operations described herein.

FIG. 23 is a block diagram representative of an exemplary processing platform 2300 that may be used to implement, for example, one or more components of the exemplary XR devices 126, 138, the server(s) 114, or, more generally, the exemplary XR system 100 of FIG. 1. The exemplary processing platform 2300 may be capable of executing instructions to implement operations of the exemplary methods described herein, as may be represented by the flowcharts of the drawings that accompany this description. Other exemplary logic circuits capable of, for example, implementing operations of the exemplary methods described herein include field programmable gate arrays (FPGAs) and application specific integrated circuits (ASICs).

The exemplary processing platform 2300 of FIG. 23 may include a processor 2302 such as, for example, one or more microprocessors, controllers, and/or any suitable type of processor. The exemplary processing platform 2300 of FIG. 23 includes memory (e.g., volatile memory, non-volatile memory) 2304 accessible by the processor 2302 (e.g., via a memory controller). The exemplary processor 2302 may interact with the memory 2304 to obtain, for example, machine-readable instructions stored in the memory 2304 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 2300 to provide access to the machine-readable instructions stored thereon.

The exemplary processing platform 2300 of FIG. 23 may include one or more communication interfaces such as, for example, one or more network interface 2306, and/or one or more input/output (I/O) interfaces 2308. The communication interface(s) enable the processing platform 2300 of FIG. 23 to communicate with, for example, another device or system (e.g., the exemplary XR devices 126, 138, and the server(s) 114), datastore, database, and/or any other machine.

The exemplary processing platform 2300 of FIG. 23 may include the network interface(s) 2306 to enable communication with other machines (e.g., the exemplary XR devices 126, 138, the server(s) 114) via, for example, one or more networks, such as the network(s) 116. The exemplary network interface 2306 may include any suitable type of communication interface(s) (e.g., wired and/or wireless interfaces) configured to operate in accordance with any suitable communication protocol(s). Exemplary network interfaces 2306 may include a TCP/IP interface, a WiFi™ transceiver (e.g., according to the IEEE 802.11x family of standards), an Ethernet transceiver, a cellular network radio, a satellite network radio, or any other suitable interface based upon any other suitable communication protocols or standards.

The exemplary processing platform 2300 of FIG. 23 may include the input/output (I/O) interface(s) 2308 (e.g., a Bluetooth® interface, an NFC interface, a USB interface, a serial interface, an infrared interface, etc.) to enable receipt of user input (e.g., from input controls of the XR devices 126, 138, a touch screen, keyboard, mouse, touch pad, joystick, trackball, microphone, button, etc.) and communication of output data (e.g., visual indicators, instructions, data, images, etc.) to the user (e.g., via a display, speaker, printer, etc.).

Exemplary Personalized Virtual User Experiences

The present embodiments may also relate to, inter alia, collecting data, including personal data and virtual user experience preferences, and data related to insurance policies, wills, homes, vehicles, and personal belongings. The data may be collected via several sources, including a virtual headset (e.g., an AR, VR, or XR headset or smart glasses, smart contacts, and/or an associated chat or voice bot), and analyzed by a server or processor to provide practical applications and virtual user experiences to users.

More particularly, the present embodiments disclose systems and methods that may relate to virtual headsets and virtual user experiences. For instance, digitalized data related to (i) insureds and beneficiaries, and their virtual user experience preferences; (ii) life, auto, home, and/or personal articles insurance policies; (iii) wills and trusts; (iv) personal assets, such as homes, autos, financial accounts, or personal articles; and/or (iv) damaged insured assets, such as damaged vehicles, homes, and personal articles damaged as a result of insurance-related events (e.g., vehicle collisions, fire, wind, water, hail, thunderstorms, wildfires, hurricanes, tornadoes, etc.), may be collected and generated, at least in part, via virtual headsets. The data collected may be utilized to generate personalized virtual user experiences that are presented or otherwise experienced digitally and/or audibly via virtual headsets.

The personalized virtual user experiences may relate to (i) the disposition of assets via a life insurance policy or will; (ii) generating a homeowners, auto, or personal articles insurance quote; (iii) preparing and/or handling/processing a homeowners, auto, or personal articles insurance claim based upon data collected related to (a) insurance policies, and (b) damaged insured assets; (iv) preparing virtual reconstructions of the insurance-related event for viewing and altering via virtual headsets; (v) preparing virtual representations of home remodeling, home remodeling options, repair or replacement options and materials/cost options for viewing and approving via virtual headsets; (vi) scheduling repair or replacement contractors via virtual headsets; and/or other applications discussed herein.

Virtual Agent's Office (Metaverse)

Certain embodiments may utilize a virtual headset (such as an AR/VR/XR headset, or smart glasses), chatbot and/or avatar to submit an insurance claim using visuals/icons, such as icons related to selecting damaged insured asset (home, vehicle, personal article), type of damage (collision, fire, water, wildfire, tornado, hail, wind, etc.), location of damage, etc. The customer may use the virtual headset to navigate about the virtual agent's office, such as to prepare a claim or receive a quote.

It should be noted that a life insurance claimant will be the beneficiary, not the insured; as a result, the beneficiary may not have a pre-existing relationship with the insurance provider. So, this immersive experience may be a good way to bridge the "personal touch" and the digital during a difficult time.

The insured may utilize the virtual headset to collect and/or generate digitalized life insurance and/or will/trust information of the insured to identify items bequeathed and beneficiaries. A hybrid personalized relationship may be generated with beneficiaries by allowing each beneficiary to use a virtual headset and/or chatbot to enter their personal information; preferred financial accounts; preferences for virtual agent or actual agent interaction(s); and/or preferences for metaverse location or virtual area/home interaction. For instance, the beneficiary may, via the virtual headset, select whether they prefer to summon a virtual agent/chat bot, or an actual agent using visual menus/icons or verbally/audible interaction with a chat bot (e.g., if they would like to discuss life insurance policies in general, etc.). Upon the death of the insured, a beneficiary may digitalize a death certificate or other proof of death using a virtual headset.

In some embodiments, the virtual headset, and graphics presented thereon, may walk or guide the beneficiary(s) through the life insurance benefits and/or will or trust using the virtual headset. Additionally, each beneficiary may select one or more their financial account(s) for transferring funds into using the virtual headset for financial bequeaths.

Exemplary Personalized Virtual User Experience

Figure 24:
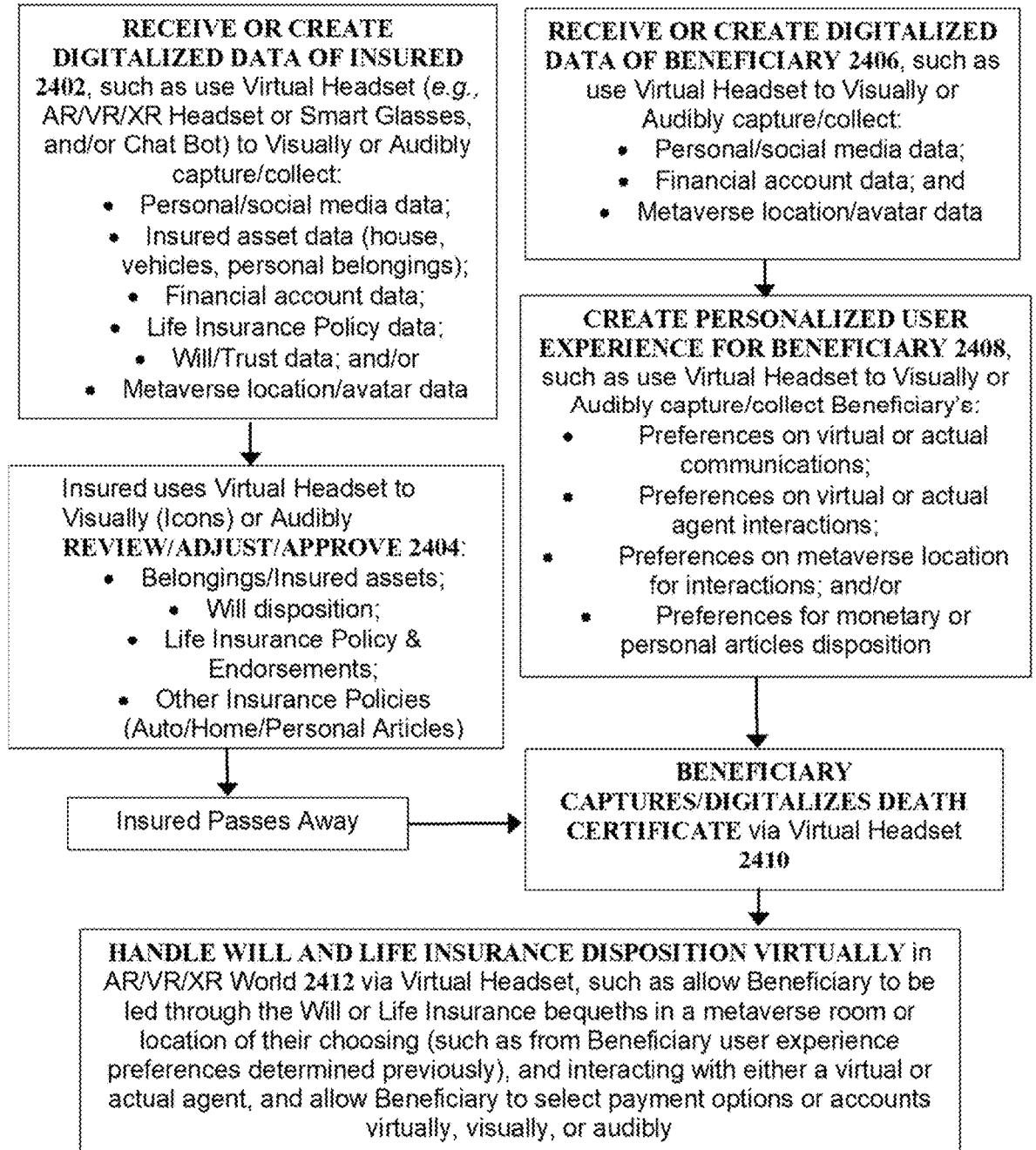
FIG. 24 illustrates an exemplary computer-implemented method utilizing a personalized virtual user experience to dispose of assets identified in a life insurance policy, will, or trust.

FIG. 24 illustrates a computer-implemented method 2400 utilizing a personalized virtual user experience to dispose of assets identified in a life insurance policy, will, or trust. The computer-implemented method 2400 may be implemented via one or more local or remote processors, sensors, cameras, transceivers, servers, memory units, chat or voice bots, and/or virtual headsets. The virtual headsets may include AR (Augmented Reality) glasses or headsets, VR (Virtual Reality) glasses or headsets, XR (eXtended Reality) glasses or headsets, or other smart glasses or smart contacts. The headsets or glasses may include audible functionality, such as chat or voice bot functionality, or be configured to work with an associated chat or voice bot, such as a chat or voice bot working with a smart home controller and located within the home.

The computer-implemented method 2400 may include, via one or more local or remote processors, sensors, cameras, transceivers, servers, memory units, chat bots, and/or virtual headsets: (1) receiving or creating digitalized data of an insured 2402, such as via a virtual headset and/or chat bot; (2) allowing the insured to use a virtual headset (and/or chat bot) to visually or audibly review, adjust, and/or approve a listing of assets, and disposition of assets established via a life insurance policy or will 2404; (3) receiving or creating digitalized data of a beneficiary 2406, such as via a virtual headset and/or chat bot; (4) creating a personalized virtual user experience for the beneficiary 2408, such as via a virtual headset and/or chat bot; (5) capturing or receiving a digital death certificate from the beneficiary's virtual headset 2410; and/or (6) handling or processing the disposition of assets identified in a will or life insurance policy in a virtual world via the virtual headset 2412, such as using a virtual headset and/or chat bot. The method may include additional, less, or alternate actions, including those discussed elsewhere herein.

The computer-implemented method 2400 may include, via one or more local or remote processors, sensors, cameras, transceivers, servers, memory units, chat bots, and/or virtual headsets, receiving or creating digitalized data of, or associated with, the insured 2402. For instance, the insured may use a virtual headset (such as smart or virtual glasses or headset; or an AR, VR, or XR headset) and/or chatbot to virtually or audibly capture, collect, and/or digitalize: (i) personal data, including virtual user experience preferences; (ii) social media data; (iii) insured asset data (e.g., house(s), vehicle(s), and personal belonging data); (iv) financial account data; (v) life insurance data; (vi) will and/or trust data; and/or (vii) metaverse location and/or avatar data (such as a virtual location owned or associated with the insured, and a virtual avatar or other virtual character of, or associated with, the insured).

The computer-implemented method 2400 may include, via one or more local or remote processors, sensors, cameras, transceivers, servers, memory units, chat bots, and/or virtual headsets, allowing the insured to review, adjust, modify, and/or approve the digitalized data of the insured 2402. For instance, the insured may use a virtual headset to visually (such as via icons or other graphics) or audibly review, adjust, and/or approve belongings and insured assets (including home features, vehicle features, etc.); will disposition and bequeaths; life insurance policy terms, conditions, and endorsements; and/or other insurance policies and conditions (e.g., home, auto, and personal articles insurance).

The computer-implemented method 2400 may include, via one or more local or remote processors, sensors, cameras, transceivers, servers, memory units, chat bots, and/or virtual headsets, receiving or creating digitalized data of a beneficiary 2406. For instance, a life insurance or will beneficiary identified in the digitalized data of an insured (such as identified within digitalized will or life insurance data) may use a virtual headset to capture or collect (i) personal data and virtual user experience preference data; (ii) social media data; (iii) financial account data; and/or (iv) metaverse location and avatar data (such as a beneficiary's home or other preferred location in the metaverse).

The computer-implemented method 2400 may include, via one or more local or remote processors, sensors, cameras, transceivers, servers, memory units, chat bots, and/or virtual headsets, creating a personalized virtual user experience for the beneficiary 2408. For instance, the beneficiary may use a virtual headset (and/or chat bot) to visually and/or audibly capture, collect, and/or identify the beneficiary's preferences on virtual or actual communications; preferences on virtual or actual agent interactions; preferred metaverse location(s) for virtual interactions; and/or preferences for monetary or personal articles disposition.

In the event that the insured passes away, the computer-implemented method 2400 may include, via one or more local or remote processors, sensors, cameras, transceivers, servers, memory units, chat bots, and/or virtual headsets, the beneficiary capturing and/or digitalizing a death certificate or other proof of the insured passing away 2410. For instance, the beneficiary may capture or otherwise digitalize a death certificate via a virtual headset.

The computer-implemented method 2400 may include, via one or more local or remote processors, sensors, cameras, transceivers, servers, memory units, chat bots, and/or virtual headsets, handling or otherwise processing will and life insurance asset disposition virtually in a virtual world 2412. For instance, the beneficiary may be led through a will or life insurance bequeaths in a metaverse room or location of their choosing (such as from the beneficiary virtual user experience preferences determined previously), interacting with either a preferred virtual or actual agent, and allowing the beneficiary to select payment options or accounts virtually, visually, or audibly.

Exemplary Life Insurance Applications

FIG. 25 illustrates a computer-implemented method 2500 utilizing a personalized virtual user experience to dispose of assets identified in a life insurance policy, will, or trust. The computer-implemented method 2500 may be implemented via one or more local or remote processors, sensors, cameras, transceivers, servers, memory units, chat or voice bots, and/or virtual headsets. The virtual headsets may include AR (Augmented Reality) glasses or headsets, VR (Virtual Reality) glasses or headsets, XR (eXtended Reality) glasses or headsets, or other smart glasses or smart contacts. The headsets or glasses may include audible functionality, such as chat or voice bot functionality, or be configured to work with an associated chat or voice bot, such as a chat or voice bot working with a smart home controller and located within the home.

The computer-implemented method 2500 may include, via one or more local or remote processors, sensors, cameras, transceivers, servers, memory units, chat bots, and/or virtual headsets: (1) receiving or creating digitalized data of a life insurance policy (or will) 2502, such as via a virtual headset and/or chat bot; (2) receiving or creating digitalized data of a beneficiary 2504; (3) creating a personalized virtual user experience for the beneficiary 2506; (4) virtually or electronically notifying the beneficiary of the insured passing away 2508; and/or (5) handling or processing the life insurance or will disposition virtually in the virtual world, such as the metaverse 2510. The method may include additional, less, or alternate actions, including those discussed elsewhere herein.

For instance, the computer-implemented method 2500 may include, via one or more local or remote processors, sensors, cameras, transceivers, servers, memory units, chat bots, and/or virtual headsets, receiving or creating digitalized data of, or associated with, the insured 2502. For instance, the insured may use a virtual headset (such as smart or virtual glasses or headset; or an AR, VR, or XR headset) and/or chatbot to virtually or audibly capture, collect, and/or digitalize (i) personal data and virtual user experience preference data; (ii) social media data; (iii) insured asset data (e.g., house(s), vehicle(s), and personal belonging data); (iv) financial account data; (v) life insurance data; (vi) will and/or trust data; and/or (vii) metaverse location and/or avatar data (such as a virtual location owned or associated with the insured, and a virtual avatar or other virtual character of, or associated with the insured). The beneficiary information and name may be extracted from the digitalized data.

The computer-implemented method 2500 may include, via one or more local or remote processors, sensors, cameras, transceivers, servers, memory units, chat bots, and/or virtual headsets, receiving or creating digitalized data of a beneficiary 2504. For instance, a life insurance or will beneficiary identified in the digitalized data of an insured (such as identified within digitalized will or life insurance data) may use a virtual headset and/or chat bot to capture or collect (i) personal data and virtual user experience preference data; (ii) social media data; (iii) financial account data; and/or (iv) metaverse location and avatar data (such as a beneficiary's home or other preferred location in the metaverse).

The computer-implemented method 2500 may include, via one or more local or remote processors, sensors, cameras, transceivers, servers, memory units, chat bots, and/or virtual headsets, receiving or generating a notification of the insured's passing away 2508. Additionally or alternatively, the beneficiary may generate a digitalized version of a death certificate, such as by using a virtual headset, or mobile device camera.

The computer-implemented method 2500 may include, via one or more local or remote processors, sensors, cameras, transceivers, servers, memory units, chat bots, and/or virtual headsets, handling or otherwise processing will and life insurance asset disposition virtually in a virtual world 2510. For instance, the beneficiary may be led through a will or life insurance bequeaths in a metaverse room or location of their choosing (such as determined from or identified within the beneficiary virtual user experience preferences determined previously), interacting with either a preferred virtual or actual agent, and allowing the beneficiary to select payment options or accounts virtually, visually, or audibly.

Virtual Crash Reconstruction for Headset Review

With some embodiments, vehicle crash data from vehicle sensors, vehicle telematics data, mobile device data, smart infrastructure data, and/or drones/aerial data associated with a vehicle crash may be collected from one or more data sources and local or remote sensors, transceivers, and processors. The insured or vehicle owner, driver, or passenger may collect additional vehicle crash data using a virtual headset, such as capturing images of each vehicle involved in the crash, the areas of the vehicle collision, and of each vehicle damaged.

The crash data collected may be utilized to generate a virtual crash reconstruction. The virtual crash reconstruction may be used to identify which AV (autonomous vehicle) or driver was at fault, or partially at fault, and/or determine other causes/factors (weather, construction, deer, etc.) contributing to the vehicle collision.

The virtual crash reconstruction may be downloaded or streamed to a virtual headset to facilitate and/or allow: (i) the insured and/or agent to review, adjust, and/or approve the accuracy of the virtual crash reconstruction; (ii) the claim handler to review or adjust the virtual crash reconstruction; and/or (iii) the insured and claim handler to view and/or adjust the virtual reconstruction together, and work together to build/confirm the reconstruction. Additionally or alternatively, the insured can utilize the virtual headset to build the reconstruction in real time as he or she describes the accident verbally or using movable icons.

The verified virtual crash reconstruction may be placed on, otherwise stored on, or streamed to, a blockchain for remote viewing to facilitate subrogation, claim processing, dispute resolution, etc. Certain embodiments may also use computer vision and/or connected infrastructure data to resolve disputes associated with insurance-related events.

Home Insurance-Related Events

In some embodiments, for home damage, such as fire or water damage, a budget for repair of the home and/or replacement of fixtures using the virtual headset and/or an associated chat bot. Data may be collected using a virtual headset (and/or home sensors, mobile device sensors, vehicle sensors, etc.). In some embodiments, home telematics or usage data (e.g., water or electricity usage and home occupancy data), and/or vehicle telematics data (acceleration, braking, cornering, location, etc.) may be utilized. ML may be utilized to identify problem(s), i.e., cause of the damage or potential damage, such as leaking pipes, faulty wiring, leaking roof, damaged foundation, etc., and/or to identify materials for repair/replacement. Virtual illustrations or graphical depictions may be generated depicting potential problems and/or repair materials for display on the virtual headset.

Home Remodeling

In some embodiments, a virtual headset may be utilized to facilitate home remodeling, such as kitchen or bathroom remodeling. For instance, a customer may utilize a virtual headset to capture images of a house via a home walk-through. From the data collected, sizes and dimensions of rooms may be identified. Audible or visual instructions may be provided to the customer as where to capture more images using the virtual headset. The virtual headset may provide or offer views of several potential remodeled kitchens (or other rooms) with different materials (e.g., different floors, stoves, refrigerators, counter tops, windows, different paint colors, etc.) and display their different costs for each virtual remodel; and once a remodeling option is visually or audibly selected by the customer, the customer may select financing options via the virtual headset and/or associated chat bot.

Homeowners Insurance

As noted elsewhere, in some embodiments, a customer may use a virtual headset to capture images of the interior and exterior of a house via a home walk-through. From ML or other processor analysis of the data collected, a homeowners insurance quote, personal articles insurance quote, auto insurance quote, home loan, and/or other quote may be generated. For instance, from analysis of the data, an offer for a home loan may be generated. As an example, for parametric insurance, the capture of the home data via the virtual headset may be used as a trigger to have a home loan offer and/or homeowners insurance quote generated and then presented via the virtual headset.

From ML or other processor analysis of the home data collected, areas of risk to the home may be identified to generate risk mitigation recommendations and/or insurance discounts. The data may be analyzed to (1) determine insurance coverage needs/endorsements/riders, etc.; (2) identify gaps in coverage, e.g., identify a boat or a second vehicle stored on the property, or extra structure on the property, that is currently uninsured or underinsured; (3) determine an inventory of items/personal articles about the home (again, such as by using ML or other techniques); (4) generate an personal articles insurance quote; and/or (5) for parametric insurance: based on a trigger event, such as a home total loss (wildfire, fire, hurricane, tornado, etc.), (i) generate a list of replacement items for the insured to review, adjust, and/or approve for automatic purchasing of all (or individually selected) items for replacement using the virtual headset and/or chat bot, and/or (ii) generate a potential insurance claim for the cost of the inventory of the items (for payout) for insured's review, modification, and/or approval via the virtual headset and/or chat bot.

Home Risk Mitigation

As noted, with some embodiments, the customer may utilize the virtual headset to capture images of interior and exterior of house via a home walk-through. After which, ML or other techniques may be utilized to identify sources of water damage and/or other risks, such as hoses or pipes breaking/leaking, water heaters, toilet connections, washing machine hoses, dishwasher hoses, etc. Processor analysis of the data collected may also be utilized to generate recommendations of potential fixes; display or otherwise visually represent fixes and/or repairs on the virtual headset; and generate potential discounts and display insurance savings on the virtual headset. Some embodiments may include partnering with various merchants to identify replacement and/or repair parts and their costs.

Certain embodiments may include utilizing processor analysis of the data collected to identify locations to position, and types of, lights and sensors to improve home security and other functionality.

The virtual headset may display the customer's house and images of risk to the house (such as trees, branches, potential ice, damaged shingles, etc.). Also, types of replacement roofing material may be identified, and an insurance discount may be depicted if the roofing materials are upgraded on the virtual headset.

Auto & Homeowners Insurance Applications

Figure 26:
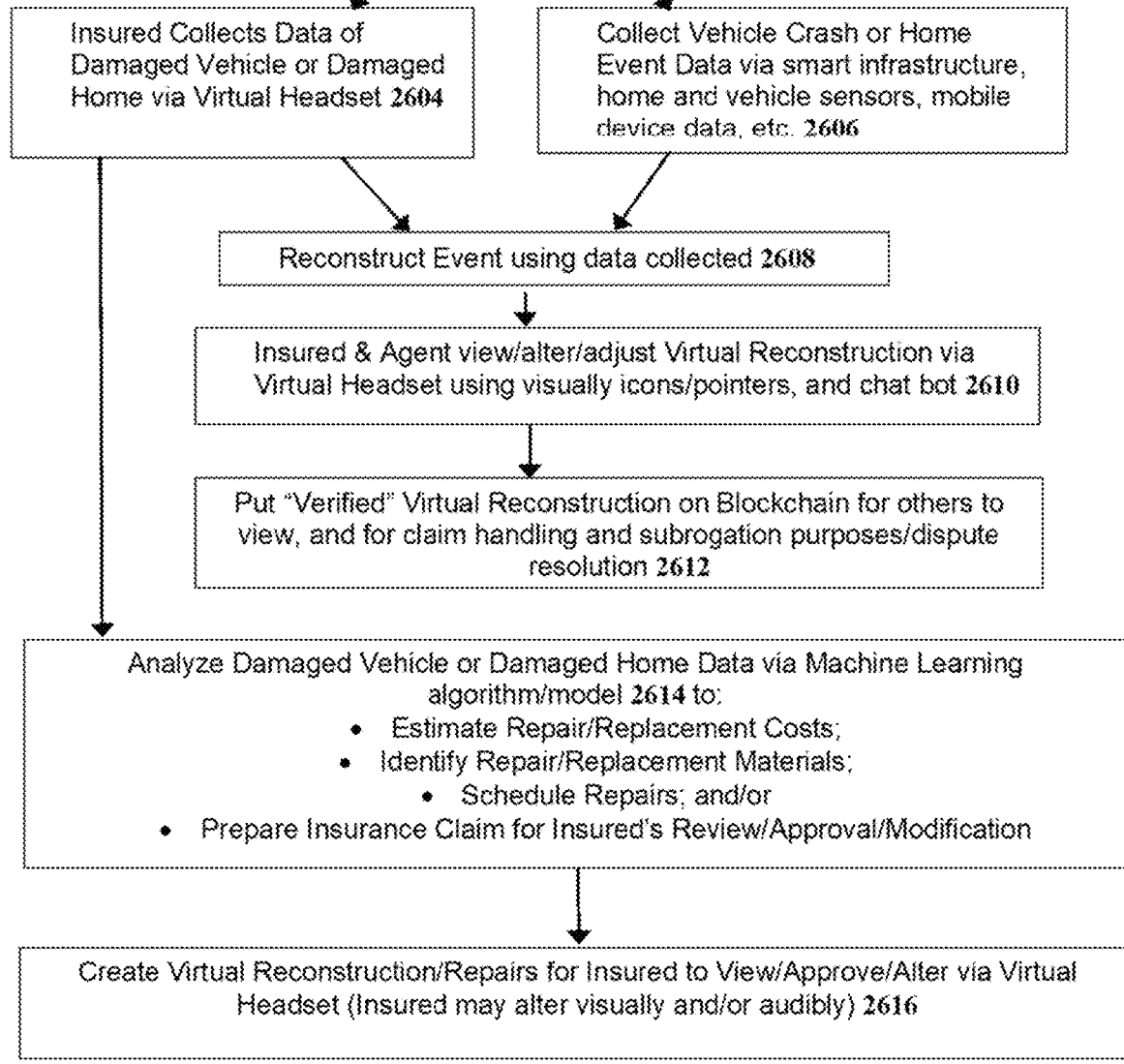
FIG. 26 illustrates an exemplary computer-implemented method of auto insurance and homeowners insurance virtual user experience applications.

FIG. 26 illustrates a computer-implemented method 2600 of auto insurance and homeowners insurance virtual applications. The computer-implemented method 2600 may be implemented via one or more local or remote processors, sensors, cameras, transceivers, servers, memory units, chat or voice bots, and/or virtual headsets. The virtual headsets may include AR (Augmented Reality) glasses or headsets, VR (Virtual Reality) glasses or headsets, XR (eXtended Reality) glasses or headsets, or other smart glasses or smart contacts. The headsets or glasses may include audible functionality, such as chat or voice bot functionality, or be configured to work with an associated chat or voice bot, such as a chat or voice bot working with a smart home controller and located within the home.

The computer-implemented method 2600 may include, via one or more local or remote processors, sensors, cameras, transceivers, servers, memory units, chat bots, and/or virtual headsets: (1) receiving or creating digitalized data of an insured 2602, such as via a virtual headset and/or chat bot; (2) collecting damaged vehicle data or damaged home data via a virtual headset and/or chat bot 2604; (3) collecting vehicle collision data or home event data via other data sources 2606, including vehicle telematics data; (4) creating a virtual reconstruction of the vehicle collision or home event 2608; (5) allowing the insured and/or agent to view the virtual reconstruction via a virtual headset, and modify and/or approve the virtual reconstruction via the virtual headset and/or a chat bot 2610; and/or (6) storing the approved virtual reconstruction on a blockchain for insurance claim handling and/or dispute resolution 2612. Additionally or alternatively, the method 2600 may also include, via one or more local or remote processors, sensors, cameras, transceivers, servers, memory units, chat bots, and/or virtual headsets: (7) analyzing the damaged vehicle data or damaged home data via a ML algorithm, model, or program 2614 to (i) estimate repair or replacement costs; (ii) identify repair or replacement materials (and respective suppliers of the materials); (iii) identify qualified and trusted contractors or body shops, and schedule repairs; and/or (iv) prepare an insurance claim for the insured's review, modification, and/or approval; and/or (8) creating a virtual depiction of the repair work and/or predicted final repaired vehicle or home for the insured to review, adjust, and/or approve 2616. The computer-implemented method may include additional, less, or alternate actions, including those discussed elsewhere herein.

The computer-implemented method 2600 may include, via one or more local or remote processors, sensors, cameras, transceivers, servers, memory units, chat bots, and/or virtual headsets, receiving or creating digitalized data of, or associated with, the insured 2602. For instance, the insured may use a virtual headset (such as smart or virtual glasses or headset; or an AR, VR, or XR headset) and/or chatbot to virtually or audibly capture, collect, and/or digitalize (i) personal data and virtual user experience preference data; (ii) social media data; (iii) insured asset data (e.g., house(s), vehicle(s), and personal belonging data); (iv) financial account data; (v) life insurance data, auto insurance data, homeowners insurance data, personal articles insurance data, etc.; (vi) will and/or trust data; and/or (vii) metaverse location and/or avatar data (such as a virtual location owned or associated with the insured, and a virtual avatar or other virtual character of, or associated with the insured).

After an insurance-related event occurs, such as an event that leads to vehicle or home damage, the computer-implemented method 2600 may include, via one or more local or remote processors, sensors, cameras, transceivers, servers, memory units, chat bots, and/or virtual headsets, receiving or creating digitalized data of the vehicle damage or home damage 2604. For instance, an insured may collect data (such as images or audible notes) of, or associated with, a damaged vehicle or damaged home via a virtual headset and/or chat bot.

The computer-implemented method 2600 may include, via one or more local or remote home-mounted sensors, vehicle-mounted sensors, mobile devices, drones, and/or smart infrastructure, collecting or generating data of, or associated with, the damaged vehicle or damaged home, respectively 2606. For instance, vehicle sensors and smart infrastructure data may be associated with, or show, a damaged vehicle or vehicle collision. Smart home sensor, vehicle sensors, or drones may collect data associated with a damaged home. Vehicle telematics data (e.g., acceleration, braking, cornering data) and home telematics data (e.g., electricity usage, water usage, home occupancy data) may also be collected.

The computer-implemented method 2600 may include, via one or more local or remote processors, sensors, cameras, transceivers, servers, memory units, chat bots, and/or virtual headsets, reconstructing the insurance-related event leading to the vehicle or home data using all, or a portion, of the data collected 2608. For instance, a virtual reconstruction of the insurance-related event may be generated or generated via one or more processors and servers.

The computer-implemented method 2600 may include (via one or more local or remote processors, sensors, cameras, transceivers, servers, memory units, chat bots, and/or virtual headsets), viewing, altering, and/or approving the virtual reconstruction via a virtual headset 2610. For instance, the insured and/or agent may view the virtual reconstruction, and adjust or alter the virtual reconstruction visually using icons or graphic points, and/or audibly. As an example, the insured may visually move a tree, street light or sign, pedestrians, or vehicles that are represented graphically or by icons, or audibly (via the headset or an associated chat bot), such as by "Move the pine tree three feet to West"; "Add another pedestrian on the East side of the road"; or "Move the black SUV into the passing lane"; or the like.

After the virtual reconstruction is generated and/or approved by the insured, the computer-implemented method 2600 may include, via one or more local or remote processors, sensors, cameras, transceivers, servers, memory units, chat bots, and/or virtual headsets, placing or otherwise storing the virtual reconstruction on a blockchain for others to view, and for claim handling and dispute resolution 2612. For instance, the virtual reconstruction may be used for subrogation purposes and/or to determine one or more causes for vehicle damage or home damage, respectively.

The computer-implemented method 2600 may include, via one or more local or remote processors, sensors, cameras, transceivers, servers, memory units, chat bots, and/or virtual headsets, analyzing the damaged vehicle or damaged home data via a ML algorithm, model, or program (or using other techniques, such as pattern recognition techniques) 2614 to (i) estimate repair and/or replacement costs; (ii) identify repair and/or replacement materials and suppliers; (iii) schedule repairs with trusted and qualified contractors; and/or (iv) prepare a virtual insurance claim for the insured's review, approval, or modification.

The computer-implemented method 2600 may include, via one or more local or remote processors, sensors, cameras, transceivers, servers, memory units, chat bots, and/or virtual headsets, creating virtual reconstructions or scenarios 2616 depicting or visually displaying, and/or audibly presenting (a) the estimated repair/replacement costs; (b) the repair/replacement materials, suppliers, and/or costs; (c) available contractors, dates for repair work to be performed, contractor rating, and/or virtual calendar of the insured; and/or (d) the virtual insurance claim generated. The insured may view, alter, and/or approve the repair materials, replacement materials, contractors, insurance claim, etc. via the visually or audibly using the headset and/or an associated chat bot or chat bot functionality. The virtual reconstructions may be personalized based upon the insured's preferences, such as noted elsewhere herein, to present a personalized virtual user experience to the insured.

Homeowners Insurance Applications

FIG. 27 illustrates a computer-implemented method 2700 of auto insurance and homeowners insurance virtual applications. The computer-implemented method 2700 may be implemented via one or more local or remote processors, sensors, cameras, transceivers, servers, memory units, chat or voice bots, and/or virtual headsets. The virtual headsets may include AR (Augmented Reality) glasses or headsets, VR (Virtual Reality) glasses or headsets, XR (eXtended Reality) glasses or headsets, or other smart glasses or smart contacts. The headsets or glasses may include audible functionality, such as chat or voice bot functionality, or be configured to work with an associated chat or voice bot, such as a chat or voice bot working with a smart home controller and located within the home.

The computer-implemented method 2700 may include, via one or more local or remote processors, sensors, cameras, transceivers, servers, memory units, chat bots, and/or virtual headsets: (1) receiving or creating digitalized data of an insured 2702, such as via a virtual headset and/or chat bot; (2) guiding the insured through a walk-through of their house and belongings wearing the virtual headset to capture data, such as images and audible input, associated with, or of, their belongings (e.g., home, home features and characteristics, vehicles, boats, yard, fixtures, etc.) 2704; (3) utilizing ML to analyze the data captured and identify areas of risk associated with, or located about, the home and yard 2706; (4) identifying risk or potential damage mitigating or corrective actions, and offering homeowners and other insurance discounts if corrective actions are taken 2708; (5) utilizing ML to analyze the data captured and identify areas of interest and items associated with, or located about, the home and yard 2710 (e.g., personal articles, home, home features and characteristics, vehicles, boats, fixtures, etc.); (6) generating a personal articles, homeowners, or auto insurance quote 2712; (7) analyzing the data captured and digitalized data of the insured to identify insurable assets that are uninsured or underinsured (such as insurance for vehicles or boats located on the property, or for structures located on the property, such as a shed or garage), and generating and sending a virtual insurance quote to the insured for viewing on a virtual headset 2714; (8) upon detecting an insurance-related event from analysis of home or other sensor data, generating an insurance claim for the insured related to repair of the home and vehicles, or financial cost or replacement of their personal belongings 2716; (9) creating visual depictions of home remodeling options for viewing on a virtual headset 2718; and/or (10) allowing the insured to view, adjust, or approve one or more of the home remodeling options via the virtual headset and/or chat bot 2720. The computer-implemented method may include additional, less, or alternate actions, including those discussed elsewhere herein.

The computer-implemented method 2700 may include, via one or more local or remote processors, sensors, cameras, transceivers, servers, memory units, chat bots, and/or virtual headsets, receiving or creating digitalized data of, or associated with, the insured 2702. For instance, the insured may use a virtual headset (such as smart or virtual glasses or headset; or an AR, VR, or XR headset) and/or chatbot to virtually or audibly capture, collect, and/or digitalize (i) personal data and virtual user experience preferences; (ii) social media data; (iii) insured asset data (e.g., house(s), vehicle(s), and personal belonging data); (iv) financial account data; (v) life insurance data, auto insurance data, homeowners insurance data, personal articles insurance data, etc.; (vi) will and/or trust data; and/or (vii) metaverse location and/or avatar data (such as a virtual location owned or associated with the insured, and a virtual avatar or other virtual character of, or associated with the insured).

The computer-implemented method 2700 may include, via one or more local or remote processors, sensors, cameras, transceivers, servers, memory units, chat bots, and/or virtual headsets, guiding the insured through a walk-through of their house and belongings wearing the virtual headset to capture data, such as images and audible input, associated with or of their belongings (e.g., home, home features and characteristics, vehicles, boats, yard, fixtures, etc.) 2704. For instance, video or images (and audible notes) collected of the home, yard, and belongings and analyzed to determine whether the items and home features can be identified. If not, visual or audible instructions may be provided via the headset for the user to collect additional video or images of certain items or home areas for further processor analysis.

The computer-implemented method 2700 may include, via one or more local or remote processors, sensors, cameras, transceivers, servers, memory units, chat bots, and/or virtual headsets, utilizing ML to analyze the image and/or audio data captured and identify areas of risk associated with, or located about, the home and yard 2706. For instance, after a home walk-through collects data via a headset, the data may be input into a trained ML program that is trained to identify risks of home damage, such as (i) leaking faucets, pipes, hoses, dishwasher hoses, washing machine hoses; (ii) damaged or decaying roofing materials or shingles, or siding materials; (iii) over grown trees or shrubbery, such as risk of falling trees, or wildfire hazards too close to a home; etc.

The computer-implemented method 2700 may include, via one or more local or remote processors, sensors, cameras, transceivers, servers, memory units, chat bots, and/or virtual headsets, identifying risk or damage mitigating or corrective actions, and offering homeowners and other insurance discounts if corrective actions are taken 2708. For instance, visual representations of corrective actions may be presented (such as fixing leaking hoses or making other home repairs, trimming tree limbs or shrubbery, repairing damaged roofs, installing home lighting for security, etc.). Repair or replacement parts or materials and suppliers may be identified and depicted visually via the virtual headset or audibly via the chat bot.

The computer-implemented method 2700 may include, via one or more local or remote processors, sensors, cameras, transceivers, servers, memory units, chat bots, and/or virtual headsets, utilizing ML to analyze the data captured and identify areas of interest and items associated with, or located about, the home and yard 2710 (e.g., personal articles, home, home features and characteristics, vehicles, boats, fixtures, etc.).

The computer-implemented method 2700 may include, via one or more local or remote processors, sensors, cameras, transceivers, servers, memory units, chat bots, and/or virtual headsets, generating a personal articles, homeowners, or auto insurance quote 2712. The quotes may be based upon home features and characteristics, personal articles, and/or vehicle and vehicle features identified from processor analysis of the data collected via the virtual headset.

The computer-implemented method 2700 may include, via one or more local or remote processors, sensors, cameras, transceivers, servers, memory units, chat bots, and/or virtual headsets, analyzing the data captured and digitalized data of the insured to identify insurable assets that are uninsured or underinsured (such as insurance for vehicles or boats located on the property, or for structures located on the property, such as a shed or garage), and generating and sending a virtual insurance quote to the insured for viewing on a virtual headset 2714. For instance, the virtual headset itself may analyze the items in view in real-time, determine that an item is uninsured (such as a boat parked in the backyard), and generate an insurance quote for review on the visual headset.

The computer-implemented method 2700 may include, via one or more local or remote processors, sensors, cameras, transceivers, servers, memory units, chat bots, and/or virtual headsets, upon detecting an insurance-related event from analysis of home or other sensor data, generating an insurance claim for the insured related to the repair of the home and vehicles, or the financial cost or replacement of their personal belongings 2716. For instance, if there is smoke damage in one or more rooms of the house due to a fire, repair materials and costs may be identified via one or more local or remote processors and then visually and/or audibly presented to the insured via the headset.

The computer-implemented method 2700 may include, via one or more local or remote processors, sensors, cameras, transceivers, servers, memory units, chat bots, and/or virtual headsets, creating visual depictions of home remodeling options for viewing on a virtual headset 2718. For instance, various options for bath or kitchen remodeling may be visually depicted on, and/or audibly presented via, the virtual headset. Different materials and different costs may also be visually displayed or audibly presented to the insured for the review.

The computer-implemented method 2700 may include, via one or more local or remote processors, sensors, cameras, transceivers, servers, memory units, chat bots, and/or virtual headsets, allowing the insured to view, adjust, or approve one or more of the home remodeling options via the virtual headset and/or chat bot 2720. For instance, the insured may alter or adjust the remodeling plans via visual selections (different material selections, different contractor options, different timetable selections for the work being performed) and/or audible interaction(s) with the virtual headset and/or chat bot.

EXEMPLARY EMBODIMENTS

In one aspect, a computer-implemented method of distributing assets in a virtual world via a virtual headset may be provided. The method may include (1) receiving or creating, via an insured virtual headset and/or chat bot associated with an insured, digitalized data of, or associated with, the insured; (2) adjusting and/or approving, via the insured virtual headset and/or chat bot associated with an insured, a listing of assets and a disposition of assets belonging to the insured; (3) receiving or creating, via a beneficiary virtual headset and/or chat bot associated with a beneficiary, digitalized data of, or associated with, the beneficiary; (4) creating, via the beneficiary virtual headset and/or chat bot associated with the beneficiary, a personalized virtual user experience for the beneficiary (that is personalized using one or more visual, graphic, or audible inputs and/or settings selected by beneficiary or predicted for the beneficiary based upon the digitalized data of, or associated with, the beneficiary); (5) capturing or receiving, via the beneficiary virtual headset and/or a chat bot associated with the beneficiary, a digital death certificate of the insured captured by the beneficiary; and/or (6) handling or otherwise processing, via the beneficiary virtual headset and/or a chat bot associated with the beneficiary, the disposition of one or more assets identified in the (i) digital or virtual will, or (ii) digital or virtual life insurance policy in a virtual world via the beneficiary virtual headset and/or chat bot, the virtual world reflecting the personalized virtual user experience for the beneficiary. The method may include additional, less, or alternate actions, including those discussed elsewhere herein.

For instance, creating, via the beneficiary virtual headset and/or chat bot associated with the beneficiary, a personalized virtual user experience for the beneficiary may include (i) determining or receiving preference metaverse location for virtual interactions and experiences of the beneficiary; (ii) receiving one or more visual or audible selections entered by the beneficiary via the virtual headset and/or associated chat bot; and/or (iii) predicting preferred virtual experience settings for the beneficiary based upon the digitalized data of, or associated with, the beneficiary, the digitalized data of the beneficiary including social media posts and the settings including visually or audible settings.

The receiving or creating, via an insured virtual headset and/or chat bot associated with an insured, digitalized data of, or associated with, the insured may include the insured capturing images of an insurance policy or will via the virtual headset to generate a digitalized insurance policy or will.

In another aspect, a computer-implemented method of creating a virtual reconstruction of an insurance-related event may be provided. The method may include (1) receiving or creating, via an insured virtual headset and/or chat bot associated with an insured, digitalized data of, or associated with, the insured; (2) receiving or creating, via an insured virtual headset and/or chat bot associated with an insured, digitalized data of, or associated with a damaged vehicle or damaged home; (3) receiving or creating, via one or more additional sources (e.g., vehicle sensors, home sensors, smart infrastructure), digitalized data of, or associated with a damaged vehicle or damaged home; (4) virtually reconstructing, via one or more processors and/or the virtual headset, the insurance-related event that caused the vehicle damage or home damage, respectively; and/or (5) displaying or presenting the virtual reconstruction via the virtual headset to facilitate the insured or agent to view, alter, or approve the virtual reconstruction. The method may include additional, less, or alternate actions, including those discussed elsewhere herein.

For instance, the method may include inputting the damaged vehicle or damage home data into a ML program that is trained to (i) estimate repair or replacement costs; (ii) identify repair or replacement materials; (iii) schedule repairs with body shops or home contractors; and/or (iv) prepare a pre-populated virtual insurance claim for the insured's review, modification, or approval. The method may also include (a) using the output of the ML program to generate virtual or visual depictions of (i) the estimated repair or replacement costs; (ii) the identified repair or replacement materials; (iii) the scheduled repairs with body shops or home contractors; and/or (iv) the prepare a pre-populated virtual insurance claim for the insured's review, modification, or approval; and/or (b) depict or display the virtual or visual depictions on the virtual headset for the insured's review, modification, or approval.

In another aspect, a computer-implemented method of creating a virtual reconstruction of a home may be provided. The method may include (1) receiving or creating, via an insured virtual headset and/or chat bot associated with an insured, digitalized data of, or associated with, the insured; (2) receiving or creating, via an insured virtual headset and/or chat bot associated with an insured, digitalized data of, or associated with a home, the insured being guided during a home walk-through to capture digitalized home data; (3) receiving or creating, via one or more additional sources (e.g., vehicle sensors, home sensors, smart infrastructure), digitalized data of, or associated with the home; and/or (4) inputting the digitalized home data received or generated, via one or more processors, into a trained ML program that is trained to identify home features and characteristics, personal belongings, and/or risks of home damage from analysis of the digitalized home data. The method may include additional, less, or alternate actions, including those discussed elsewhere herein.

For instance, the method may include creating, via one or more processors, a virtual reconstruction of a home displaying the risks of home damage identified by the ML program; and/or displaying or presenting, via one or more processors and/or the insured virtual headset, the virtual reconstruction including the risks of home damage on the insured virtual headset for the insured to view. The method may also include (i) identifying mitigating or corrective actions, via one or more processors and/or ML programs, to reduce the risk of home damage; (ii) creating, via one or more processors and/or the insured virtual headset, a virtual reconstruction of the home displaying the corrective actions; and/or (iii) displaying or presenting, via one or more processors and/or the insured virtual headset, the virtual reconstruction including the corrective actions on the insured virtual headset for the insured to view.

The method may also include (i) creating, via one or more processors and/or the insured virtual headset, one or more home remodeling options based upon the home data collected, the remodeling options including descriptions of materials, costs, suppliers, and/or contractors; and/or (ii) displaying, via one or more processors and/or the insured virtual headset, a virtual depiction of the one or more remodeling options for the insured's review, modification, and/or approval. The method may also include accepting, via one or more processors and/or the insured virtual headset, user selection of (a) materials to be used; (b) contractors to be used, and/or (c) times or days the work is to be performed for the one or more remodeling options.

Exemplary Aspects

The following, non-exclusive list includes various aspects explicitly contemplated by the present disclosure:

Aspect 1. A computer-implemented method of distributing assets in a virtual world via a virtual headset, the method comprising: receiving or creating, via an insured virtual headset and/or chat bot associated with an insured, digitalized data of, or associated with, the insured; adjusting and/or approving, via an insured virtual headset and/or chat bot associated with an insured, a listing of assets and a disposition of assets belonging to the insured; receiving or creating, via a beneficiary virtual headset and/or chat bot associated with a beneficiary, digitalized data of, or associated with, the beneficiary; creating, via the beneficiary virtual headset and/or chat bot associated with the beneficiary, a personalized virtual user experience for the beneficiary (that is personalized using one or more visual, graphic, or audible inputs and/or settings selected by beneficiary or predicted for the beneficiary based upon the digitalized data of, or associated with, the beneficiary); capturing or receiving, via the beneficiary virtual headset and/or a chat bot associated with the beneficiary, a digital death certificate of the insured captured by the beneficiary; and/or handling or otherwise processing, via the beneficiary virtual headset and/or a chat bot associated with the beneficiary, the disposition of one or more assets identified in the (i) digital or virtual will, or (ii) digital or virtual life insurance policy in a virtual world via the beneficiary virtual headset and/or chat bot, the virtual world reflecting the personalized virtual user experience for the beneficiary.

Aspect 2. The computer-implemented method of aspect 1, wherein creating, via the beneficiary virtual headset and/or chat bot associated with the beneficiary, a personalized virtual user experience for the beneficiary includes determining or receiving preference metaverse location for virtual interactions and experiences of the beneficiary.

Aspect 3. The computer-implemented method of aspect 1, wherein creating, via the beneficiary virtual headset and/or chat bot associated with the beneficiary, a personalized virtual user experience for the beneficiary includes receiving one or more visual or audible selections entered by the beneficiary via the virtual headset and/or associated chat bot.

Aspect 4. The computer-implemented method of aspect 1, wherein creating, via the beneficiary virtual headset and/or chat bot associated with the beneficiary, a personalized virtual user experience for the beneficiary includes predicting preferred virtual experience settings for the beneficiary based upon the digitalized data of, or associated with, the beneficiary, the digitalized data of the beneficiary including social media posts and the settings including visually or audible settings.

Aspect 5. The computer-implemented method of aspect 1, wherein receiving or creating, via an insured virtual headset and/or chat bot associated with an insured, digitalized data of, or associated with, the insured includes the insured capturing images of an insurance policy or will via the virtual headset to create a digitalized insurance policy or will.

Aspect 6. A computer-implemented method of creating a virtual reconstruction of an insurance-related event, the method comprising: receiving or creating, via an insured virtual headset and/or chat bot associated with an insured, digitalized data of, or associated with, the insured; receiving or creating, via an insured virtual headset and/or chat bot associated with an insured, digitalized data of, or associated with a damaged vehicle or damaged home; receiving or creating, via one or more additional sources (e.g., vehicle sensors, home sensors, smart infrastructure), digitalized data of, or associated with a damaged vehicle or damaged home; virtually reconstructing, via one or more processors and/or the virtual headset, the insurance-related event that caused the vehicle damage or home damage, respectively; and/or placing or presenting, via the virtual reconstruction via the virtual headset to facilitate the insured or agent to view, alter, or approve the virtual reconstruction.

Aspect 7. The computer-implemented method of aspect 6, the method comprising: inputting the damaged vehicle or damage home data into a machine learning program that is trained to (i) estimate repair or replacement costs; (ii) identify repair or replacement materials; (iii) schedule repairs with body shops or home contractors; and/or (iv) prepare a pre-populated virtual insurance aspect for the insured's review, modification, or approval.

Aspect 8. The computer-implemented method of aspect 7, the method comprising: using the output of the machine learning program to general virtual or visual depictions of (i) the estimated repair or replacement costs; (ii) the identified repair or replacement materials; (iii) the scheduled repairs with body shops or home contractors; and/or (iv) the prepared pre-populated virtual insurance aspect for the insured's review, modification, or approval; and depicting or displaying the virtual or visual depictions on the virtual headset for the insured's review, modification, or approval.

Aspect 9. A computer-implemented method of creating a virtual reconstruction of a home, the method comprising: receiving or creating, via an insured virtual headset and/or chat bot associated with an insured, digitalized data of, or associated with, the insured; receiving or creating, via an insured virtual headset and/or chat bot associated with an insured, digitalized data of, or associated with a home, the insured being guided during a home walk-through to capture digitalized home data; receiving or creating, via one or more additional sources (e.g., vehicle sensors, home sensors, smart infrastructure), digitalized data of, or associated with the home; and/or inputting the digitalized home data received or created, via one or more processors, into a trained machine learning program that is trained to identify home features and characteristics, personal belongings, and/or risks of home damage from analysis of the digitalized home data.

Aspect 10. The computer-implemented method of aspect 9, the method further comprising: creating, via one or more processors, a virtual reconstruction of a home displaying the risks of home damage identified by the machine learning program; and displaying or presenting, via one or more processors and/or the insured virtual headset, the virtual reconstruction including the risks of home damage on the insured virtual headset for the insured to view.

Aspect 11. The computer-implemented method of aspect 10, the method further comprising: identifying mitigating or corrective actions, via one or more processors and/or machine learning programs, to reduce the risk of home damage; creating, via one or more processors and/or the insured virtual headset, a virtual reconstruction of the home displaying the corrective actions; and displaying or presenting, via one or more processors and/or the insured virtual headset, the virtual reconstruction including the corrective actions on the insured virtual headset for the insured to view.

Aspect 12. The computer-implemented method of aspect 9, the method further comprising: creating, via one or more processors and/or the insured virtual headset, one or more home remodeling options based upon the home data collected, the remodeling options including descriptions of materials, costs, suppliers, and/or contractors; and displaying, via one or more processors and/or the insured virtual headset, a virtual depiction of the one or more remodeling options for the insured's review, modification, and/or approval.

Aspect 13. The computer-implemented method of aspect 12, the method further comprising: accepting, via one or more processors and/or the insured virtual headset, user selection of materials to be used, contractors to be used, and times or days the work is to be performed for the one or more remodeling options.

Aspect 14. A computer-implemented method, comprising: obtaining one or more extended reality (XR) preferences for a party; presenting, using one or more devices associated with the party: instructions constructed to guide the party to move throughout or around a real property, and prompts constructed to direct the party to capture data representing one or more of the real property or belongings; determining, by one or more processors processing the captured data, asset data representing one or more of the real property or the belongings; and presenting, in a virtualized environment in accordance with the party's XR preferences via an XR device, one or more visual depictions of the determined asset data such that the party or an insurance representative can at least one of view, modify, or approve the asset data.

Aspect 15. The computer-implemented method of aspect 14, wherein the one or more devices associated with the party include an XR device, and wherein presenting the instructions and prompts includes overlaying the instructions and prompts on real-world content viewed using the XR device.

Aspect 16. The computer-implemented method of aspect 14, wherein determining the asset data includes processing input data representing the captured data using one or more configured and trained machine learning models.

Aspect 17. The computer-implemented method of aspect 16, wherein the captured data includes images or video frames, and wherein the one or more machine learning models are configured and trained to process the images or the video frames to one or more of (i) identify the belongings, (ii) determine details or information related to the belongings, or (iii) identify features of the real property, (ii) determine details or information related to the features.

Aspect 18. The computer-implemented method of aspect 14, wherein obtaining the XR preferences includes obtaining the XR preferences using the XR device.

Aspect 19. The computer-implemented method of aspect 14, wherein the XR preferences represent one or more of profile data for the party, virtual interaction preferences, metaverse preferences, or avatar preferences.

Aspect 20. The computer-implemented method of aspect 14, wherein determining the asset data includes identifying one or more of (i) features of the real property, (ii) construction materials, or (iii) the belongings, and the method further comprises: generating a quote for an insurance policy for the party based upon the asset data, wherein at least one of the one or more visual depictions represents the quote for the insurance policy such that the party or the insurance representative can at least one of view, modify, or accept the quote.

Aspect 21. The computer-implemented method of aspect 20, wherein the insurance policy includes a home insurance policy, a car insurance policy, a watercraft insurance policy, a special rider, or a personal belongings insurance policy.

Aspect 22. The computer-implemented method of aspect 14, wherein the captured data represents one or more of (i) a damage-causing event involving the real property, or the belongings, (ii) a damage scene, (iii) damage to the real property, the belongings, or other objects, (iv) injuries to persons, (v) events or circumstances surrounding the damage-causing event, or (vi) conditions at the time of the damage-causing event.

Aspect 23. The computer-implemented method of aspect 22, further comprising: processing the captured data and the asset data to generate an insurance claim that includes repair or replacement costs for damaged portions of the real property, or damaged belongings.

Aspect 24. The computer-implemented method of aspect 22, further comprising: generating, based upon the captured data, a virtual reconstruction of the damage-causing event, wherein at least one of the one or more visual depictions includes the virtual reconstruction such that the party or an insurance representative can at least one of view, modify, or approve the virtual reconstruction.

Aspect 25. The computer-implemented method of aspect 24, further comprising: obtaining, using one or more sensors, sensor data related to the damage-causing event, wherein the virtual reconstruction is generated based upon the data and the sensor data.

Aspect 26. The computer-implemented method of aspect 25, wherein the one or more sensors are associated with one or more of the real property, one or more of the, a smart-device infrastructure, or an Internet-of-things infrastructure.

Aspect 27. The computer-implemented method of aspect 26, wherein the damage-causing event includes one or more of a storm, high wind, ice, snow, water, fire, lightning, a flood, a hurricane, a tornado, a mudslide, an earthquake, objects or vehicles striking the home, an electrical fault, a leaking pipe, faulty wiring, a leaking roof, or settling or collapse due to a damaged foundation.

Aspect 28. The computer-implemented method of aspect 24, wherein determining the asset data includes determining one or more potential damage risks to the real property, or the belongings.

Aspect 29. The computer-implemented method of aspect 28, further comprising: determining, by one or more processors processing the captured data, the asset data, and second data representing risk mitigation, one or more risk mitigation options for the one or more potential damage risks, wherein at least one of the one or more visual depictions includes the risk mitigation options.

Aspect 30. The computer-implemented method of aspect 29, further comprising: determining one or more discount offers for an insurance policy available in response to implementing one or more of the risk mitigation options.

Aspect 31. The computer-implemented method of aspect 30, further comprising: obtaining, using one or more sensors, sensor data related to the real property, or the belongings, wherein the potential damage risks are determined based upon the data, the asset data, and the sensor data.

Aspect 32. The computer-implemented method of aspect 14, wherein determining the asset data includes: identifying a potential remodeling project for the real property; determining one or more of potential layouts, components, materials, costs, suppliers, or contractors for the remodeling project; generating a virtual representation of a potential result of the remodeling project, wherein at least one of the one or more visual depictions includes the virtual representation.

Aspect 33. The computer-implemented method of aspect 32, further comprising: determining one or more potential finance options for the remodeling project, wherein at least one of the one or more visual depictions includes the one or more potential finance options, such that the party or an insurance representative can at least one of view, modify, or accept a finance option.

Aspect 34. A system, comprising: a communication interface configured to receive one or more extended reality (XR) preferences for a party; and one or more processors configured to: present, using one or more devices associated with the party: instructions constructed to guide the party to move throughout or around a real property, and prompts constructed to direct the party to capture data representing one or more of the real property or belongings; determine, by processing the captured data, asset data representing one or more of the real property or the belongings; and present, in a virtualized environment in accordance with the party's XR preferences via an XR device, one or more visual depictions of the determined asset data such that the party or an insurance representative can at least one of view, modify, or approve the asset data.

Aspect 35. The system of aspect 34, wherein the one or more devices associated with the party include an XR device, and wherein presenting the instructions and prompts includes overlaying the instructions and prompts on real-world content viewed using the XR device.

Aspect 36. The system of aspect 34, wherein the one or more processors are configured to determine the asset data by processing input data representing the captured data using one or more configured and trained machine learning models.

Aspect 37. The system of aspect 36, wherein the captured data includes images or video frames, and wherein the one or more machine learning models are configured and trained to process the images or the video frames to one or more of (i) identify the belongings, (ii) determine details or information related to the belongings, or (iii) identify features of the real property, (ii) determine details or information related to the features.

Aspect 38. The system of aspect 34, wherein the one or more processors are configured to: obtain the XR preferences by obtaining the XR preferences using the XR device.

Aspect 39. The system of aspect 34, wherein the XR preferences represent one or more of profile data for the party, virtual interaction preferences, metaverse preferences, or avatar preferences.

Aspect 40. The system of aspect 34, wherein the one or more processors are configured to: determine the asset data by identifying one or more of (i) features of the real property, (ii) construction materials, or (iii) the belongings; and generate a quote for an insurance policy for the party based upon the asset data, wherein at least one of the one or more visual depictions represents the quote for the insurance policy such that the party or the insurance representative can at least one of view, modify, or accept the quote.

Aspect 41. The system of aspect 34, wherein the captured data represents one or more of (i) a damage-causing event involving the real property, or the belongings, (ii) a damage scene, (iii) damage to the real property, the belongings, or other objects, (iv) injuries to persons, (v) events or circumstances surrounding the damage-causing event, or (vi) conditions at the time of the damage-causing event.

Aspect 42. The system of aspect 41, wherein the one or more processors are configured to: process the captured data and the asset data to generate an insurance claim that includes repair or replacement costs for damaged portions of the real property, or damaged belongings.

Aspect 43. The system of aspect 41, wherein the one or more processors are configured to: generate, based upon the captured data, a virtual reconstruction of the damage-causing event, wherein at least one of the one or more visual depictions includes the virtual reconstruction such that the party or an insurance representative can at least one of view, modify, or approve the virtual reconstruction.

Aspect 44. The system of aspect 34, wherein the one or more processors are configured to: determine the asset data by determining one or more potential damage risks to the real property, or the belongings.

Aspect 45. The system of aspect 44, wherein the one or more processors are configured to: determine, by processing the captured data, the asset data, and second data representing risk mitigation, one or more risk mitigation options for the one or more potential damage risks, wherein at least one of the one or more visual depictions includes the risk mitigation options.

Aspect 46. The system of aspect 45, wherein the one or more processors are configured to: determine one or more discount offers for an insurance policy available in response to implementing one or more of the risk mitigation options.

Aspect 47. The system of aspect 34, wherein the one or more processors are configured to determine the asset data by: identifying a potential remodeling project for the real property; determining one or more of potential layouts, components, materials, costs, suppliers, or contractors for the remodeling project; generating a virtual representation of a potential result of the remodeling project, wherein at least one of the one or more visual depictions includes the virtual representation.

Aspect 48. The system of aspect 47, wherein the one or more processors are configured to: determine one or more potential finance options for the remodeling project, wherein at least one of the one or more visual depictions includes the one or more potential finance options, such that the party or an insurance representative can at least one of view, modify, or accept a finance option.

Aspect 49. A non-transitory computer-readable storage medium storing instructions that, when executed by one or more processors, cause a system to: obtain one or more extended reality (XR) preferences for a party; present, using one or more devices associated with the party: instructions constructed to guide the party to move throughout or around a real property, and prompts constructed to direct the party to capture data representing one or more of the real property or belongings; determine, by processing the captured data, asset data representing one or more of the real property or the belongings; and present, in a virtualized environment in accordance with the party's XR preferences via an XR device, one or more visual depictions of the determined asset data such that the party or an insurance representative can at least one of view, modify, or approve the asset data.

Aspect 50. The storage medium of aspect 49, wherein the one or more devices associated with the party include an XR device, and wherein presenting the instructions and prompts includes overlaying the instructions and prompts on real-world content viewed using the XR device.

Aspect 51. The storage medium of aspect 49, wherein the instructions, when executed by the one or more processors, cause the system to determine the asset data by processing input data representing the captured data using one or more configured and trained machine learning models.

Aspect 52. The storage medium of aspect 51, wherein the captured data includes images or video frames, and wherein the one or more machine learning models are configured and trained to process the images or the video frames to one or more of (i) identify the belongings, (ii) determine details or information related to the belongings, or (iii) identify features of the real property, (ii) determine details or information related to the features.

Aspect 53. The storage medium of aspect 49, wherein the instructions, when executed by the one or more processors, cause the system to: obtain the XR preferences by obtaining the XR preferences using the XR device.

Aspect 54. The storage medium of aspect 49, wherein the XR preferences represent one or more of profile data for the party, virtual interaction preferences, metaverse preferences, or avatar preferences.

Aspect 55. The storage medium of aspect 49, wherein the instructions, when executed by the one or more processors, cause the system to: determine the asset data by identifying one or more of (i) features of the real property, (ii) construction materials, or (iii) the belongings; and generate a quote for an insurance policy for the party based upon the asset data, wherein at least one of the one or more visual depictions represents the quote for the insurance policy such that the party or the insurance representative can at least one of view, modify, or accept the quote.

Aspect 56. The storage medium of aspect 49, wherein the captured data represents one or more of (i) a damage-causing event involving the real property, or the belongings, (ii) a damage scene, (iii) damage to the real property, the belongings, or other objects, (iv) injuries to persons, (v) events or circumstances surrounding the damage-causing event, or (vi) conditions at the time of the damage-causing event.

Aspect 57. The storage medium of aspect 56, wherein the instructions, when executed by the one or more processors, cause the system to: process the captured data and the asset data to generate an insurance claim that includes repair or replacement costs for damaged portions of the real property, or damaged belongings.

Aspect 58. The storage medium of aspect 56, wherein the instructions, when executed by the one or more processors, cause the system to: generate, based upon the captured data, a virtual reconstruction of the damage-causing event, wherein at least one of the one or more visual depictions includes the virtual reconstruction such that the party or an insurance representative can at least one of view, modify, or approve the virtual reconstruction.

Aspect 59. The storage medium of aspect 49, wherein the instructions, when executed by the one or more processors, cause the system to: determine the asset data by determining one or more potential damage risks to the real property, or the belongings.

Aspect 60. The storage medium of aspect 49, wherein the instructions, when executed by the one or more processors, cause the system to: determine, by processing the captured data, the asset data, and second data representing risk mitigation, one or more risk mitigation options for the one or more potential damage risks, wherein at least one of the one or more visual depictions includes the risk mitigation options.

Aspect 61. The storage medium of aspect 60, wherein the instructions, when executed by the one or more processors, cause the system to: determine one or more discount offers for an insurance policy available in response to implementing one or more of the risk mitigation options.

Aspect 62. The storage medium of aspect 49, wherein the instructions, when executed by the one or more processors, cause the system to determine the asset data by: identifying a potential remodeling project for the real property; determining one or more of potential layouts, components, materials, costs, suppliers, or contractors for the remodeling project; generating a virtual representation of a potential result of the remodeling project, wherein at least one of the one or more visual depictions includes the virtual representation.

Aspect 63. The storage medium of aspect 62, wherein the instructions, when executed by the one or more processors, cause the system to: determine one or more potential finance options for the remodeling project, wherein at least one of the one or more visual depictions includes the one or more potential finance options, such that the party or an insurance representative can at least one of view, modify, or accept a finance option.

Additional Considerations

The above description refers to block diagrams of the accompanying drawings. Alternative implementations of the examples represented by the block diagrams include one or more additional or alternative elements, processes, and/or devices. Additionally or alternatively, one or more of the example blocks of the diagrams may be combined, divided, re-arranged, or omitted. Components represented by the blocks of the diagrams may be implemented by hardware, software, firmware, and/or any combination of hardware, software, and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines.

Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present).

Some exemplary logic circuits are hardware that executes machine-readable instructions to perform operations (e.g., one or more of the operations described herein and represented by the flowcharts of this disclosure, if such are present). Some exemplary logic circuits include a combination of specifically configured hardware and hardware that executes machine-readable instructions.

The above description refers to various operations described herein and flowcharts that may be appended hereto to illustrate the flow of those operations. Any such flowcharts are representative of example methods disclosed herein. In some examples, the methods represented by the flowcharts implement the apparatuses represented by the block diagrams. Alternative implementations of example methods disclosed herein may include additional or alternative operations.

Further, operations of alternative implementations of the methods disclosed herein may combined, divided, re-arranged, or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

Unless expressly stated to the contrary, "or" refers to an inclusive or and not to an exclusive or. For example, "A, B, or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media and/or virtual headsets, thereby making a computer program product, i.e., an article of manufacture, according to the discussed embodiments of the disclosure. The computer-readable media may be, for example, but is not limited to, a virtual headset or portion thereof, fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor or virtual headset, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to store and provide machine instructions and/or data to a programmable processor, including a machine-readable medium that receives machine instructions as a machine-readable signal. The "machine-readable medium" and "computer-readable medium," however, do not include transitory or propagating signals. The term "machine-readable signal" refers to any signal used to provide machine instructions and/or data to a programmable processor.

As used herein, a processor may include any programmable system including systems using virtual headsets and/or micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory for any suitable duration of time (e.g., permanently, for an extended period of time (e.g., while a program associated with the machine-readable instructions is executing), and/or a short period of time (e.g., while the machine-readable instructions are cached and/or during a buffering process)). The above memory types are examples only, and are thus not limiting as to the types of memory usable for storage of a computer program.

In one embodiment, a computer program is provided, and the program is embodied on a computer readable medium and/or virtual headset. In some embodiments, the system is executed on a single computer system or virtual headset, without requiring a connection to a server computer. In a further embodiment, the system is being run at least in part in a Windows® environment (Windows is a registered trademark of Microsoft Corporation, Redmond, Washington). In yet another embodiment, the system is run at least in part on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices, such as virtual headsets in wireless communication with one or more local or more processors or servers over one or more radio frequency links. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "exemplary embodiment," "one embodiment," or "some embodiments" of the present disclosure are not intended to be interpreted as excluding the existence of additional embodiments that also incorporate the recited features.

The patent claims at the end of this document are not intended to be construed under 35 U.S.C. § 113(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

While the preferred embodiments have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for collecting and collaboratively reviewing asset information using different extended reality (XR environments, the computer-implemented method comprising:
    obtaining one or more XR preferences for a party, the one or more XR preferences including a preference to use virtual reality (VR);
    presenting, using at least an XR device associated with the party, an AR environment to the party, at least in part by overlaying, on real-world content viewed using the XR device,
        instructions constructed to guide the party to move throughout or around a real property, and
        prompts constructed to direct the party to capture data representing one or more of the real property or belongings associated with the real property;
    determining, by one or more processors processing the captured data, asset data representing one or more of the real property or the belongings; and
    presenting, in a VR environment that includes a first avatar of the party and a second avatar of an insurance representative, in accordance with the party's XR preferences, and via the XR device or another XR device associated with the party, one or more visual depictions of the determined asset data such that the party or the insurance representative can at least one of view, modify, or approve the asset data.

2. The computer-implemented method of claim 1, wherein determining the asset data includes processing input data representing the captured data using one or more configured and trained machine learning models.

3. The computer-implemented method of claim 2, wherein the captured data includes images or video frames, and wherein the one or more machine learning models are configured and trained to process the images or the video frames to one or more of (i) identify the belongings, (ii) determine details or information related to the belongings, (iii) identify features of the real property, or (iv) determine details or information related to the features.

4. The computer-implemented method of claim 1, wherein obtaining the XR preferences includes obtaining the XR preferences using the XR device, wherein the XR further comprise preferences representing one or more of profile data for the party, metaverse preferences, or avatar preferences.

5. The computer-implemented method of claim 1, wherein
    determining the asset data includes identifying one or more of (i) features of the real property, (ii) construction materials, or (iii) the belongings, and
    the method further comprises:
        generating a quote for an insurance policy for the party based upon the asset data, wherein at least one of the one or more visual depictions represents the quote for the insurance policy such that the party or the insurance representative can at least one of view, modify, or accept the quote.

6. The computer-implemented method of claim 1, wherein the captured data (i) includes one or more images or video frames of the real property or the belongings and (ii) is captured before, during, or after a damage-causing event.

7. The computer-implemented method of claim 6, further comprising:
    processing the captured data and the asset data to generate an insurance claim that includes repair or replacement costs for damaged portions of the real property, or damaged belongings.

8. The computer-implemented method of claim 6, further comprising:
    generating, based upon the captured data, a virtual reconstruction of the damage-causing event, wherein at least one of the one or more visual depictions includes the virtual reconstruction such that the party or the insurance representative can at least one of view, modify, or approve the virtual reconstruction.

9. The computer-implemented method of claim 8, further comprising:
    obtaining, using one or more sensors and before, during, or after the damage-causing event, sensor data related to the damage-causing event,
    wherein the virtual reconstruction is generated based upon the captured data and the sensor data.

10. The computer-implemented method of claim 1, wherein determining the asset data includes determining one or more potential damage risks to the real property, or the belongings.

11. The computer-implemented method of claim 10, further comprising:
    determining, by one or more processors processing the captured data, the asset data, and second data representing risk mitigation, one or more risk mitigation options for the one or more potential damage risks, wherein at least one of the one or more visual depictions includes the risk mitigation options.

12. The computer-implemented method of claim 11, further comprising:
obtaining, using one or more sensors, sensor data related to the real property, or the belongings,
wherein the potential damage risks are determined based upon the captured data, the asset data, and the sensor data.

13. The computer-implemented method of claim 1, wherein determining the asset data includes:
identifying a potential remodeling project for the real property;
determining one or more of potential layouts, components, materials, costs, suppliers, or contractors for the remodeling project;
generating a virtual representation of a potential result of the remodeling project, wherein at least one of the one or more visual depictions includes the virtual representation.

14. A system for collecting and collaboratively reviewing asset information using different extended reality (XR) environments, the system comprising:
a communication interface configured to receive one or more XR preferences for a party, the one or more XR preferences including a preference to use virtual reality (VR); and
one or more processors configured to:
present, using at least an XR device associated with the party, an AR environment to the party, at least in part by overlaying, on real-world content viewed using the XR device,
instructions constructed to guide the party to move throughout or around a real property, and
prompts constructed to direct the party to capture data representing one or more of the real property or belongings associated with the real property;
determine, by processing the captured data, asset data representing one or more of the real property or the belongings; and
present, in a VR environment that includes a first avatar of the party and a second avatar of an insurance representative, in accordance with the party's XR preferences, and via the XR device or another XR device associated with the party, one or more visual depictions of the determined asset data such that the party or the insurance representative can at least one of view, modify, or approve the asset data.

15. The system of claim 14, wherein the one or more processors are configured to determine the asset data by processing input data representing the captured data using one or more configured and trained machine learning models.

16. The system of claim 15, wherein the captured data includes images or video frames, and wherein the one or more machine learning models are configured and trained to process the images or the video frames to one or more of (i) identify the belongings, (ii) determine details or information related to the belongings, (iii) identify features of the real property, or (iv) determine details or information related to the features.

17. A non-transitory computer-readable storage medium storing instructions for collecting and collaboratively reviewing asset information using different extended reality (XR) environments, wherein the instructions, when executed by one or more processors, cause a system to:
obtain one or more XR preferences for a party, the one or more XR preferences including a preference to use virtual reality (VR);
present, using at least an XR device associated with the party, an AR environment to the party, at least in part by overlaying, on real-world content viewed using the XR device,
instructions constructed to guide the party to move throughout or around a real property, and
prompts constructed to direct the party to capture data representing one or more of the real property or belongings associated with the real property;
determine, by processing the captured data, asset data representing one or more of the real property or the belongings; and
present, in a VR environment that includes a first avatar of the party and a second avatar of an insurance representative, in accordance with the party's XR preferences, and via the XR device or another XR device associated with the party, one or more visual depictions of the determined asset data such that the party or an insurance representative can at least one of view, modify, or approve the asset data.

* * * * *